United States Patent
Ishikawa et al.

(10) Patent No.: US 10,899,927 B2
(45) Date of Patent: Jan. 26, 2021

(54) CURABLE COMPOSITION, CURED FILM, LIGHT BLOCKING FILM, SOLID-STATE IMAGING ELEMENT, SOLID-STATE IMAGING DEVICE, AND MANUFACTURING METHOD OF CURED FILM

(71) Applicant: FUJIFILM Corporation, Tokyo (JP)

(72) Inventors: Tatsuo Ishikawa, Haibara-gun (JP); Yoshinori Taguchi, Haibara-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/533,144

(22) Filed: Aug. 6, 2019

(65) Prior Publication Data
US 2019/0359825 A1 Nov. 28, 2019

Related U.S. Application Data

(63) Continuation of application No. PCT/JP2018/007996, filed on Mar. 2, 2018.

(30) Foreign Application Priority Data
Mar. 21, 2017 (JP) .................................. 2017-054724

(51) Int. Cl.
*C08L 79/08* (2006.01)
*C08K 3/14* (2006.01)
(Continued)

(52) U.S. Cl.
CPC ................. *C08L 79/08* (2013.01); *C08J 3/28* (2013.01); *C08J 5/18* (2013.01); *C08K 3/14* (2013.01);
(Continued)

(58) Field of Classification Search
CPC .... C08L 79/08; C08L 33/12; C08L 2201/003; C08L 2203/16; C08L 2203/20; C08J 3/28; C08J 5/18; C08K 3/14
(Continued)

(56) References Cited

U.S. PATENT DOCUMENTS

2016/0122498 A1* 5/2016 Wake ..................... C08L 93/04
52/167.1

FOREIGN PATENT DOCUMENTS

CN 103756529 A 4/2014
JP 2001-019873 A 1/2001
(Continued)

OTHER PUBLICATIONS

International Search Report dated May 15, 2018 in International Application No. PCT/JP2018/007996.
(Continued)

*Primary Examiner* — William K Cheung
(74) *Attorney, Agent, or Firm* — Sughrue Mion, PLLC

(57) ABSTRACT

An object of the present invention is to provide a curable composition which has excellent patterning properties and makes it possible to obtain a cured film having excellent light blocking properties. Another object of the present invention is to provide a cured film, a light blocking film, a solid-state imaging element, and a solid-state imaging device. The curable composition contains inorganic particles, a polymerizable compound, and a polymerization initiator, in which the inorganic particles contain metal carbide-containing particles containing a carbide of an element in group 5 of the periodic table, and a content of the metal carbide-containing particles in a total mass of the inorganic particles is equal to or greater than 55% by mass.

16 Claims, 3 Drawing Sheets

(51) Int. Cl.
*C08J 5/18* (2006.01)
*C08J 3/28* (2006.01)
*C08L 33/12* (2006.01)

(52) U.S. Cl.
CPC ........ *C08L 33/12* (2013.01); *C08K 2201/003* (2013.01); *C08L 2203/16* (2013.01); *C08L 2203/20* (2013.01)

(58) Field of Classification Search
USPC .......................................................... 524/424
See application file for complete search history.

(56) References Cited

FOREIGN PATENT DOCUMENTS

| | | |
|---|---|---|
| JP | 2001-092119 A | 4/2001 |
| JP | 2007-047610 A | 2/2007 |
| JP | 2010-095716 A | 4/2010 |
| JP | 2010-096842 A | 4/2010 |
| JP | 2010-097210 A | 4/2010 |

OTHER PUBLICATIONS

Written Opinion of the International Searching Authority dated May 15, 2018 in International Application No. PCT/JP2018/007996.
International Preliminary Report on Patentability with English Translation of Written Opinion dated Sep. 24, 2019 in International Application No. PCT/JP2018/007996.

* cited by examiner

CURABLE COMPOSITION, CURED FILM, LIGHT BLOCKING FILM, SOLID-STATE IMAGING ELEMENT, SOLID-STATE IMAGING DEVICE, AND MANUFACTURING METHOD OF CURED FILM

CROSS-REFERENCE TO RELATED APPLICATIONS

This application is a Continuation of PCT International Application No. PCT/JP2018/007996 filed on Mar. 2, 2018, which claims priority under 35 U.S.C. § 119(a) to Japanese Patent Application No. 2017-054724 filed on Mar. 21, 2017. Each of the above application(s) is hereby expressly incorporated by reference, in its entirety, into the present application.

BACKGROUND OF THE INVENTION

1. Field of the Invention

The present invention relates to a curable composition, a cured film, a light blocking film, a solid-state imaging element, a solid-state imaging device, and a manufacturing method of a cured film.

2. Description of the Related Art

In the related art, as particles incorporated into a curable composition for manufacturing a cured film having light blocking properties (hereinafter, referred to as "light blocking film" as well), metal nitride-containing particles are known. The metal nitride-containing particles are used for various purposes. Particularly, the curable composition containing the metal nitride-containing particles has been used, for example, for preparing a light blocking film that a solid-state imaging element (for example, a liquid crystal display device, an organic electroluminescence (EL) device, or the like), a solid-state imaging device, and the like comprise.

Specifically, a color filter that a solid-state imaging device and the like comprise includes a light blocking film called black matrix for the purpose of blocking light between colored pixels, enhancing contrast, and the like.

A solid-state imaging element comprises a light blocking film for the purpose of preventing the occurrence of noise, improving image quality, and the like. Currently, a compact and thin solid-state imaging device is mounted on mobile terminals such as a mobile phone and Personal Digital Assistant (PDA). Generally, the solid-state imaging device comprises a solid-state imaging element such as a Charge Coupled Device (CCD) image sensor and a Complementary Metal-Oxide Semiconductor (CMOS) image sensor and a lens for forming an image of an object on the solid-state imaging element.

As the curable composition for manufacturing the cured film described above, a photosensitive black resin composition, which contains a light blocking material, an alkali-soluble resin, a polymerization initiator, a reactive monomer, and an organic solvent, contains at least titanium nitride particles as the light blocking material, and can form a coating film having predetermined optical characteristics, is described in JP2010-097210A.

Furthermore, JP2010-095716A describes a light blocking material in which a compositional ratio between titanium nitride particles and titanium carbide particles is within a range of 80/20 to 20/80 based on mass.

SUMMARY OF THE INVENTION

The inventors of the present invention examined the photosensitive black resin composition described in JP2010-097210A. As a result, the inventors have found that although a cured film obtained from the composition has excellent light blocking properties, patterning properties of the photosensitive black resin composition have problems. Furthermore, the inventors of the present invention have found that the light blocking material containing titanium carbide particles described in JP2010-095716A has problems with light blocking properties. The inventors have also found that in a case where the content of a pigment such as titanium nitride-containing particles in the curable composition is increased so as to obtain a light blocking film having excellent light blocking properties, the pigment is easily precipitated, and hence the temporal stability of the curable composition becomes problematic.

Therefore, an object of the present invention is to provide a curable composition which has excellent temporal stability and excellent patterning properties and makes it possible to obtain a light blocking film having excellent light blocking properties. Another object of the present invention is to provide a cured film, a light blocking film, a solid-state imaging element, a solid-state imaging device, and a manufacturing method of a cured film.

In order to achieve the above objects, the inventors of the present invention conducted an intensive study. As a result, the inventors have found that the objects can be achieved by the following constitution.

[1] A curable composition containing inorganic particles, a polymerizable compound, and a polymerization initiator, in which the inorganic particles contain metal carbide-containing particles containing a carbide of an element in group 5 of the periodic table, and a content of the metal carbide-containing particles in a total mass of the inorganic particles is equal to or greater than 55% by mass.

[2] The curable composition described in [1], in which a ratio of a mass of the polymerizable compound contained in the curable composition to a mass of the inorganic particles contained in the curable composition is 0.1 to 0.8.

[3] The curable composition described in [1] or [2], further containing a polymerization inhibitor.

[4] The curable composition described in [3], in which a ratio of a mass of the polymerization inhibitor contained in the curable composition to a mass of the inorganic particles contained in the curable composition is 0.0001 to 0.0005.

[5] The curable composition described in any one of [1] to [4], further containing a resin.

[6] The curable composition described in [5], in which the resin contains an alkali-soluble resin, and a ratio of a mass of the alkali-soluble resin contained in the curable composition to a mass of the inorganic particles contained in the curable composition is 0.03 to 0.6.

[7] The curable composition described in any one of [1] to [6], in which an average primary particle diameter of the metal carbide-containing particles is greater than 5 nm and less than 200 nm.

[8] The curable composition described in any one of [1] to [7], in which the element is Ta.

[9] The curable composition described in any one of [1] to [7], in which the element is Nb or V.

[10] A cured film obtained by curing the curable composition described in any one of [1] to [9].

[11] A light blocking film containing the cured film described in [10].

[12] A solid-state imaging element containing the cured film described in [10].

[13] An image display device containing the cured film described in [10].

[14] A manufacturing method of a cured film, including a curable composition layer forming step of forming a curable composition layer by using the curable composition described in any one of [1] to [9], an exposure step of exposing the curable composition layer by irradiating the curable composition layer with actinic rays or radiation, and a development step of developing the exposed curable composition layer so as to form a cured film.

According to the present invention, a curable composition can be provided which has excellent temporal stability and excellent patterning properties and makes it possible to obtain a light blocking film having excellent light blocking properties. Furthermore, the present invention can provide a cured film, a light blocking film, a solid-state imaging element, and a solid-state imaging device.

DESCRIPTION OF THE PREFERRED EMBODIMENTS

Figure 1:
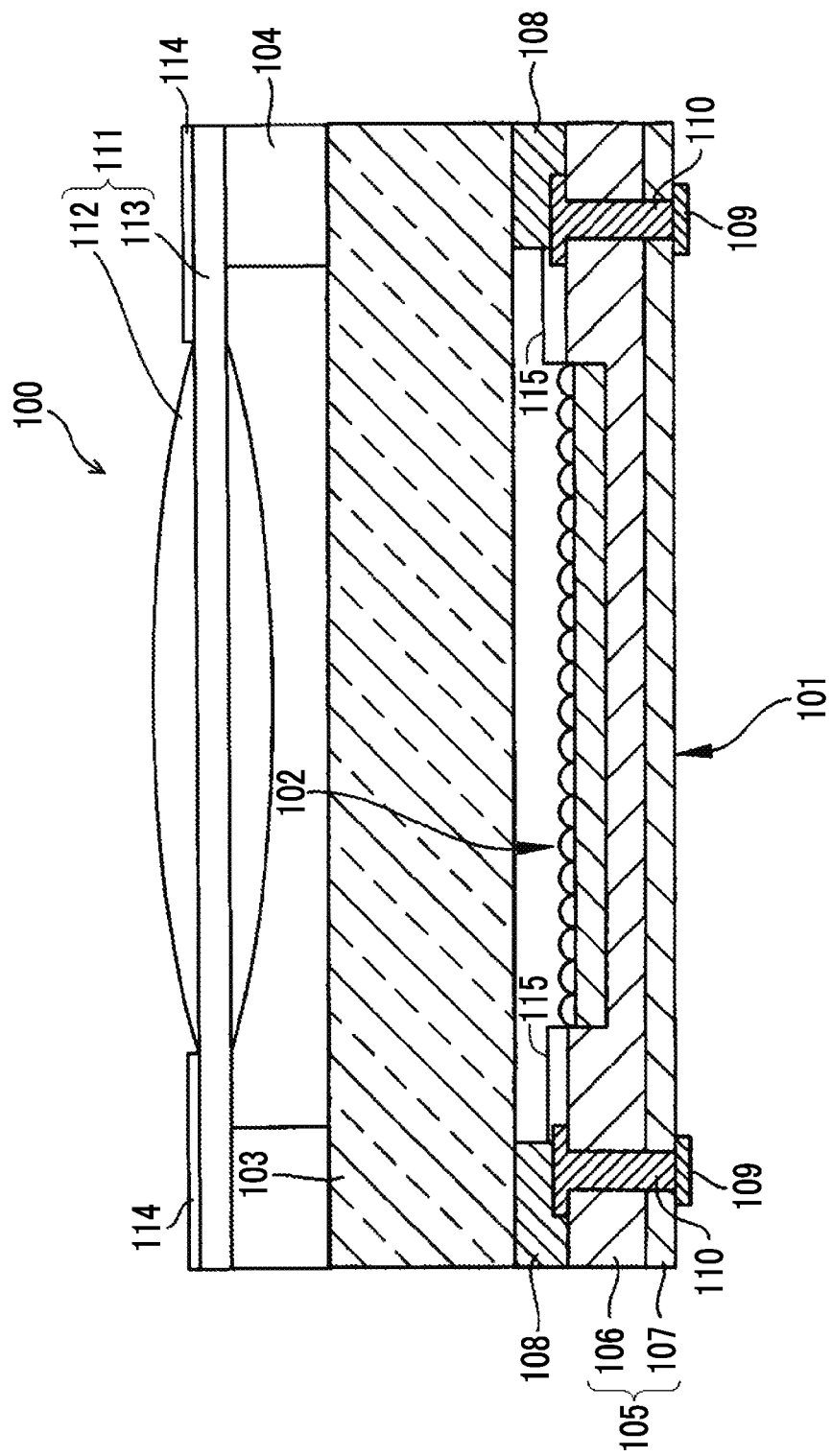
FIG. 1 is a schematic cross-sectional view showing an example of the constitution of a solid-state imaging device.

Hereinafter, the present invention will be specifically described.

The following constituents will be described based on typical embodiments of the present invention in some cases, but the present invention is not limited to the embodiments.

In the present specification, a range of numerical values described using "to" means a range including the numerical values listed before and after "to" as a lower limit and an upper limit respectively.

In the present specification, regarding the description of a group (atomic group), in a case where whether the group is substituted or unsubstituted is not described, the group includes a group which does not have a substituent and a group which has a substituent. For example, "alkyl group" includes not only an alkyl group which does not have a substituent (unsubstituted alkyl group) but also an alkyl group which has a substituent (substituted alkyl group).

Furthermore, in the present specification, "actinic rays" or "radiation" means, for example, far ultraviolet rays, extreme ultraviolet radiation (EUV: extreme ultraviolet), X-rays, electron beams, and the like. In addition, in the present specification, light means actinic rays and radiation. In the present specification, unless otherwise specified, "exposure" includes not only exposure by far ultraviolet rays, X-rays, and EUV, but also lithography by particle beams such as electron beams and ion beams.

In the present specification, "(meth)acrylate" represents acrylate and methacrylate, "(meth)acryl" represents acryl and methacryl, "(meth)acryloyl" represents acryloyl and methacryloyl, and "(meth)acrylamide" represents acrylamide and methacrylamide. Furthermore, in the present specification, "tanryotai" in Japanese and "monomer" have the same definition. The monomer is classified into an oligomer and a polymer, and refers to a compound having a weight-average molecular weight equal to or smaller than 2,000. In the present specification, a polymerizable compound refers to a compound containing a polymerizable group, and may be a monomer or a polymer. The polymerizable group refers to a group which takes part in a polymerization reaction.

[Curable Composition]

The curable composition according to an embodiment of the present invention contains inorganic particles, a polymerizable compound, and a polymerization initiator, in which the inorganic particles contain metal carbide-containing particles containing a carbide of an element in group 5 of the periodic table, and a content of the metal carbide-containing particles in the inorganic particles is equal to or greater than 55% by mass with respect to a total mass of the inorganic particles.

The curable composition according to the embodiment has the effects of the present invention. Details of the mechanism are unclear but are assumed to be as below according to the inventors of the present invention.

The curable composition according to the embodiment contains metal carbide-containing particles containing a carbide of an element in group 5 of the periodic table. The elements in group 5 of the periodic table have a higher specific gravity compared to, for example, titanium and the like, and among the elements having the same mass, the elements in group 5 have a small volume. Therefore, in a case where the metal carbide-containing particles are added to the curable composition at a certain mass ratio, because the total volume thereof is smaller than that of titanium nitride and the like, the metal carbide-containing particles can be more easily dispersed in the curable composition. Accordingly, considering the overall makeup of the curable composition, the content of the polymerizable compound (and the content of other optional components such as the content of a resin and the like which will be described later) can be increased. Presumably, for this reason, the curable composition according to the embodiment may have better patterning properties.

Hereinafter, each of the components contained in the curable composition according to the embodiment of the present invention will be described.

[A: Inorganic Particles]

The curable composition according to the embodiment contains inorganic particles. The inorganic particles are not particularly limited as long as they contain metal carbide-containing particles containing a carbide of an element in group 5 of the periodic table (hereinafter, simply referred to as "metal carbide-containing particles" as well), and the content of the metal carbide-containing particles is equal to or greater than 55% by mass with respect to the total mass of the inorganic particles.

The content of the inorganic particles in the curable composition is not particularly limited. Generally, the content of the inorganic particles with respect to the total solid content of the curable composition is 20% to 70% by mass, more preferably 30% to 65% by mass, and even more preferably 40% to 62% by mass. One kind of inorganic particles may be used singly, or two or more kinds of inorganic particles may be used in combination. In a case where two or more kinds of inorganic particles are used in combination, the total content thereof is preferably within the above range.

A ratio of the mass of the polymerizable compound (B), which will be described later, contained in the curable composition to the mass of the inorganic particles (A), which will be described later, contained in the curable composition (B/A) is not particularly limited. In order for the curable composition to have better temporal stability and better patterning properties, B/A is preferably equal to or higher than 0.01, more preferably equal to or higher than 0.05, and even more preferably equal to or higher than 0.1. Furthermore, in order for the curable composition to have better patterning properties, the upper limit of B/A is preferably equal to or lower than 1.0, more preferably equal to or lower than 0.95, even more preferably equal to or lower than 0.85, and particularly preferably equal to or lower than 0.8.

A ratio of the mass of the polymerization initiator (C), which will be described later, contained in the curable composition to the mass of the inorganic particles (A) contained in the curable composition (C/A) is not particularly limited. Generally, C/A is preferably 0.01 to 0.2. In a case where C/A is within the above range, the curable composition has further improved effects of the present invention.

A ratio of the mass of the polymerization inhibitor (D), which will be described later, contained in the curable composition to the mass of the inorganic particles (A) contained in the curable composition (D/A) is not particularly limited. In order for the curable composition to have better temporal stability and patterning properties, D/A is preferably equal to or higher than 0.00001, and more preferably 0.0001. The upper limit of D/A is not particularly limited. In order for the curable composition to have better patterning properties, the upper limit of D/A is preferably equal to or lower than 0.001, more preferably equal to or lower than 0.0008, even more preferably equal to or lower than 0.0007, and particularly preferably equal to or lower than 0.0005.

A ratio of the mass of a dispersant (E1), which will be described later, contained in the curable composition to the mass of the inorganic particles (A) contained in the curable composition (E1/A) is not particularly limited. In order for the curable composition to have better temporal stability and better patterning properties, E1/A is preferably equal to or higher than 0.01, more preferably equal to or higher than 0.1, and even more preferably equal to or higher than 0.2. The upper limit of E1/A is not particularly limited, but is preferably equal to or lower than 1.0 and more preferably equal to or lower than 0.8 in general.

A ratio of the mass of an alkali-soluble resin (E2), which will be described later, contained in the curable composition to the mass of the inorganic particles (A) contained in the curable composition (E2/A) is not particularly limited. In order for the curable composition to have better patterning properties, E2/A is preferably equal to or higher than 0.001, more preferably equal to or higher than 0.01, even more preferably equal to or higher than 0.015, and particularly preferably equal to or higher than 0.03. The upper limit of E2/A is not particularly limited. Generally, in order for the curable composition to have better patterning properties, the upper limit of E2/A is preferably equal to or lower than 1.0, more preferably equal to or lower than 0.8, and even more preferably equal to or lower than 0.6.

A ratio of the mass of a surfactant (F), which will be described later, contained in the curable composition to the mass of the inorganic particles (A) contained in the curable composition (F/A) is not particularly limited. Generally, F/A is preferably 0.0001 to 0.01, and more preferably 0.001 to 0.003. In a case where F/A is within the above range, the curable composition has further improved effects of the present invention.

<A1: Metal Carbide-Containing Particles>

The inorganic particles contain metal carbide-containing particles.

The content of the metal carbide-containing particles in the total mass of the inorganic particles is equal to or greater than 55% by mass. In a case where the content of the metal carbide-containing particles in the inorganic particles is equal to or greater than 55% by mass, the curable composition has better light blocking properties and patterning properties.

The content of the metal carbide-containing particles in the inorganic particles is preferably equal to or greater than 60% by mass, and more preferably greater than 70% by mass. In a case where the content of the metal carbide-containing particles in the inorganic particles is greater than 70% by mass, the curable composition has better patterning properties.

One kind of metal carbide-containing particles may be used singly, or two or more kinds of metal carbide-containing particles may be used in combination. In a case where two or more kinds of metal carbide-containing particles are used in combination, the total content thereof is preferably within the above range. The upper limit of the content of the metal carbide-containing particles is not particularly limited, but is preferably equal to or smaller than 100% by mass.

(Average Primary Particle Diameter)

The average primary particle diameter of the metal carbide-containing particles is not particularly limited. In order for the curable composition to have better temporal stability, the average primary particle diameter of the metal carbide-containing particles is preferably 1 to 300 nm, more preferably 5 to 200 nm, even more preferably greater than 5 nm and less than 200 nm, and particularly preferably 10 to 100 nm.

In the present specification, the average primary particle diameter means an average primary particle diameter determined by calculating an arithmetic mean of diameters of circles converted from 400 metal carbide-containing particles evaluated using a Transmission Electron Microscope (TEM). The testing method is as described in Examples.

The metal carbide-containing particles can be manufactured by known methods. Particularly, in view of easily obtaining the curable composition having further improved effects of the present invention, metal carbide-containing particles obtained by a Radio Frequency (RF) thermal plasma method are preferable.

As the method for manufacturing metal carbide-containing particles by the RF thermal plasma method, for example, it is possible to use the method described in Science and Technology of Advanced Materials 6 (2005) 111-118, "Controlling the synthesis of TaC nanopowders by injecting liquid precursor into RF induction plasma". The content in this document is incorporated into the present specification.

As the element in group 5 of the periodic table that is contained in the metal carbide-containing particles, at least one kind of element selected from the group consisting of Ta, Nb, and V is preferable, and Ta is more preferable.

The metal carbide-containing particles may contain an atom other than the element in group 5 of the periodic table and carbon (hereinafter, referred to as "impurity atom" as well). Typical examples of the impurity atom include metal atoms other than group 5 in the periodic table and a silicon atom. In a case where the metal carbide-containing particles contain the impurity atom, for example, the impurity atom is typically in the form of an ion, a metal compound (including a complex compound), an intermetallic compound, an alloy, an oxide, a composite oxide, a nitride, an oxynitride, a sulfide, an oxysulfide, and the like. The impurity atom may be present as an impurity positioned between crystal lattices or present as an amorphous impurity in the crystal grain boundary.

The impurity atom may be intentionally added to the metal carbide-containing particles, or may be unintentionally incorporated into a raw material (for example, a powder raw material of an element in group 5 of the periodic table) for manufacturing the metal carbide-containing particles. Typically, the impurity atom incorporated into the raw material is derived, for example, from mineral used for manufacturing the powder raw material.

<A2: Other Particles>

The inorganic particles may contain other particles in addition to the metal carbide-containing particles. The content of those other particles in the inorganic particles is equal to or smaller than 45% by mass, preferably equal to or smaller than 40% by mass, and more preferably less than 30% by mass. It is even more preferable that the inorganic particles substantially do not contain other particles. In a case where the content of other particles in the inorganic particles is less than 30% by mass, the curable composition has further improved patterning properties.

One kind of those other particles may be used singly, or two or more kinds of those other particles may be used in combination. In a case where two or more kinds of those other particles are used in combination, the total content thereof is preferably within the above range. The upper limit of the content of those other particles is not particularly limited, and is preferably equal to or smaller than 100% by mass.

As those other particles, generally, an inorganic pigment can be used without particular limitation.

Examples of the inorganic pigment include carbon black, silica, zinc oxide, white lead, lithopone, titanium oxide, chromium oxide, iron oxide, precipitated barium sulfate, barite powder, red lead, red iron oxide, chromium yellow, zinc chromium (one kind of zinc chromium or two kinds of zinc chromium), ultramarine blue, Prussian blue (potassium ferric ferrocyanide), zircon grey, Praseodymium yellow, chromium titanium yellow, chromium green, peacock, Victoria green, iron blue (irrelevant to Prussian blue), vanadium zirconium blue, chromium tin pink, manganese pink, salmon pink, and the like. As a black inorganic pigment, in view of obtaining a cured film with better light blocking properties by using the curable composition containing a small amount of the pigment, carbon black, a metallic pigment (hereinafter, referred to as "black pigment" as well), and the like are preferable. Examples of the metallic pigment include a metal oxide, a metal nitride (for example, TiN or the like), and the like containing one kind of metallic element or two or more kinds of metallic elements selected from the group consisting of Nb, V, Co, Cr, Cu, Mn, Ru, Fe, Ni, Sn, Ti, and Ag.

It is preferable that the inorganic pigment contains at least one kind of pigment selected from the group consisting of a silver-containing metallic pigment, a tin-containing metallic pigment, and a metallic pigment containing silver and tin. One kind of inorganic pigment may be used singly, or two or more kinds of inorganic pigments may be used in combination.

As the inorganic pigment, an infrared absorbing pigment can also be used.

As the infrared absorbing pigment, a tungsten compound, a metal boride, and the like are preferable. Among these, in order to obtain a cured film having better light blocking properties at a wavelength in an infrared range, a tungsten compound is preferable. The tungsten compound is preferable because this compound more easily transmits the wavelength in a visible range and more easily transmits the wavelength in an absorption wavelength range of a photopolymerization initiator (particularly, an absorption wavelength of an oxime-based polymerization initiator).

Two or more kinds of pigments described above may be used in combination, and a dye which will be described later may also be used in combination. In order to adjust tint and to improve the light blocking properties in the desired wavelength range, for example, it is possible to adopt an aspect in which either or both of the black pigment and the pigment having infrared blocking properties are used in combination with a chromatic pigment of red, green, yellow, orange, purple, and/or blue, or the like and an aspect in which either or both of the black pigment and the infrared blocking pigment are used in combination with a dye. Particularly, an aspect is preferable in which either or both of the black pigment and the infrared blocking pigment are used in combination with a red pigment, a purple pigment, and/or a dye, and an aspect is more preferable in which either or both of the black pigment and the infrared blocking pigment are used in combination with a red pigment. Furthermore, a near-infrared absorbing compound and an infrared absorbing compound may be used in combination.

(Average Primary Particle Diameter)

The average primary particle diameter of those other particles described above is not particularly limited. In order for the curable composition to have better temporal stability, the average primary particle diameter is preferably approximately the same as that of the metal carbide-containing particles. Specifically, the average primary particle diameter of those other particles is preferably equal to or greater than 5 nm, more preferably equal to or greater than 10 nm, and even more preferably equal to or greater than 20 nm. The average primary particle diameter of those other particles is preferably equal to or smaller than 300 nm, more preferably equal to or smaller than 250 nm, even more preferably equal to or smaller than 100 nm, and particularly preferably equal to or smaller than 80 nm.

[B: Polymerizable Compound]

The curable composition contains a polymerizable compound. In the present specification, the polymerizable compound means a compound which contains a polymerizable group and is a component different from the resin (a dispersant and an alkali-soluble resin) which will be described later.

The content of the polymerizable compound in the curable composition is not particularly limited. Generally, the content of the polymerizable compound with respect to the total solid content of the curable composition is preferably 5% to 40% by mass. One kind of polymerizable compound may be used singly, or two or more kinds of polymerizable compounds may be used in combination. In a case where two or more kinds of polymerizable compounds are used in combination, the total content thereof is preferably within the above range.

The polymerizable compound is preferably a compound which contains one or more groups containing an ethylenically unsaturated bond, more preferably a compound which contains two or more groups containing an ethylenically unsaturated bond, even more preferably a compound which contains three or more groups containing an ethylenically unsaturated bond, and particularly preferably a compound which contains five or more groups containing an ethylenically unsaturated bond. The upper limit of the number of groups containing an ethylenically unsaturated bond is equal to or smaller than 15. Examples of the group containing an ethylenically unsaturated bond include a vinyl group, a (meth)acryl group, a (meth)acryloyl group, and the like.

As the polymerizable compound, for example, it is possible to use the compounds described in paragraph "0050" in JP2008-260927A and in paragraph "0040" in JP2015-068893A. The contents of the above paragraphs are incorporated into the present specification.

The polymerizable compound may be in any chemical form such as a monomer, a prepolymer, an oligomer, a mixture of these, or a multimer of these.

The polymerizable compound is preferably a (meth)acrylate compound having 3 to 15 functional groups, and more preferably a (meth)acrylate compound having 5 to 15 functional groups.

As the polymerizable compound, a compound is preferable which contains one or more groups containing an ethylenically unsaturated bond and has a boiling point equal to or higher than 100° C. under normal pressure. For example, it is possible to use the compounds described in paragraph "0227" in JP2013-029760A and paragraphs "0254" to "0257" in JP2008-292970A. The contents of the above paragraphs are incorporated into the present specification.

As the polymerizable compound, for example, dipentaerythritol triacrylate (as a commercial product, KAYARAD D-330; manufactured by Nippon Kayaku Co., Ltd.), dipentaerythritol tetraacrylate (as a commercial product, KAYARAD D-320; manufactured by Nippon Kayaku Co., Ltd.), dipentaerythritol penta(meth)acrylate (as a commercial product, KAYARAD D-310; manufactured by Nippon Kayaku Co., Ltd.), dipentaerythritol hexa(meth)acrylate (as a commercial product, "KAYARAD DPHA"; a mixture with dipentaerythritol penta(meth)acrylate, manufactured by Nippon Kayaku Co., Ltd., corresponding to a polymerizable compound M1 which will be described later), "A-DPH-12E" (manufactured by SHIN-NAKAMURA CHEMICAL CO., LTD.)), and a structure in which an ethylene glycol residue or a propylene glycol residue is between these (meth)acryloyl groups (for example, SR454 and SR499 marketed by Sartomer) are preferable. Oligomer types of these can also be used. In addition, NK ESTER A-TMNIT (pentaerythritol tetraacrylate, manufactured by SHIN-NAKAMURA CHEMICAL CO., LTD.), KAYARAD RP-1040 (manufactured by Nippon Kayaku Co., Ltd., tetrafunctional, corresponding to the polymerizable compound M3 which will be described later), and the like can also be used.

As the polymerizable compound, for example, urethane (meth)acrylate can also be used. The urethane (meth)acrylate is not particularly limited, and examples of commercial products thereof include "U-6HA", "UA-1100H", "U-6LPA", "U-15HA (having 15 functional groups, corresponding to a polymerizable compound M2 which will be described later)", "U-6H", "U-10HA", "U-10PA", "UA-53H", and "UA-33H" (trade names) manufactured by SHIN-NAKAMURA CHEMICAL CO. LTD "UA-306H", "UA-306T", "UA-306I", and "UA-510H" (trade names) manufactured by KYOEISHA CHEMICAL Co., LTD, "Laromer UA-9048", "UA-9050", and "PR9052" (trade names) manufactured by BASF SE, "EBECRYL 220", "5129", "8301", "KRM8200", "8200AE", and "8452" (trade names) manufactured by Daicel-Allnex Ltd., and the like.

The polymerizable compound may contain an acid group such as a carboxylic acid group, a sulfonic acid group, or a phosphoric acid group. As the polymerizable compound containing an acid group, an ester of an aliphatic polyhydroxy compound and an unsaturated carboxylic acid is preferable, and a polymerizable compound is more preferable which is obtained by reacting a nonaromatic carboxylic acid anhydride with an unreacted hydroxyl group of an aliphatic polyhydroxy compound such that an acid group is incorporated into the compound. As the compound, the aforementioned ester in which the aliphatic polyhydroxy compound is pentaerythritol and/or dipentaerythritol is even more preferable.

Examples of commercial products of the polymerizable compound include ARONIX TO-2349, M-305, M-510, and M-520 manufactured by TOAGOSEI CO., LTD., and the like.

The acid value of the polymerizable compound containing an acid group is preferably 0.1 to 40 mgKOH/g, and more preferably 5 to 30 mgKOH/g. In a case where the acid value of the polymerizable compound is equal to or greater than 0.1 mgKOH/g, the curable composition has better developability (properties of being more easily dissolved in an alkaline developer). In a case where the acid value of the polymerizable compound is equal to or smaller than 40 mgKOH/g, the acid value is advantageous to the manufacturing and/or handling of the polymerizable compound, and the polymerizable compound has better photopolymerization properties. As a result, the curable composition has better curing properties.

As the polymerizable compound, a compound containing a caprolactone structure is preferable.

As the compound containing a caprolactone structure, known compounds can be used without particular limitation as long as the compounds contain a caprolactone structure in a molecule.

Examples of the compound containing a caprolactone structure include ε-caprolactone-modified polyfunctional (meth)acrylate which is obtained by esterifying a polyhydric alcohol such as trimethylolethane, ditrimethylolethane, trimethylolpropane, ditrimethylolpropane, pentaerythritol, dipentaerythritol, tripentaerythritol, glycerin, diglycerol, or trimethylol melamine, (meth)acrylic acid, and ε-caprolactone. Particularly, a compound containing a caprolactone structure represented by Formula (Z-1) is preferable.

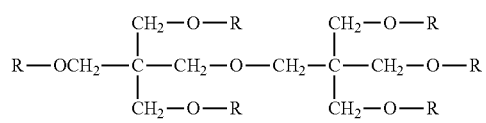

(Z-1)

In Formula (Z-1), all the six R's are groups represented by Formula (Z-2). Alternatively, one to five R's among six R's are groups represented by Formula (Z-2), and others are groups represented by Formula (Z-3).

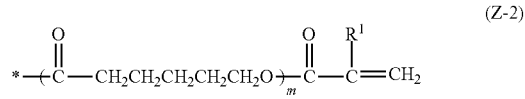

(Z-2)

In Formula (Z-2), $R^1$ represents a hydrogen atom or a methyl group, m represents 1 or 2, and "*" represents a binding position.

(Z-3)

In Formula (Z-3), $R^1$ represents a hydrogen atom or a methyl group, and "*" represents a binding position.

The polymerizable compound containing a caprolactone structure is marketed as a KAYARAD DPCA series from Nippon Kayaku Co., Ltd., and examples thereof include DPCA-20 (a compound in which m in Formulae (Z-1) to (Z-3) is 1, the number of groups represented by Formula (Z-2) is 2, and all of $R^1$'s represent a hydrogen atom), DPCA-30 (a compound in which m in Formulae (Z-1) to (Z-3) is 1, the number of groups represented by Formula (Z-2) is 3, and all of $R^1$'s represent a hydrogen atom), DPCA-60 (a compound in which m in Formulae (Z-1) to (Z-3) is 1, the number of groups represented by Formula (Z-2) is 6, and all of $R^1$'s represent a hydrogen atom), DPCA-120 (a compound in which m in Formulae (Z-1) to (Z-3) is 2, the number of groups represented by Formula (Z-2) is 6, and all of $R^1$'s represent a hydrogen atom), and the like.

As the polymerizable compound, a compound represented by Formula (Z-4) or (Z-5) can also be used.

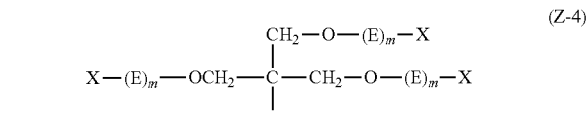

(Z-4)

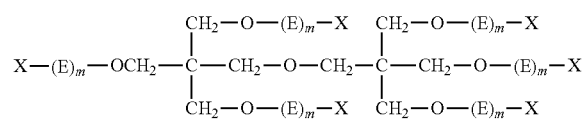

(Z-5)

In Formulae (Z-4) and (Z-5), E each independently represents —$((CH_2)_yCH_2O)$— or —$((CH_2)_yCH(CH_3)O)$—, y each independently represents an integer of 0 to 10, and X each independently represents a (meth)acryloyl group, a hydrogen atom, or a carboxylic acid group.

In Formula (Z-4), the total number of (meth)acryloyl groups is 3 or 4, m each independently represents an integer of 0 to 10, and the total number of m's is an integer of 0 to 40.

In Formula (Z-5), the total number of (meth)acryloyl groups is 5 or 6, n each independently represents an integer of 0 to 10, and the total number of n's is an integer of 0 to 60.

m in Formula (Z-4) is preferably an integer of 0 to 6, and more preferably an integer of 0 to 4.

The total number of m's is preferably an integer of 2 to 40, more preferably an integer of 2 to 16, and even more preferably an integer of 4 to 8.

n in Formula (Z-5) is preferably an integer of 0 to 6, and more preferably an integer of 0 to 4.

The total number of n's is preferably an integer of 3 to 60, more preferably an integer of 3 to 24, and even more preferably an integer of 6 to 12.

It is preferable that a terminal on the oxygen atom side of —$((CH_2)_yCH_2O)$— or —$((CH_2)_yCH(CH_3)O)$— in Formula (Z-4) or Formula (Z-5) is bonded to X.

One kind of compound represented by Formula (Z-4) or Formula (Z-5) may be used singly, or two or more kinds of compounds represented by Formula (Z-4) or Formula (Z-5) may be used in combination. Particularly, an aspect is preferable in which all of six X's in Formula (Z-5) are acryloyl groups. Furthermore, it is preferable to use the compound represented by Formula (Z-5), in which all of six X's are acryloyl groups, in combination with the compound represented by Formula (Z-5) in which at least one of six X's is a hydrogen atom. The curable composition containing the above compound has better developability.

The total content of the compound represented by Formula (Z-4) or Formula (Z-5) in the polymerizable compound is preferably equal to or greater than 20% by mass, and more preferably equal to or greater than 50% by mass.

Among the compounds represented by Formula (Z-4) or Formula (Z-5), either or both of a pentaerythritol derivative and a dipentaerythritol derivative are more preferable.

The polymerizable compound may contain a cardo-skeleton.

As the polymerizable compound containing a cardo-skeleton, a polymerizable compound containing a 9,9-bisarylfluorene skeleton is preferable.

The polymerizable compound containing a cardo-skeleton is not particularly limited, and examples thereof include an ONCOAT EX series (manufactured by NAGASE & CO., LTD.), OGSOL (manufactured by Osaka Gas Chemicals Co., Ltd.), and the like.

[C: Polymerization Initiator]

The curable composition contains a polymerization initiator.

As the polymerization initiator, known polymerization initiators can be used without particular limitation. Examples of the polymerization initiator include a photopolymerization initiator, a thermal polymerization initiator, and the like. Among these, a photopolymerization initiator is preferable. It is also preferable that the polymerization initiator is selected from a polymerization initiator without colorability and a polymerization initiator having high fading properties. As the polymerization initiator, a so-called radical polymerization initiator is preferable.

The content of the polymerization initiator in the curable composition is not particularly limited, but is preferably 0.5% to 20% by mass with respect to the total solid content of the curable composition in general. One kind of polymerization initiator may be used singly, or two or more kinds of polymerization initiators may be used in combination. In a case where two or more kinds of polymerization initiators are used in combination, the total content thereof is preferably within the above range.

Examples of the thermal polymerization initiator include an azo compound such as 2,2'-azobisisobutyronitrile (AIBN), 3-carboxypropionitrile, azobismalenonitrile, or dimethyl-(2,2')-azobis(2-methylpropionate) [V-601] and an organic peroxide such as benzoyl peroxide, lauroyl peroxide, or potassium peroxide.

Examples of the thermal polymerization initiator include the compounds described in "Ultraviolet Curing System", SOGO GIJUTSU CENTER, 1989, pp. 65-148, and the like.

<Photopolymerization Initiator>

It is preferable that the curable composition contains a photopolymerization initiator.

As the photopolymerization initiator, known photopolymerization initiators can be used without particular limitation as long as they can initiate the polymerization of a polymerizable compound. As the photopolymerization initiator, for example, a compound exhibiting photosensitivity in a range of ultraviolet rays to visible rays is preferable. Furthermore, the photopolymerization initiator may be an activator which generates active radicals by interacting in a certain way with a photoexcited sensitizer or an initiator which initiates cationic polymerization according to the type of the polymerizable compound.

Furthermore, it is preferable that the curable composition contains, as a photopolymerization initiator, at least one kind of compound having at least a molar absorption coefficient which is approximately 50 in a range of about 300 to 800 nm (more preferably 330 to 500 nm).

The content of the photopolymerization initiator in the curable composition is not particularly limited, but is preferably 0.5% to 20% by mass with respect to the total solid content of the curable composition in general. One kind of photopolymerization initiator may be used singly, or two or more kinds of photopolymerization initiators may be used in combination. In a case where two or more kinds of photopolymerization initiators are used in combination, the total content thereof is preferably within the above range.

Examples of the photopolymerization initiator include a halogenated hydrocarbon derivative (for example, a halogenated hydrocarbon derivative containing a triazine skeleton, a halogenated hydrocarbon derivative containing an oxadiazole skeleton, or the like), an acyl phosphine compound such as acyl phosphine oxide, hexaaryl biimidazole, an oxime compound such as an oxime derivative, an organic peroxide, a thio compound, a ketone compound, an aromatic onium salt, an aminoacetophenone compound, hydroxyacetophenone, and the like.

Regarding the photopolymerization initiator, for example, paragraphs "0265" to "0268" in JP2013-029760A can be referred to, and the contents of the paragraphs are incorporated into the present specification.

More specifically, as the photopolymerization initiator, for example, the aminoacetophenone-based initiator described in JP1998-291969A (JP-H10-291969A) and the acyl phosphine-based initiator described in JP4225898B can be used. The contents of the above documents are incorporated into the present specification.

As the hydroxyacetophenone compound, for example, it is possible to use IRGACURE-184, DAROCUR-1173, IRGACURE-500, IRGACURE-2959, and IRGACURE-127 (trade names: manufactured by BASF SE), but the present invention is not limited to these.

As the aminoacetophenone compound, for example, it is possible to use commercial products such as IRGACURE-907, IRGACURE-369, and IRGACURE-379EG (trade names: manufactured by BASF SE), but the present invention is not limited to these. As the aminoacetophenone compound, it is also possible to use the compound described in JP2009-191179A whose absorption wavelength is matched with a light source of a long wavelength such as 365 nm, 405 nm, or the like. The content of the above document is incorporated into the present specification.

As the acyl phosphine compound, IRGACURE-819 and IRGACURE-TPO (trade names: manufactured by BASF SE), and the like can be used.

(Oxime Compound)

As the photopolymerization initiator, an oxime ester-based polymerization initiator (oxime ester compound, hereinafter, referred to as "oxime compound" as well) is preferable. The oxime compound has higher sensitivity and higher polymerization efficiency. Consequently, even in a case where the curable composition containing the oxime compound contains a large amount of pigments, the curable composition has better curing properties.

As the oxime compound, it is possible to use the compound described in JP2001-233842A, the compound described in JP2000-080068A, and the compound described in JP2006-342166A. The contents of the above documents are incorporated into the present specification.

Examples of the oxime compound include 3-benzoyloxyiminobutan-2-one, 3-aceotxyiminobutan-2-one, 3-propionyloxyiminobutane-2-one, 2-acetoxyiminopentan-3-one, 2-acetoxyimino-1-phenylpropan-1-one, 2-benzoyloxyimino-1-phenylpropan-1-one, 3-(4-toluenesulfonyloxy)iminobutan-2-one, 2-ethoxycarbonyloxyimino-1-phenylpropan-1-one, and the like.

Examples of the oxime compound also include the compounds described in J. C. S. Perkin II (1979) pp. 1653-1660, J. C. S. Perkin II (1979) pp. 156-162, Journal of Photopolymer Science and Technology (1995) pp. 202-232, JP2000-066385A, JP2000-080068A, JP2004-534797A, and JP2006-342166A, and the like. The contents of the above documents are incorporated into the present specification.

Examples of commercial products of the oxime compound include IRGACURE-OXE01 (manufactured by BASF SE), IRGACURE-OXE02 (manufactured by BASF SE), IRGACURE-OXE03 (manufactured by BASF SE), or IRGACURE-OXE04 (manufactured by BASF SE), TR-PBG-304 (manufactured by TRONLY), ADEKA ARKLS NCI-831 and ADEKA ARKLS NCI-930 (manufactured by ADEKA CORPORATION), N-1919 (carbazole·oxime ester skeleton-containing photoinitiator (manufactured by ADEKA CORPORATION)), NCI-730 (manufactured by ADEKA CORPORATION), and the like.

As oxime compounds other than the above, the compound described in JP2009-519904A in which oxime is linked to N-position of carbazole; the compound described in U.S. Pat. No. 7,626,957B in which a hetero substituent is introduced into a benzophenone moiety; the compound described in JP2010-015025A and US2009/292039A in which a nitro group is introduced into the moiety of a coloring agent; the ketoxime compound described in WO2009/131189A; the compound described in U.S. Pat. No. 7,556,910B that contains a triazine skeleton and an oxime skeleton in the same molecule; the compound described in JP2009-221114A that has absorption maximum wavelength at 405 nm and exhibits excellent sensitivity with respect to a light source of g-line; and the like may also be used.

Furthermore, the compounds described in paragraphs "0274" and "0275" in JP2013-029760A can also be used, and the contents of these paragraphs are incorporated into the present specification.

As the oxime compound, a compound containing a structure represented by Formula (OX-1) is preferable. In the oxime compound, the N—O bond may be an (E) isomer or a (Z) isomer. As the oxime compound, the (E) isomer and the (Z) isomer may be used in combination.

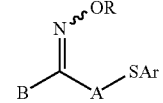

(OX-1)

In Formula (OX-1), R and B each independently represent a monovalent substituent, A represents a divalent organic group, and Ar represents an aryl group.

As the monovalent substituent represented by R in Formula (OX-1), a group of monovalent nonmetallic atoms is preferable.

Examples of the group of monovalent nonmetallic atoms include an alkyl group, an aryl group, an acyl group, an alkoxycarbonyl group, an aryloxycarbonyl group, a heterocyclic group, an alkylthiocarbonyl group, an arylthiocarbonyl group, and the like. These groups may have one or more substituents. Furthermore, each of the substituents may be further substituted with another substituent.

Examples of the substituent include a halogen atom, an aryloxy group, an alkoxycarbonyl group, an aryloxycarbonyl group, an acyloxy group, an acyl group, an alkyl group, an aryl group, and the like.

As the monovalent substituent represented by B in Formula (OX-1), an aryl group, a heterocyclic group, an arylcarbonyl group, or a heterocyclic carbonyl group is preferable, and an aryl group or a heterocyclic group is more preferable. These groups may have one or more substituents. Examples of the substituents are the same as the examples of the aforementioned substituents.

As the divalent organic group represented by A in Formula (OX-1), an alkylene group having 1 to 12 carbon atoms, a cycloalkylene group, or an alkynylene group is preferable. These groups may have one or more substituents. Examples of the substituents include the substituents described above.

As the photopolymerization initiator, a fluorine atom-containing oxime compound can also be used. Specific examples of the fluorine atom-containing oxime compound include the compound described in JP2010-262028A; the compounds 24 and 36 to 40 described in JP2014-500852A; the compound (C-3) described in JP2013-164471A; and the like. The contents of the above documents are incorporated into the present specification.

As the photopolymerization initiator, compounds represented by Formulae (1) to (4) can also be used.

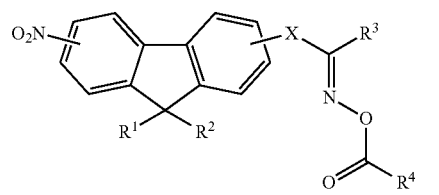

(1)

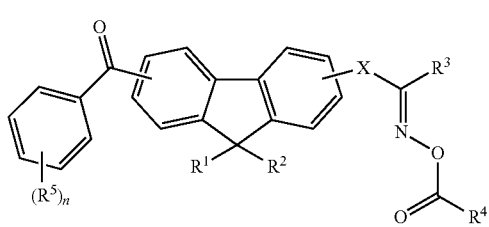

(2)

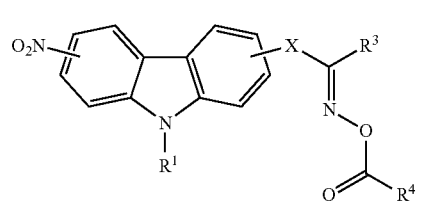

(3)

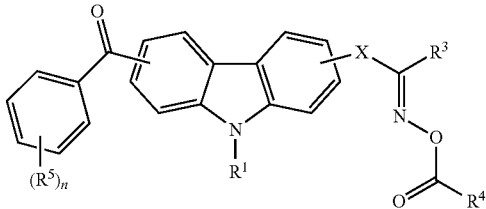

(4)

In Formula (1), $R^1$ and $R^2$ each independently represent an alkyl group having 1 to 20 carbon atoms, an alicyclic hydrocarbon group having 4 to 20 carbon atoms, an aryl group having 6 to 30 carbon atoms, or an aryl alkyl group having 7 to 30 carbon atoms. In a case where each of $R^1$ and $R^2$ each represent a phenyl group, the phenyl groups may form a fluorene group by being bonded to each other. $R^3$ and $R^4$ each independently represent a hydrogen atom, an alkyl group having 1 to 20 carbon atoms, an aryl group having 6 to 30 carbon atoms, an aryl alkyl group having 7 to 30 carbon atoms, or a heterocyclic group having 4 to 20 carbon atoms, and X represents a direct bond or a carbonyl group.

$R^1$, $R^2$, $R^3$, and $R^4$ in Formula (2) have the same definition as $R^1$, $R^2$, $R^3$, and $R^4$ in Formula (1). $R^5$ represents —$R^6$, —$OR^6$, —$SR^6$, —$COR^6$, —$CONR^6R^6$, —$NR^6COR^6$, —$OCOR^6$, —$COOR^6$, —$SCOR^6$, —$OCSR^6$, —$COSR^6$, —$CSOR^6$, —CN, a halogen atom, or a hydroxyl group, $R^6$ represents an alkyl group having 1 to 20 carbon atoms, an aryl group having 6 to 30 carbon atoms, an aryl alkyl group having 7 to 30 carbon atoms, or a heterocyclic group having 4 to 20 carbon atoms, X represents a direct bond or a carbonyl group, and a represents an integer of 0 to 4.

In Formula (3), $R^1$ represents an alkyl group having 1 to 20 carbon atoms, an alicyclic hydrocarbon group having 4 to 20 carbon atoms, an aryl group having 6 to 30 carbon atoms, an aryl alkyl group having 7 to 30 carbon atoms, $R^3$ and $R^4$ each independently represent a hydrogen atom, an alkyl group having 1 to 20 carbon atoms, an aryl group having 6 to 30 carbon atoms, an aryl alkyl group having 7 to 30 carbon atoms, or a heterocyclic group having 4 to 20 carbon atoms, and X represents a direct bond or a carbonyl group.

$R^1$, $R^3$, and $R^4$ in Formula (4) have the same definition as $R^1$, $R^3$, and $R^4$ in Formula (3). $R^5$ represents —$R^6$, —$OR^6$, —$SR^6$, —$COR^6$, —$CONR^6R^6$, —$NR^6COR^6$, —$OCOR^6$, —$COOR^6$, —$SCOR^6$, —$OCSR^6$, —$COSR^6$, —$CSOR^6$, —CN, a halogen atom, or a hydroxyl group, $R^6$ represents an alkyl group having 1 to 20 carbon atoms, an aryl group having 6 to 30 carbon atoms, an aryl alkyl group having 7 to 30 carbon atoms, or a heterocyclic group having 4 to 20 carbon atoms, X represents a direct bond or a carbonyl group, and a represents an integer of 0 to 4.

In Formula (1) and Formula (2), $R^1$ and $R^2$ preferably each independently represent a methyl group, an ethyl group, a n-propyl group, an i-propyl group, a cyclohexyl group, or a phenyl group. $R^3$ preferably represents a methyl group, an ethyl group, a phenyl group, a tolyl group, or a xylyl group. $R^4$ preferably represents an alkyl group having 1 to 6 carbon atoms or a phenyl group. $R^5$ preferably represents a methyl group, an ethyl group, a phenyl group, a tolyl group, or a naphthyl group. X preferably represents a direct bond.

In Formula (3) and Formula (4), $R^1$ preferably each independently represents a methyl group, an ethyl group, a n-propyl group, an i-propyl group, a cyclohexyl group, or a phenyl group. $R^3$ preferably represents a methyl group, an ethyl group, a phenyl group, a tolyl group, or a xylyl group. $R^4$ preferably represents an alkyl group having 1 to 6 carbon atoms or a phenyl group. $R^5$ preferably represents a methyl group, an ethyl group, a phenyl group, a tolyl group, or a naphthyl group. X preferably represents a direct bond.

Specific examples of the compounds represented by Formula (1) and Formula (2) include the compounds described in paragraphs "0076" to "0079" in JP2014-137466A, and the contents of the paragraphs are incorporated into the present specification.

Specific examples of oxime compounds preferably used in the curable composition will be shown below. As the oxime compounds, the compounds described in Table 1 in WO2015/036910A can also be used, and the content of the document is incorporated into the present specification.

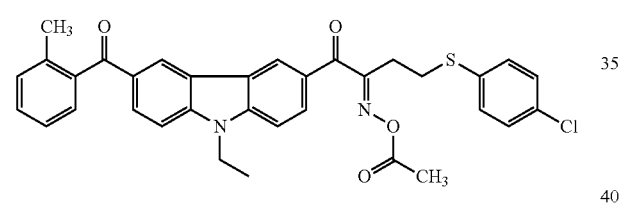
(C-1)

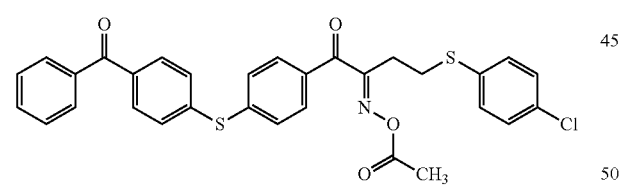
(C-2)

(C-3)

(C-4)

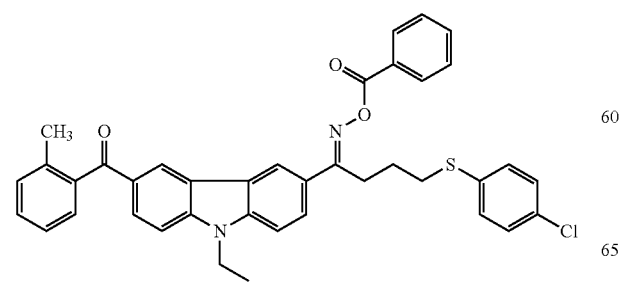

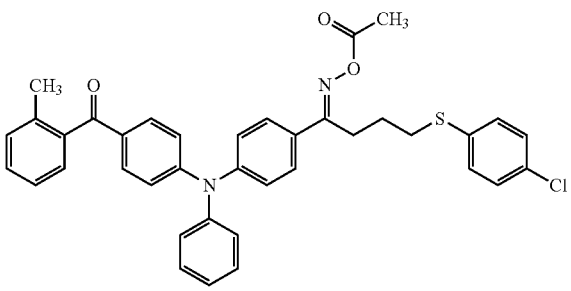
(C-5)

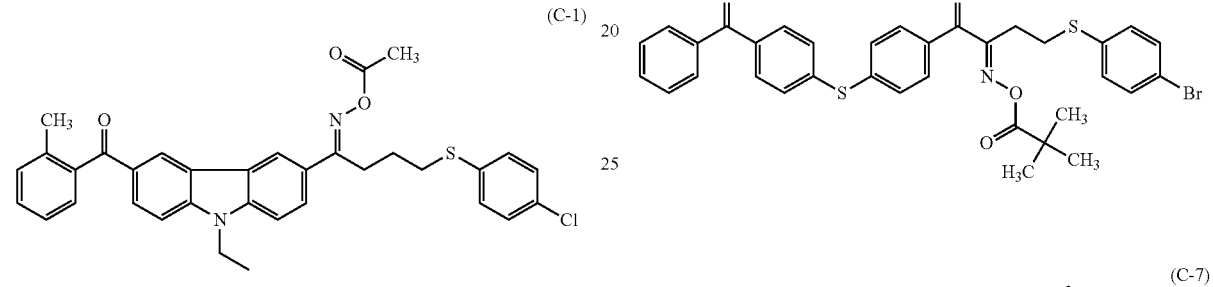
(C-6)

(C-7)

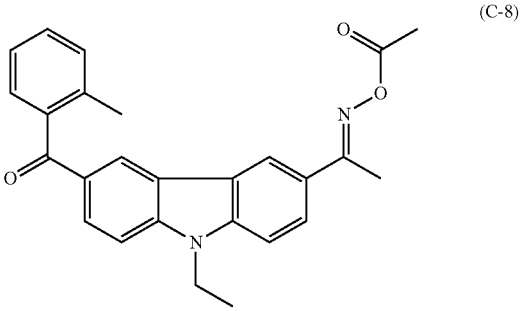
(C-8)

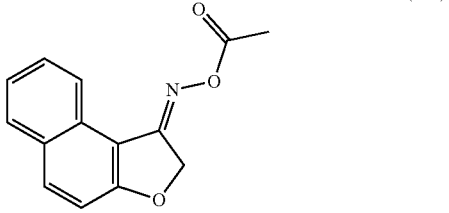
(C-9)

-continued

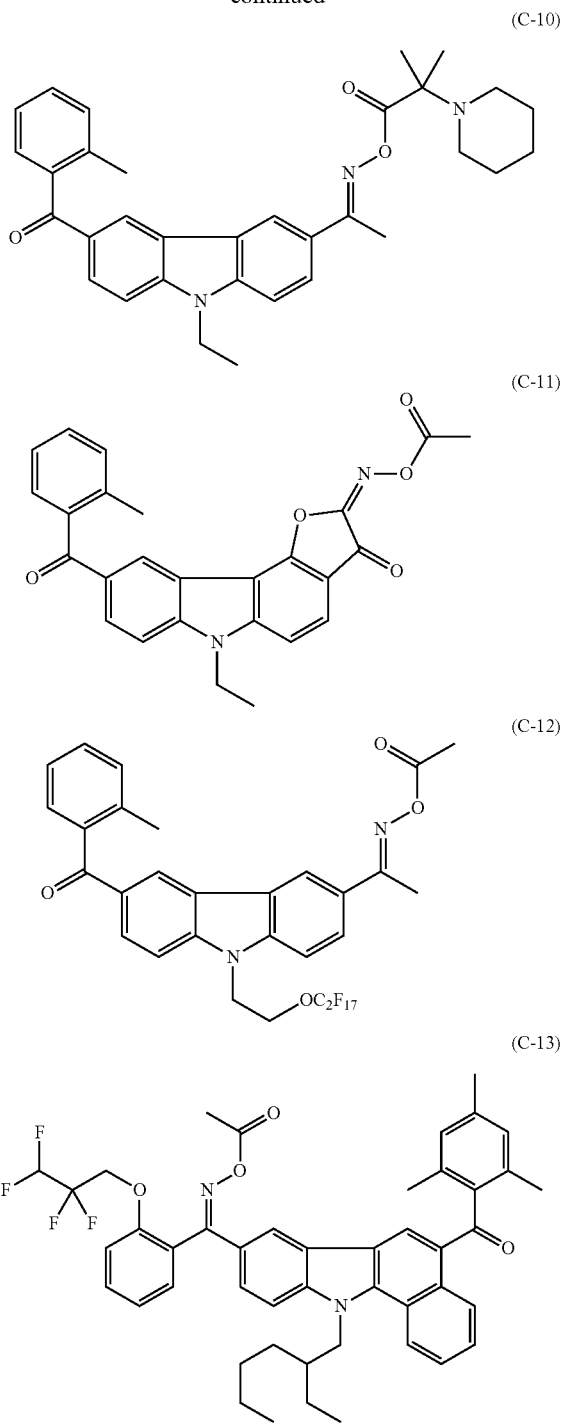

The oxime compound has a maximum absorption wavelength preferably in a range of a wavelength of 350 to 500 nm, and more preferably in a range of a wavelength of 360 to 480 nm. As the oxime compound, a compound having a high absorbance at 365 nm and 405 nm is even more preferable.

From the viewpoint of sensitivity, a molar absorption coefficient of the oxime compound at 365 nm or 405 nm is preferably 1,000 to 300,000, more preferably 2,000 to 300,000, and even more preferably 5,000 to 200,000.

The molar absorption coefficient of a compound can be measured by known methods. For example, it is preferable that the molar absorption coefficient is measured using an ultraviolet/visible spectrophotometer (Cary-5 spectrophotometer manufactured by Varian, Inc.) and an ethyl acetate solvent at a concentration of 0.01 g/L.

If necessary, two or more kinds of photopolymerization initiators may be used in combination.

As the photopolymerization initiator, it is also possible to use the compounds described in paragraph "0052" in JP2008-260927A, paragraphs "0033" to "0037" in JP2010-097210A, and paragraph "0044" in JP2015-068893A, and the contents of the above paragraphs are incorporated into the present specification.

[Optional Components]

The curable composition may contain other components as long as the curable composition brings about the effects of the present invention. Examples of those other components include a resin, a polymerization inhibitor, a solvent, a colorant, a surfactant, and the like. Hereinafter, the optional components incorporated into the curable composition will be specifically described.

<D: Polymerization Inhibitor>

It is preferable that the curable composition contains a polymerization inhibitor. In a case where the curable composition contains a polymerization inhibitor, it is possible to inhibit the polymerizable compound in the curable composition from being unintentionally polymerized. Therefore, the curable composition has better temporal stability. Furthermore, because the unintended polymerization of the polymerizable compound in the curable composition is inhibited, the curable composition has better patterning properties.

As the polymerization inhibitor, known polymerization inhibitors can be used without particular limitation. Examples of the polymerization inhibitor include a phenol-based polymerization inhibitor (for example, p-methoxyphenol, 2,5-di-tert-butyl-4-methylphenol, 2,6-di-tert-butyl-4-methylphenol, 4,4'-thiobis(3-methyl-6-t-butylphenol), 2,2'-methylenebis(4-methyl-6-t-butylphenol), 4-methoxynaphthaol, or the like), a hydroquinone-based polymerization inhibitor (for example, hydroquinone, 2,6-di-tert-butylhydroquinone, or the like); a quinone-based polymerization inhibitor (for example, benzoquinone or the like), a free radical-based polymerization inhibitor (for example, a 2,2,6,6-tetramethylpiperidin-1-oxyl free radical, a 4-hydroxy-2,2,6,6-tetramethylpiperidin-1-oxyl free radical, or the like); a nitrobenzene-based polymerization inhibitor (for example, nitrobenzene, 4-nitrotoluene, or the like); a phenothiazine-based polymerization inhibitor (for example, phenothiazine, 2-methoxyphenothiazine, or the like); and the like.

Among these, in order for the curable composition to have further improved effects of the present invention, a phenol-based polymerization inhibitor or a free radical-based polymerization inhibitor is preferable.

The polymerization inhibitor may be mixed with other components at the time of preparing the curable composition. Alternatively, the polymerization initiator used at the time of synthesizing the aforementioned resin and the like may be mixed with other components together with the resin.

The content of the polymerization inhibitor in the curable composition is not particularly limited. In order for the curable composition to have better temporal stability and better patterning properties, the content of the polymerization inhibitor with respect to the total solid content of the curable composition is preferably 0.00001% to 1% by mass.

One kind of polymerization inhibitor may be used singly, or two or more kinds of polymerization inhibitors may be used in combination. In a case where two or more kinds of polymerization inhibitors are used in combination, the total content thereof is preferably within the above range.

The effect of the polymerization inhibitor becomes apparent in a case where the polymerization inhibitor is used together with a resin containing curable group. For example, even in a case where it is concerned that the resin containing a curable group may be polymerized due to the increase in temperature of a dispersion composition and/or the curable composition in the process of preparing the dispersion composition; after the preparation of the dispersion composition; in the process of preparing the curable composition; after the preparation of the curable composition; and the like or due to the long-term storage, the polymerization inhibitor can be used without any problem.

<E: Resin>

It is preferable that the curable composition contains a resin. Examples of the resin include a dispersant, an alkali-soluble resin, and the like.

The content of the resin in the curable composition is not particularly limited. In order for the curable composition to have better patterning properties, the content of the resin with respect to the total solid content of the curable composition is preferably equal to or greater than 5% by mass, more preferably equal to or greater than 10% by mass, even more preferably equal to or greater than 15% by mass, and particularly preferably equal to or greater than 18% by mass. In order for the curable composition to have better patterning properties, the upper limit of the content of the resin is preferably equal to or smaller than 45% by mass, more preferably equal to or smaller than 40% by mass, and even more preferably less than 40% by mass.

One kind of resin may be used singly, or two or more kinds of resins may be used in combination. In a case where two or more kinds of resins are used in combination, the total content thereof is preferably within the above range.

(E1: Dispersant)

It is preferable that the curable composition contains a dispersant (corresponding to a resin). In the present specification, a dispersant means a compound different from the alkali-soluble resin which will be described later.

The content of the dispersant in the curable composition is not particularly limited. In order for the curable composition to have better temporal stability and better patterning properties, the content of the dispersant with respect to the total solid content of the curable composition is preferably equal to or greater than 5% by mass, and more preferably equal to or greater than 6% by mass. The upper limit of the content of the dispersant is not particularly limited, but is preferably equal to or smaller than 40% by mass and more preferably equal to or smaller than 35% by mass in general.

One kind of dispersant may be used singly, or two or more kinds of dispersants may be used in combination. In a case where two or more kinds of dispersants are used in combination, the total content thereof is preferably within the above range.

As the dispersant, known dispersants can be used without particular limitation.

Examples of the dispersant include a polymer dispersant. Examples of the polymer dispersant include polyamide amine and a salt thereof, polycarboxylic acid and a salt thereof, a high-molecular-weight unsaturated acid ester, modified polyurethane, modified polyester, modified poly(meth)acrylate, a (meth)acrylic copolymer, a naphthalenesulfonic acid formalin condensate, and the like.

Furthermore, as the dispersant, a polyoxyethylene alkyl phosphoric acid ester, polyoxyethylene alkyl amine, a pigment derivative, and the like can be used.

Among these, a polymer compound is preferred as the dispersant. The polymer compound can be further classified into a linear polymer, a terminal-modified polymer, a graft polymer, and a block polymer based on the structure.

(Polymer Compound)

The polymer compound functions to prevent the reaggregation of a substance to be dispersed by being adsorbed onto the surface of inorganic particles (containing metal carbide-containing particles, hereinafter, referred to as "pigment" in some cases). Therefore, as the polymer compound, a terminal-modified polymer, a graft polymer (containing a polymer chain), and a block polymer are preferable which contain a moiety anchored to the pigment surface.

It is preferable that the polymer compound contains a structural unit containing a graft chain. In the present specification, "structural unit" has the same definition as "repeating unit".

The polymer compound which contains the structural unit containing a graft chain exhibits higher affinity with a solvent. Because the polymer compound which contains a structural unit containing a graft chain exhibits higher affinity with a solvent, the polymer compound more easily disperses the pigment and the like and makes it more difficult for the initial dispersion state to change even after the lapse of time after the pigment and the like are dispersed (the polymer compound has better temporal stability). In addition, because the polymer compound which contains a structural unit containing a graft chain contains a graft chain, the polymer compound exhibits higher affinity with the polymerizable compound, which will be described later, and/or other components and the like. Consequently, at the time of alkali development which will be described later, the polymer compound which contains a structural unit containing a graft chain hardly generates residues resulting from an unreacted polymerizable compound and the like.

The longer the graft chain (the larger the formula weight), the stronger the steric repulsion effect, and hence the dispersibility of the pigment and the like is improved. In contrast, in a case where the graft chain is too long, the adsorptivity with respect to the pigment and the like is reduced, and hence the dispersibility of the pigment and the like tends to be reduced. Therefore, the number of atoms (except for hydrogen atoms) constituting the graft chain is preferably 40 to 10,000, more preferably 50 to 2,000, and even more preferably 60 to 500.

Herein, the graft chain means a portion from the base of a main chain of the polymer compound (an atom bonded to the main chain in a group which is branched off the main chain) to the terminal of a group branching off the main chain.

As the graft chain, a polymer chain containing a polymer structure is preferable. The polymer structure that the polymer chain contains is not particularly limited, and examples thereof include a poly(meth)acrylate structure (for example, a poly(meth)acryl structure), a polyester structure, a polyurethane structure, a polyurea structure, a polyamide structure, a polyether structure, and the like.

In order for higher affinity to be exhibited with a polymer chain and a solvent and for the polymer compound to more easily disperse the pigment and the like, the polymer chain preferably contains at least one kind of structure selected from the group consisting of a polyester structure, a polyether structure, and a poly(meth)acrylate structure, and more preferably contains at least one kind of structure selected from the group consisting of a polyester structure and a polyether structure.

As the polyester structure and the polyether structure that the polymer chain has, the following aspects are preferable.

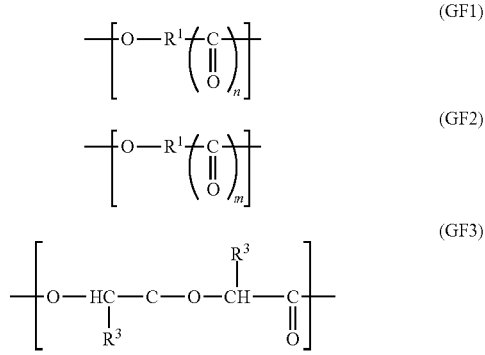

In the above formulae, $R^1$ in Formula (GF1) represents an alkylene group, and n represents 0 or 1. In Formula (GF2), $R^2$ represents an alkylene group different from $R^1$, and m represents 0 or 1. In Formula (GF3), $R^3$ represents an alkyl group.

In order for the curable composition to have better temporal stability, it is preferable that the polymer chain contains at least one kind of structural unit selected from the group consisting of the structural unit represented by Formula (GF1) and the structural units represented by Formula (GF2) and Formula (GF3) among the above.

A macromonomer containing the aforementioned polymer chain (a monomer which contains a polymer structure and constitutes a graft chain by being bonded to the main chain of a polymer compound (for example, a copolymer)) is not particularly limited, and is preferably a macromonomer containing a reactive double bond group.

Examples of commercial macromonomers, which correspond to the structural unit containing a polymer chain contained in the polymer compound and can be used for synthesizing the polymer compound, include AA-6, AA-10, AB-6, AS-6, AN-6, AW-6, AA-714, AY-707, AY-714, AK-5, AK-30, and AK-32 (trade names, manufactured by TOAGOSEI CO., LTD.); BLEMMER PP-100, BLEMMER PP-500, BLEMMER PP-800, BLEMMER PP-1000, BLEMMER 55-PET-800, BLEMMER PME-4000, BLEMMER PSE-400, BLEMMER PSE-1300, and BLEMMER 43PAPE-600B (trade names, manufactured by NOF CORPORATION); and the like.

The aforementioned dispersant preferably contains at least one kind of structure selected from the group consisting of polymethyl acrylate, polymethyl methacrylate, and cyclic or linear polyester, more preferably contains at least one kind of structure selected from the group consisting of polymethyl acrylate, polymethyl methacrylate, and linear polyester, and even more preferably contains at least one kind of structure selected from the group consisting of a polymethyl acrylate structure, a polymethyl methacrylate structure, a polycaprolactone structure, and a polyvalerolactone structure.

The dispersant may contain only one kind of the aforementioned structure in a molecule or plural kinds of the aforementioned structures in a molecule.

The polycaprolactone structure refers to a structure containing a structure, which is obtained by ring opening of ε-caprolactone, as a repeating unit. The polyvalerolactone structure refers to a structure containing a structure, which is obtained by ring opening of δ-valerolactone, as a repeating unit.

Examples of the dispersant containing the polycaprolactone structure include a compound represented by Formula (1) or Formula (2) in which j or k each represents 5. Examples of the dispersant containing the polyvalerolactone structure include a compound represented by Formula (1) or Formula (2) in which j or k each represents 4.

Examples of the dispersant containing a polymethyl acrylate structure include a compound represented by Formula (4) in which $X^5$ represents a hydrogen atom and $R^4$ represents a methyl group.

Examples of the dispersant containing a polymethyl methacrylate structure include a compound represented by Formula (4) in which $X^5$ represents a methyl group and $R^4$ represents a methyl group.

Structural Unit Containing Graft Chain

As the structural unit containing a graft chain that the polymer compound contains, at least one kind of polymer chain-containing structural unit selected from the group consisting of Formula (1) to Formula (4) is preferable, and at least one kind of polymer chain-containing structural unit selected from the group consisting of Formula (1A), Formula (2A), Formula (3A), Formula (3B), and Formula (4) is more preferable.

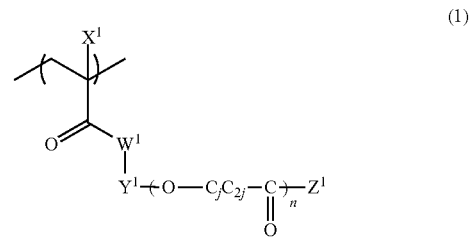

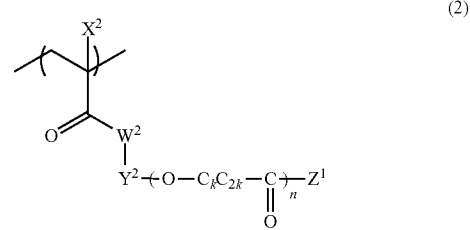

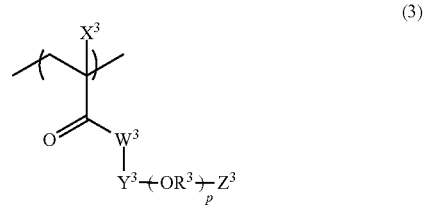

-continued (4)

In Formula (1) to Formula (4), $W^1$, $W^2$, $W^3$, and $W^4$ each independently represent an oxygen atom or NH. Each of $W^1$, $W^2$, $W^3$, and $W^4$ is preferably an oxygen atom.

In Formula (1) to Formula (4), $X^1$, $X^2$, $X^3$, $X^4$, and $X^5$ each independently represent a hydrogen atom or a monovalent organic group. From the viewpoint of the restriction on synthesis, $X^1$, $X^2$, $X^3$, $X^4$, and $X^5$ preferably each independently represent a hydrogen atom or an alkyl group having 1 to 12 carbon atoms, more preferably each independently represent a hydrogen atom or a methyl group, and even more preferably each independently represent a methyl group.

In Formula (1) to Formula (4), $Y^1$, $Y^2$, $Y^3$, and $Y^4$ each independently represent a divalent linking group. The structure of the linking group is not particularly limited. Examples of the divalent linking groups represented by $Y^1$, $Y^2$, $Y^3$, and $Y^4$ include linking groups represented by Formulae (Y-1) to (Y-21), and the like. In Formulae (Y-1) to (Y-21), A and B mean moieties bonded to the left terminal group and the right terminal group in Formula (1) to Formula (4) respectively. Among the following structures, in view of the simplicity of synthesis, (Y-2) or (Y-13) is more preferable.

(Y-1)
(Y-2)
(Y-3)
(Y-4)
(Y-5)
(Y-6)
(Y-7)
(Y-8)
(Y-9)
(Y-10)
(Y-11)
(Y-12)
(Y-13)
(Y-14)
(Y-15)
(Y-16)
(Y-17)
(Y-18)

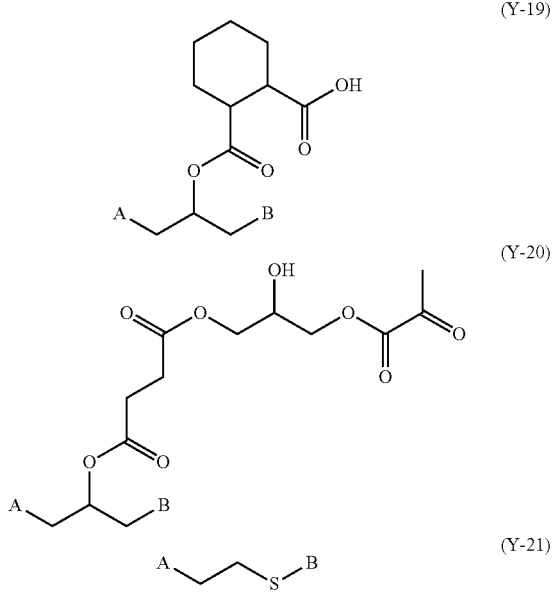

In Formula (1) to Formula (4), $Z^1$, $Z^2$, $Z^3$, and $Z^4$ each independently represent a monovalent organic group. The structure of the organic group is not particularly limited. Examples of the organic group include an alkyl group, a hydroxyl group, an alkoxy group, an aryloxy group, a heteroaryloxy group, an alkyl thioether group, an aryl thioether group, a heteroaryl thioether group, an amino group, and the like.

Particularly, in view of more easily dispersing the pigment and the like, it is preferable that the organic groups represented by $Z^1$, $Z^2$, $Z^3$, and $Z^4$ have a steric repulsion effect. $Z^1$, $Z^2$, $Z^3$, and $Z^4$ more preferably each independently represent an alkyl group or alkoxy group having 5 to 24 carbon atoms, and even more preferably each independently represent a branched alkyl group having 5 to 24 carbon atoms, a cyclic alkyl group having 5 to 24 carbon atoms, or an alkoxy group having 5 to 24 carbon atoms. The alkyl group contained in the alkoxy group may be any of a linear, branched, or cyclic alkyl group.

As the monovalent organic group represented by $Z^1$, $Z^2$, $Z^3$, and $Z^4$ in Formula (1) to Formula (4), in order for the curable composition to have better temporal stability, a curable group-containing group is preferable. The curable group-containing group is not particularly limited, and examples thereof include a group represented by -$L^{CR}$-$R^{CR}$. $R^{CR}$ represents the following curable group, and -$L^{CR}$- represents a divalent linking group having 1 to 20 carbon atoms that may contain a nitrogen atom and/or an oxygen atom.

Examples of the curable group include an ethylenically unsaturated group (for example, a (meth)acryloyl group, a vinyl group, a styryl group, or the like), a cyclic ether group (for example, an epoxy group, an oxetanyl group, or the like), and the like, but the present invention is not limited to these. In view of making it possible to control the polymerization by a radical reaction, as the curable group, an ethylenically unsaturated group is preferable. As the ethylenically unsaturated group, a (meth)acryloyl group is particularly preferable.

In Formula (1) to Formula (4), n, m, p, and q each independently represent an integer of 1 to 500.

In Formula (1) and Formula (2), j and k each independently represent an integer of 2 to 8.

In Formula (1) and Formula (2), in order for the curable composition to have better temporal stability and better developability, j and k preferably each represent an integer of 4 to 6, and more preferably each represent 5.

In Formula (1) and Formula (2), n and m preferably each represent an integer equal to or greater than 10, and more preferably each represent an integer equal to or greater than 20.

In Formula (1), a plurality of units each represented by "—O—$C_jH_{2j}$—C(=O)—" may be the same as or different from each other, and in Formula (2), a plurality of units each represented by "—O—C(=O)—$C_kH_{2k}$—" may be the same as or different from each other. That is, in a case where a plurality of units each represented by "—O—$C_jH_{2j}$—C(=O)—" are different from each other, and a plurality of units each represented by "—O—C(=O)—$C_kH_{2k}$—" are different from each other, these may be bonded to each other in the form of a random copolymer, an alternating copolymer, or a block copolymer. However, in order for the curable composition to have better temporal stability, a block copolymer is preferable.

In Formula (3), $R^3$ represents a branched or linear alkylene group. $R^3$ is preferably an alkylene group having 1 to 10 carbon atoms, and more preferably an alkylene group having 2 or 3 carbon atoms. In a case where p is 2 to 500, a plurality of $R^3$'s may be the same as or different from each other.

In Formula (4), $R^4$ represents a hydrogen atom or a monovalent organic group. The structure of the monovalent organic group is not particularly limited. As $R^4$, for example, a hydrogen atom, an alkyl group, an aryl group, or a heteroaryl group is preferable, and a hydrogen atom or an alkyl group is more preferable.

In a case where $R^4$ represents an alkyl group, as the alkyl group, a linear alkyl group having 1 to 20 carbon atoms, a branched alkyl group having 3 to 20 carbon atoms, or a cyclic alkyl group having 5 to 20 carbon atoms is preferable, a linear alkyl group having 1 to 20 carbon atoms is more preferable, and a linear alkyl group having 1 to 6 carbon atoms is even more preferable. In a case where q in Formula (4) is 2 to 500, a plurality of $X^5$'s and a plurality of $R^4$'s in the structural unit containing a graft chain may be the same as or different from each other respectively.

The polymer compound may contain two or more kinds of graft chain-containing structural units having different structures. That is, the polymer compound may contain structural units represented by Formula (1) to Formula (4) having different structures in a molecule. Furthermore, in a case where n, m, p, and q in Formula (1) to Formula (4) each represent an integer equal to or greater than 2, the compounds represented by Formula (1) and Formula (2) may contain structures, in which j and k represent different numbers, in a side chain, and a plurality of $R^3$'s, $R^4$'s, and $X^5$'s in molecules of the compounds represented by Formula (3) and Formula (4) may be the same as or different from each other.

As the structural unit represented by Formula (1), in order for the curable composition to have better temporal stability and better developability, a structural unit represented by Formula (1A) is more preferable.

Furthermore, as the structural unit represented by Formula (2), in order for the curable composition to have better temporal stability and developability, a structural unit represented by Formula (2A) is more preferable.

(1A)

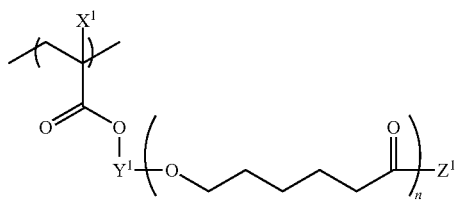

(2A)

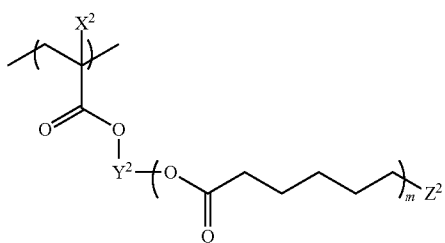

$X^1$, $Y^1$, $Z^1$, and n in Formula (1A) are the same as $X^1$, $Y^1$, $Z^1$, and n in Formula (1) described above. $X^2$, $Y^2$, $Z^2$, and m in Formula (2A) are the same as $X^2$, $Y^2$, $Z^2$, and m in Formula (2) described above.

As the structural unit represented by Formula (1), a structural unit represented by Formula (A1) is also preferable.

(A1)

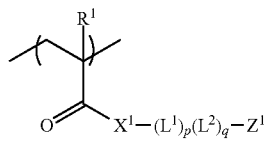

In Formula A1, $R^1$ represents a hydrogen atom or an alkyl group, $X^1$ represents a single bond or a divalent linking group, $L^1$ and $L^2$ may be the same as or different from each other and each represent at least one kind of structural unit selected from the group consisting of Formula (GF1), Formula (GF2), and Formula (GF3), p and q each represents an integer equal to or greater than 1, and $Z^1$ represents a group containing the curable group described above.

In order for the curable composition to have better temporal stability and better developability, as the structural unit represented by Formula (3), a structural unit represented by Formula (3A) or Formula (3B) is more preferable.

(3A)

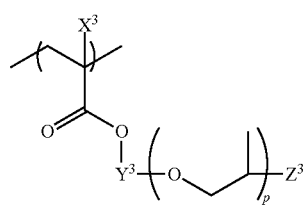

(3B)

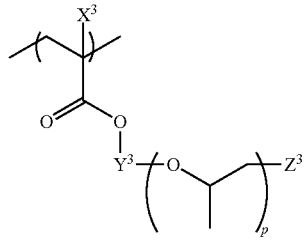

$X^3$, $Y^3$, $Z^3$, and p in Formula (3A) or Formula (3B) are the same as $X^3$, $Y^3$, $Z^3$, and p in Formula (3) described above.

It is more preferable that the polymer compound contains, as a structural unit containing a graft chain, particularly, a polymer chain, a structural unit represented by Formula (1A).

The content of the structural unit containing a graft chain (for example, the structural unit represented by any of Formula (1) to Formula (4)) in the polymer compound that is expressed in terms of mass is preferably 2% to 90% by mass and more preferably within a range of 5% to 30% by mass with respect to the total mass of the polymer compound. In a case where the content of the structural unit containing a graft chain in the polymer compound is within the above range, the dispersant more easily disperses the pigment and the like, and the curable composition has better developability.

Hydrophobic Structural Unit

It is preferable that the polymer compound contains a hydrophobic structural unit different from the structural unit containing a graft chain (that is, a hydrophobic structural unit which does not correspond to the structural unit containing a graft chain). Here, in the present specification, the hydrophobic structural unit is a structural unit which does not contain an acid group (for example, a carboxylic acid group, a sulfonic acid group, a phosphoric acid group, a phenolic hydroxyl group, or the like).

As the hydrophobic structural unit, a structural unit derived from (corresponding to) a compound (monomer) having a C log P value, which will be described later, equal to or greater than 1.2 is preferable, and a structural unit derived from a compound having a C log P value of 1.2 to 8.0 is more preferable.

The C log P value is a value calculated by a program "C LOG P" available from Daylight Chemical Information System, Inc. This program provides a value of "calculated log P" calculated by the fragment approach (see the following documents) of Hansch and Leo. The fragment approach is based on the chemical structure of a compound. In this method, the chemical structure is divided into partial structures (fragments), and degrees of contribution to log P that are assigned to the fragments are summed up, thereby estimating the log P value of the compound. Details of the method are described in the following documents. In the present invention, a C log P value calculated by a program C LOG P v 4.82 is used.

A. J. Leo, Comprehensive Medicinal Chemistry, Vol. 4, C. Hansch, P. G. Sammnens

J. B. Taylor and C. A. Ramsden, Eds., p. 295, Pergamon press, 1990

C. Hansch & A. J. Leo. Substituent Constants For Correlation Analysis in Chemistry and Biology. John Wiley & Sons.

A. J. Leo. Calculating log Poct from structure. Chem. Rev., 93, 1281-1306, 1993.

log P means a common logarithm of a partition coefficient P. log P is a value of physical properties that shows how a certain organic compound is partitioned in an equilibrium of two-phase system consisting of oil (generally, 1-octanol) and water by using a quantitative numerical value. log P is represented by the following formula.

$$\log P = \log(C\text{oil}/C\text{water})$$

In the formula, Coil represents a molar concentration of a compound in an oil phase, and Cwater represents a molar concentration of the compound in a water phase.

The greater the positive log P value based on 0, the higher the oil solubility. The greater the absolute value of negative log P, the higher the water solubility. The value of log P is negatively correlated with the water solubility of an organic compound, and widely used as a parameter for estimating the hydrophilicity and hydrophobicity of an organic compound.

It is preferable that the polymer compound contains, as a hydrophobic structural unit, at least one kind of structural unit selected from the group consisting of structural units derived from monomers represented by Formulae (i) to (iii).

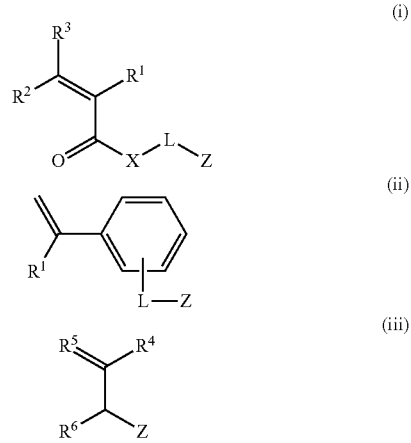

In Formulae (i) to (iii), $R^1$, $R^2$, and $R^3$ each independently represent a hydrogen atom, a halogen atom (for example, a fluorine atom, a chlorine atom, a bromine atom, or the like), or an alkyl group having 1 to 6 carbon atoms (for example, a methyl group, an ethyl group, a propyl group, or the like). As each of $R^1$, $R^2$, and $R^3$, a hydrogen atom or an alkyl group having 1 to 3 carbon atoms is preferable, and a hydrogen atom or a methyl group is more preferable. As each of $R^2$ and $R^3$, a hydrogen atom is even more preferable.

X represents an oxygen atom (—O—) or an imino group (—NH—). X is preferably an oxygen atom.

L represents a single bond or a divalent linking group. Examples of the divalent linking group include a divalent aliphatic group (for example, an alkylene group, a substituted alkylene group, an alkenylene group, a substituted alkenylene group, an alkynylene group, a substituted alkynylene group, or the like), a divalent aromatic group (for example, an arylene group, a substituted arylene group, or the like), a divalent heterocyclic group, an oxygen atom (—O—), a sulfur atom (—S—), an imino group (—NH—), a substituted imino group (—NR$^{31}$—, R$^{31}$ represents an aliphatic group, an aromatic group, or a heterocyclic group), a carbonyl group (—CO—), a combination of these, and the like.

The divalent aliphatic group may contain a cyclic structure or a branched structure. The number of carbon atoms in the aliphatic group is preferably 1 to 20, more preferably 1 to 15, and even more preferably 1 to 10. The aliphatic group may be an unsaturated aliphatic group or a saturated aliphatic group. As the aliphatic group, a saturated aliphatic group is preferable. Furthermore, the aliphatic group may have a substituent. The substituent is not particularly limited, and examples thereof include a halogen atom, an aromatic group, a heterocyclic group, and the like.

The number of carbon atoms in the divalent aromatic group is preferably 6 to 20, more preferably 6 to 15, and even more preferably 6 to 10. Furthermore, the aromatic group may have a substituent. The substituent is not particularly limited, and examples thereof include a halogen atom, an aliphatic group, an aromatic group, a heterocyclic group, and the like.

It is preferable that the divalent heterocyclic group contain, as a heterocyclic ring, a 5-membered ring or a 6-membered ring. The heterocyclic ring may be fused with another heterocyclic ring, aliphatic ring, or aromatic ring. Furthermore, the heterocyclic group may have a substituent. The substituent is not particularly limited, and examples thereof include a halogen atom, a hydroxyl group, an oxo group (=O), a thioxo group (=S), an imino group (=NH), a substituted imino group (=N—R$^{32}$, R$^{32}$ is an aliphatic group, an aromatic group, or a heterocyclic group), an aliphatic group, an aromatic group, a heterocyclic group, and the like.

As L, a single bond, an alkylene group, or a divalent linking group containing an oxyalkylene structure is preferable. The oxyalkylene structure is more preferably an oxyethylene structure or an oxypropylene structure. Furthermore, L may contain a polyoxyalkylene structure which contains two or more repeating oxyalkylene structures. As the polyoxyalkylene structure, a polyoxyethylene structure or a polyoxypropylene structure is preferable. The polyoxyethylene structure is represented by —(OCH$_2$CH$_2$)n-, and n is preferably an integer equal to or greater than 2 and more preferably an integer of 2 to 10.

Examples of Z include an aliphatic group (for example, an alkyl group, a substituted alkyl group, an unsaturated alkyl group, a substituted unsaturated alkyl group, or the like), an aromatic group (for example, an aryl group, a substituted aryl group, an arylene group, a substituted arylene group, or the like), a heterocyclic group, and a combination of these. These groups may contain an oxygen atom (—O—), a sulfur atom (—S—), an imino group (—NH—), a substituted imino group (—NR$^{31}$—, R$^{31}$ represents an aliphatic group, an aromatic group, or a heterocyclic group), or a carbonyl group (—CO—).

The aliphatic group may contain a cyclic structure or a branched structure. The number of carbon atoms in the aliphatic group is preferably 1 to 20, more preferably 1 to 15, and even more preferably 1 to 10. The aliphatic group further contains a ring-aggregated hydrocarbon group or a crosslinked ring-type hydrocarbon group. Examples of the ring-aggregated hydrocarbon group include a bicyclohexyl group, a perhydronaphthalenyl group, a biphenyl group, a 4-cyclohexylphenyl group, and the like. Examples of the crosslinked ring-type hydrocarbon ring include a bicyclic hydrocarbon ring such as a pinane, bornane, norpinane, norbornane, or bicyclooctane ring (a bicyclo[2.2.2]octane ring, a bicyclo[3.2.1]octane ring, or the like); a tricyclic hydrocarbon ring such as adamantane, tricyclo[5.2.1.0$^{2,6}$] decane, or tricyclo[4.3.1.1$^{2,5}$]undecane ring; a tetracyclic hydrocarbon ring such as tetracyclo[4.4.0.1$^{2,5}$.1$^{7,10}$]dodecane or perhydro-1,4-methano-5,8-methanonaphthalene ring; and the like. The crosslinked ring-type hydrocarbon ring also includes a fused ring-type hydrocarbon ring, for example, a fused ring in which a plurality of 5- to 8-membered cycloalkane rings such as perhydronaphthalene (decalin), perhydroanthracene, perhydrophenanthrene, perhydroacenaphthene, perhydrofluorene, perhydroindene, and perhydrophenalene rings are fused.

As the aliphatic group, a saturated aliphatic group is more preferable than an unsaturated aliphatic group. Furthermore, the aliphatic group may have a substituent. Examples of the substituent include a halogen atom, an aromatic group, a heterocyclic group, and the like. Here, the aliphatic group does not contain an acid group as a substituent.

The number of carbon atoms in the aromatic group is preferably 6 to 20, more preferably 6 to 15, and even more preferably 6 to 10. Furthermore, the aromatic group may have a substituent. Examples of the substituent include a halogen atom, an aliphatic group, an aromatic group, a heterocyclic group, and the like. Here, the aromatic group does not contain an acid group as a substituent.

It is preferable that the heterocyclic group contains a 5-membered ring or a 6-membered ring as a heterocyclic ring. Another heterocyclic ring, aliphatic ring, or aromatic ring may be fused with the heterocyclic ring. Furthermore, the heterocyclic group may have a substituent. Examples of the substituent include a halogen atom, a hydroxyl group, an oxo group (=O), a thioxo group (=S), an imino group (=NH), a substituted imino group (=N—R$^{32}$, R$^{32}$ is an aliphatic group, an aromatic group, or a heterocyclic group), an aliphatic group, an aromatic group, a heterocyclic group, and the like. Here, the heterocyclic group does not have an acid group as a substituent.

In Formula (iii), R$^4$, R$^5$, and R$^6$ each independently represent a hydrogen atom, a halogen atom (for example, a fluorine atom, a chlorine atom, a bromine atom, or the like), an alkyl group having 1 to 6 carbon atoms (for example, a methyl group, an ethyl group, a propyl group, or the like), Z, or L-Z. L and Z have the same definition as L and Z described above. As R$^4$, R$^5$, and R$^6$, a hydrogen atom or an alkyl group having 1 to 3 carbon atoms is preferable, and a hydrogen atom is more preferable.

As the monomer represented by Formula (i), a compound is preferable in which R$^1$, R$^2$, and R$^3$ each represent a hydrogen atom or a methyl group, L represents a single bond, an alkylene group, or a divalent linking group containing an oxyalkylene structure, X represents an oxygen atom or an imino group, and Z represents an aliphatic group, a heterocyclic group, or an aromatic group.

As the monomer represented by Formula (ii), a compound is preferable in which R$^1$ represents a hydrogen atom or a methyl group, L represents an alkylene group, and Z represents an aliphatic group, a heterocyclic group, or an aromatic group. As the monomer represented by Formula (iii), a compound is preferable in which R$^4$, R$^5$, and R$^6$ each represent a hydrogen atom or a methyl group, and Z represents an aliphatic group, a heterocyclic group, or an aromatic group.

Examples of typical compounds represented by Formulae (i) to (iii) include radically polymerizable compounds such as acrylic acid esters, methacrylic acid esters, and styrenes.

Regarding typical compounds represented by Formula (i) to (iii), the compounds described in paragraphs "0089" to "0093" in JP2013-249417A can be referred to, and the contents of the paragraphs are incorporated into the present specification.

The content of the hydrophobic structural unit with respect to the total mass of the polymer compound is preferably 10% to 90% by mass, and more preferably 20% to 80% by mass. In a case where the content of the hydrophobic structural unit is within the above range, the curable composition has a better pattern forming performance.

Structural Unit Containing Functional Group Capable of Interacting with Pigment and the Like.

A functional group capable of interacting with the pigment and the like can be introduced into the polymer compound. It is preferable that the polymer compound further contains a structural unit which contains a functional group capable of interacting with the pigment and the like.

Examples of the functional group capable of interacting with the pigment and the like include an acid group, a basic group, a coordinating group, a reactive functional group, and the like.

In a case where the polymer compound contains an acid group, a basic group, a coordinating group, or a reactive functional group, it is preferable that the polymer compound contains each of a structural unit containing an acid group, a structural unit containing a basic group, a structural unit containing a coordinating group, or a reactive structural unit.

Particularly, in a case where the polymer compound further contains, as an acid group, an alkali-soluble group such as a carboxylic acid group, developability for forming a pattern by alkali development can be imparted to the polymer compound.

That is, in a case where an alkali-soluble group is introduced into the polymer compound, in the curable composition, the polymer compound as a dispersant making a contribution to the dispersion of the pigment and the like also has alkali solubility. The curable composition containing such a polymer compound has better alkali developability (an unexposed portion is more easily dissolved by alkali development), and the obtained cured film has better light blocking properties.

The polymer compound containing an acid group exhibits higher affinity with the solvent which will be described later. Accordingly, the curable composition which contains the polymer compound containing an acid group has better coating properties.

Presumably, this is because the acid group in the structural unit containing an acid group may easily interact with the pigment and the like, the polymer compound may stably disperse the pigment and the like, the viscosity of the polymer compound dispersing the pigment and the like may be reduced, and hence the polymer compound may also be easily dispersed in a stable manner.

The structural unit containing an alkali-soluble group as an acid group may be the same as or different from the structural unit containing a graft chain described above.

In the present specification, the structural unit containing an alkali-soluble group as an acid group means a structural unit different from the hydrophobic structural unit described above (that is, the structural unit does not correspond to the hydrophobic structural unit).

Among functional groups capable of interacting with the pigment and the like, examples of acid groups include a carboxylic acid group, a sulfonic acid group, a phosphoric acid group, a phenolic hydroxyl group, and the like. Among these, at least one kind of acid group selected from the group consisting of a carboxylic acid group, a sulfonic acid group, and a phosphoric acid group is preferable, and a carboxylic acid group is more preferable because this group exhibits higher adsorptivity with respect to the pigment and the like and has better dispersibility.

That is, it is preferable that the polymer compound further contains a structural unit which contains at least one kind of acid group selected from the group consisting of a carboxylic acid group, a sulfonic acid group, and a phosphoric acid group.

The polymer compound may have one kind of structural unit containing an acid group or two or more kinds of structural units containing an acid group.

The polymer compound may or may not contain the structural unit containing an acid group.

In the polymer compound, the content of the structural unit containing an acid group with respect to the total mass of the polymer compound is preferably 5% to 80% by mass, and more preferably 10% to 60% by mass in view of further inhibiting the image intensity from being damaged by alkali development.

Among the functional groups capable of interacting with the pigment and the like, examples of basic groups include a primary amino group, a secondary amino group, a tertiary amino group, a hetero ring containing a N atom, an amide group, and the like. Among these, a tertiary amino group is preferable because this exhibits higher adsorptivity with respect to the pigment and the like and has better dispersibility. The polymer compound may contain one kind of basic group or two or more kinds of basic groups. The polymer compound may or may not contain the structural unit containing a basic group.

In the polymer compound, the content of the structural unit containing a basic group with respect to the total mass of the polymer compound is preferably 0.01% to 50% by mass, and more preferably 0.01% to 30% by mass because that the curable composition has better developability (because then it is more difficult for the alkali development to be hindered).

Among the functional groups capable of interacting with the pigment and the like, examples of coordinating groups and reactive functional groups include an acetyl acetoxy group, a trialkoxysilyl group, an isocyanate group, an acid anhydride, an acid chloride, and the like. Among these, acetyl acetoxy group is preferable because this exhibits higher adsorptivity with respect to the pigment and the like and more easily disperses the pigment and the like. The polymer compound may contain one kind of coordinating group and one kind of reactive functional group, or contain two or more kinds of coordinating groups and reactive functional groups. The polymer compound may or may not contain both the structural unit containing a coordinating group and the structural unit containing a reactive functional group.

In the polymer compound, the content of the structural unit containing a coordinating group and the reactive functional group with respect to the total mass of the polymer compound is preferably 10% to 80% by mass, and more preferably 20% to 60% by mass because that the curable composition has better developability (because then it is more difficult for the alkali development to be hindered).

In a case where the polymer compound contains the functional group capable of interacting with the pigment and the like in addition to the graft chain, the polymer compound just need to contain the functional group capable of interacting with the pigment and the like, and the way the functional group is introduced into the polymer compound is not particularly limited. It is preferable that the polymer compound contains one or more kind of structural units selected from structural units derived from monomers represented by Formulae (iv) to (vi).

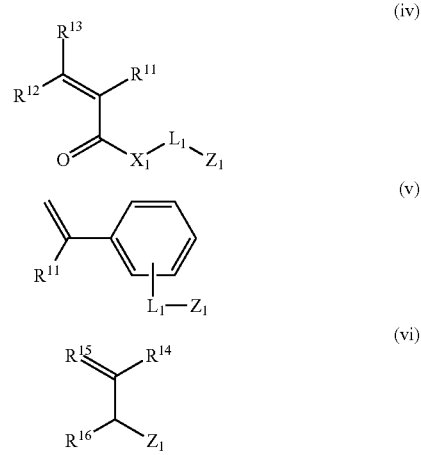

In Formula (iv) to Formula (vi), $R^{11}$, $R^{12}$, and $R^{13}$ each independently represent a hydrogen atom, a halogen atom (for example, a fluorine atom, a chlorine atom, a bromine atom, or the like), or an alkyl group having 1 to 6 carbon atoms (for example, a methyl group, an ethyl group, a propyl group, or the like).

In Formula (iv) to Formula (vi), $R^{11}$, $R^{12}$, and $R^{13}$ preferably each independently represent a hydrogen atom or an alkyl group having 1 to 3 carbon atoms, and more preferably each independently represent a hydrogen atom or a methyl group. In Formula (iv), $R^{12}$ and $R^{13}$ are even more preferably each represent a hydrogen atom.

In Formula (iv), $X_1$ represents an oxygen atom (—O—) or an imino group (—NH—), and preferably represents an oxygen atom.

In Formula (v), Y represents a methine group or a nitrogen atom.

In Formula (iv) to Formula (v), $L_1$ represents a single bond or a divalent linking group. The divalent linking group has the same definition as the divalent linking group represented by L in Formula (i) described above.

As $L_1$, a single bond, an alkylene group, or a divalent linking group containing an oxyalkylene structure is preferable. As the oxyalkylene structure, an oxyethylene structure or an oxypropylene structure is more preferable. Furthermore, $L_1$ may contain a polyoxyalkylene structure containing two or more repeating oxyalkylene structures. As the polyoxyalkylene structure, a polyoxyethylene structure or a polyoxypropylene structure is preferable. The polyoxyethylene structure is represented by —(OCH$_2$CH$_2$)n-, and n is preferably an integer equal to or greater than 2 and more preferably an integer of 2 to 10.

In Formula (iv) to Formula (vi), $Z_1$ represents a functional group capable of interacting with the pigment and the like other than a graft chain. As $Z_1$, a carboxylic acid group and a tertiary amino group are preferable, and a carboxylic acid group is more preferable.

In Formula (vi), $R^{14}$, $R^{15}$, and $R^{16}$ each independently represent a hydrogen atom, a halogen atom (for example, a fluorine atom, a chlorine atom, a bromine atom, or the like), an alkyl group having 1 to 6 carbon atoms (for example, a methyl group, an ethyl group, a propyl group, or the like), —$Z_1$, or $L_1$-$Z_1$. $L_1$ and $Z_1$ have the same definition as $L_1$ and $Z_1$ described above, and preferred examples thereof are also the same. $R^{14}$, $R^{15}$, and $R^{16}$ preferably each independently represent a hydrogen atom or an alkyl group having 1 to 3 carbon atoms, and more preferably each independently represent a hydrogen atom.

As the monomer represented by Formula (iv), a compound is preferable in which $R^{11}$, $R^{12}$, and $R^{13}$ each independently represent a hydrogen atom or a methyl group, $L_1$ represents an alkylene group or a divalent linking group containing an oxyalkylene structure, $X_1$ represents an oxygen atom or an imino group, and $Z_1$ represents a carboxylic acid group.

As the monomer represented by Formula (v), a compound is preferable in which $R^{11}$ represents a hydrogen atom or a methyl group, $L_1$ represents an alkylene group, $Z_1$ represents a carboxylic acid group, and Y represents a methine group.

As the monomer represented by Formula (vi), a compound is preferable in which $R^{14}$, $R^{15}$, and $R^{16}$ each independently represent a hydrogen atom or a methyl group, $L_1$ represents a single bond or an alkylene group, and $Z_1$ represents a carboxylic acid group.

Typical examples of the monomers (compounds) represented by Formula (iv) to Formula (vi) are as below.

Examples of the monomers include methacrylic acid, crotonic acid, isocrotonic acid, a product of a reaction between a compound containing an addition polymerizable double bond and a hydroxyl group in a molecule (for example, 2-hydroxyethyl methacrylate) and succinic acid anhydride, a product of a reaction between a compound containing an addition polymerizable double bond and a hydroxyl group in a molecule and phthalic acid anhydride, a product of a reaction between a compound containing an addition polymerizable double bond and a hydroxyl group in a molecule and tetrahydrophthalic acid anhydride, a product of a reaction between a compound containing an addition polymerizable double bond and a hydroxyl group in a molecule and trimellitic acid anhydride, a product of a reaction between a compound containing an addition polymerizable double bond and a hydroxyl group in a molecule and pyromellitic acid anhydride, acrylic acid, an acrylic acid dimer, an acrylic acid oligomer, maleic acid, itaconic acid, fumaric acid, 4-vinylbenzoic acid, vinyl phenol, 4-hydroxyphenyl methacrylamide, and the like.

In the polymer compound, from the viewpoint of the interaction with the pigment and the like, the temporal stability, and the permeability with respect to a developer, the content of the structural unit containing a functional group capable of interacting with the pigment and the like with respect to the total mass of the polymer compound is preferably 0.05% to 90% by mass, more preferably 1.0% to 80% by mass, and even more preferably 10% to 70% by mass.

Other Structural Units

For the purpose of improving various performances such as image intensity, as long as the effects of the present invention are not impaired, the polymer compound may further contain other structural units (for example, a structural unit containing a functional group or the like having affinity with the solvent used in a dispersed composition, and the like) that are different from the structural unit containing a graft chain, the hydrophobic structural unit, and the structural unit containing a functional group capable of interacting with the pigment and the like.

Examples of those other structural units include structural units derived from radically polymerizable compounds selected from the group consisting of acrylonitriles and methacrylonitriles, and the like.

The polymer compound may contain one kind of those other structural units or two or more kinds of those other structural units.

In the polymer compound, the content of those other structural units with respect to the total mass of the polymer compound is preferably 0% to 80% by mass, and more preferably 10% to 60% by mass. In a case where the content of those other structural units is 0% to 80% by mass, the curable composition has better pattern forming properties.

Physical Properties of Polymer Compound

The acid value of the polymer compound is not particularly limited, but is preferably 0 to 250 mgKOH/g, more preferably 10 to 200 mgKOH/g, and even more preferably 20 to 120 mgKOH/g.

In a case where the acid value of the polymer compound is equal to or lower than 250 mgKOH/g, the peeling of the cured film from a substrate that occurs in the development step, which will be described later, is further inhibited. In a case where the acid value of the polymer compound is equal to or higher than 10 mgKOH/g, the curable composition has better alkali developability.

In a case where the acid value of the polymer compound is equal to or higher than 20 mgKOH/g, the precipitation of the pigment and the like in the curable composition is further inhibited, and the number of coarse particles is further reduced. Consequently, the curable composition has better temporal stability.

The acid value of the polymer compound can be calculated, for example, from the average content of acid groups in the polymer compound. Furthermore, by changing the content of the acid group-containing structural unit in the polymer compound, a polymer compound having the desired acid value can be obtained.

In order for the curable composition to have better developability and in order to make it more difficult for the obtained cured film to be peeled in the development step, the weight-average molecular weight of the polymer compound that is determined by Gel Permeation Chromatography (GPC) and expressed in terms of polystyrene is preferably 4,000 to 300,000, more preferably 5,000 to 200,000, even more preferably 6,000 to 100,000, and particularly preferably 10,000 to 50,000.

GPC is based on a method of using HLC-8020GPC (manufactured by Tosoh Corporation), TSKgel SuperHZM-H, TSKgel SuperHZ4000, and TSKgel SuperHZ2000 (manufactured by Tosoh Corporation, 4.6 mmID×15 cm) as columns, and tetrahydrofuran (THF) as an eluent. The polymer compound can be synthesized based on known methods.

Specific examples of the polymer compound include "DA-7301" manufactured by Kusumoto Chemicals. Ltd., "Disperbyk-101 (polyamidoamine phosphate), 107 (carboxylic acid ester), 110 (copolymer containing an acid group), 111 (phosphoric acid-based dispersant), 130 (polyamide), 161, 162, 163, 164, 165, 166, 170, and 190 (polymeric copolymer)" and "BYK-P104 and P105 (high-molecular-weight unsaturated polycarboxylic acid)" manufactured by BYKChemie GmbH, "EFKA 4047, 4050 to 4010 to 4165 (based on polyurethane), EFKA 4330 to 4340 (block copolymer), 4400 to 4402 (modified polyacrylate), 5010 (polyester amide), 5765 (high-molecular-weight carboxylate), 6220 (aliphatic polyester), 6745 (phthalocyanine derivative), and 6750 (azo pigment derivative)" manufactured by EFKA, "AJISPER PB821, PB822, PB880, and PB881" manufactured by Ajinomoto Fine-Techno Co., Inc., "FLOWLEN TG-710 (urethane oligomer)" and "POLY-FLOW No. 50E, No. 300 (acrylic copolymer)" manufactured by KYOEISHA CHEMICAL Co., LTD, "DISPARLON KS-860, 873SN, 874, #2150 (aliphatic polyvalent carboxylic acid), #7004 (polyether ester), DA-703-50, DA-705, and DA-725" manufactured by Kusumoto Chemicals. Ltd., "DEMOL RN, N (naphthalenesulfonic acid formalin polycondensate), MS, C, and SN-B (aromatic sulfonic acid formalin polycondensate)", "HOMOGENOL L-18 (polymeric polycarboxylic acid)", "EMULGEN 920, 930, 935, and 985 (polyoxyethylene nonylphenyl ether)", and "ACETAMIN 86 (stearylamine acetate)" manufactured by Kao Corporation, "SOLSPERSE 5000 (phthalocyanine derivative), 22000 (azo pigment derivative), 13240 (polyester amine), 3000, 12000, 17000, 20000, 27000 (polymer containing a functional portion on a terminal portion), 24000, 28000, 32000, and 38500 (graft copolymer)" manufactured by Lubrizol Japan Limited, "NIKKOL T106 (polyoxyethylene sorbitan monooleate), and MYS-IEX (polyoxyethylene monostearate)" manufactured by Nikko Chemicals Co., Ltd., HINOACT T-8000E and the like manufactured by Kawaken Fine Chemicals Co., Ltd., an organosiloxane polymer KP-341 manufactured by Shin-Etsu Chemical Co., Ltd., "W001: cationic surfactant" manufactured by Yusho Co., Ltd., nonionic surfactants such as polyoxyethylene lauryl ether, polyoxyethylene stearyl ether, polyoxyethylene oleyl ether, polyoxyethylene octyl phenyl ether, polyoxyethylene nonyl phenyl ether, polyethylene glycol dilaurate, polyethylene glycol distearate, and a sorbitan fatty acid ester, anionic surfactants such as "W004, W005, and W017", polymer dispersants such as "EFKA-46, EFKA-47, EFKA-47EA, EFKA polymer 100, EFKA polymer 400, EFKA polymer 401, and EFKA polymer 450" manufactured by MORISHITA & CO., LTD., and "DISPERSE AID 6, DISPERSE AID 8, DISPERSE AID 15, and DISPERSE AID 9100" manufactured by SAN NOPCO LIMITED, "ADEKA PLURONIC L31, F38, L42, L44, L61, L64, F68, L72, P95, F77, P84, F87, P94, L101, P103, F108, L121, and P-123" manufactured by ADEKA CORPORATION, "IONET (trade name) S-20" manufactured by Sanyo Chemical Industries, Ltd., and the like. Furthermore, ACRYBASE FFS-6752, ACRYBASE FFS-187, ACRYCURE RD-F8, and CYCLOMER P can also be used.

Furthermore, it is also possible to use DISPERBYK-130, DISPERBYK-140, DISPERBYK-142, DISPERBYK-145, DISPERBYK-180, DISPERBYK-187, DISPERBYK-191, DISPERBYK-2001, DISPERBYK-2010, DISPERBYK-2012, DISPERBYK-2025, and BYK-9076 manufactured by BYKChemie GmbH, AJISPER PB821, AJISPER PB822, and AJISPER PB881 manufactured by Ajinomoto Fine-Techno Co., Inc., and the like.

One kind of these polymer compounds may be used singly, or two or more kinds of these polymer compounds may be used in combination.

As the polymer compound, the compounds described in paragraphs "0127" to "0129" in JP2013-249417A can also be used, and the contents of the paragraphs are incorporated into the present specification.

Furthermore, as a dispersant, it is also possible to use the graft copolymers described in paragraphs "0037" to "0115" in JP2010-106268A (paragraphs "0075" to "0133" in US2011/0124824A corresponding to JP2010-106268A), and the contents of the paragraphs are incorporated into the present specification.

In addition, as a dispersant, it is also possible to use the polymer compounds described in paragraphs "0028" to "0084" in JP2011-153283A (paragraphs "0075" to "0133" in US2011/0279759A corresponding to JP2011-153283A) that contain a constituent component containing a side chain structure formed by bonding of acidic groups through a linking group, and the contents of the paragraphs are incorporated into the present specification.

Moreover, as a dispersant, the resins described in paragraphs "0033" to "0049" in JP2016-109763A can also be used, and the contents of the paragraphs are incorporated into the present specification.

(E2: Alkali-Soluble Resin)

It is preferable that the curable composition contains an alkali-soluble resin (corresponding to a resin). In the present specification, the alkali-soluble resin means a resin which contains a group promoting alkali solubility (alkali-soluble group) and is different from the dispersant described above.

The content of the alkali-soluble resin in the curable composition is not particularly limited. In order for the curable composition to have better patterning properties, the content of the alkali-soluble resin with respect to the total solid content of the curable composition is preferably equal to or greater than 0.1% by mass, more preferably equal to or greater than 0.5% by mass, even more preferably equal to or greater than 2.0% by mass, and particularly preferably equal to or greater than 7.3% by mass. The upper limit of the content of the alkali-soluble resin is not particularly limited, but is preferably equal to or smaller than 30% by mass in general.

One kind of alkali-soluble resin may be used singly, or two or more kinds of alkali-soluble resins may be used in combination. In a case where two or more kinds of alkali-soluble resins are used in combination, the total content thereof is preferably within the above range.

Examples of the alkali-soluble resin include a resin containing at least one alkali-soluble group in a molecule. Examples thereof include a polyhydroxystyrene resin, a polysiloxane resin, a (meth)acryl resin, a (meth)acrylamide resin, a (meth)acryl/(meth)acrylamide copolymer resin, an epoxy-based resin, a polyimide resin, and the like.

Specific examples of the alkali-soluble resin include a copolymer of an unsaturated carboxylic acid and an ethylenically unsaturated compound.

The unsaturated carboxylic acid is not particularly limited, and examples thereof include monocarboxylic acids such as (meth)acrylic acid, crotonic acid, and vinyl acetate; dicarboxylic acid such as itaconic acid, maleic acid, or fumaric acid or an acid anhydride of these; polyvalent carboxylic acid monoesters such as mono(2-(meth)acryloyloxyethyl)phthalate; and the like.

Examples of copolymerizable ethylenically unsaturated compounds include methyl (meth)acrylate and the like. Furthermore, it is also possible to use the compounds described in paragraph "0027" in JP2010-097210A and paragraphs "0036" and "0037" in JP2015-068893A, and the contents of the paragraphs are incorporated into the present specification.

Furthermore, copolymerizable ethylenically unsaturated compounds containing an ethylenically unsaturated group on a side chain may also be used in combination. As the ethylenically unsaturated group, a (meth)acrylic acid group is preferable. An acrylic resin containing an ethylenically unsaturated group on a side chain can be obtained, for example, by addition-reacting a carboxylic acid group of an acrylic resin containing a carboxylic acid group with an ethylenically unsaturated compound containing a glycidyl group or an alicyclic epoxy group.

As the alkali-soluble resin, for example, it is possible to use the radical polymer containing a carboxylic acid group on a side chain described in JP1984-044615A (JP-S59-044615A), JP1979-034327B (JP-S54-034327B), JP1983-

012577B (JP-S58-012577B), JP1979-025957B (JP-S54-025957B), JP1979-092723A (JP-S54-092723A), JP1984-053836A (JP-S59-053836A), and JP1984-071048A (JP-S59-071048A); the acetal-modified polyvinyl alcohol-based binder resin containing an alkali-soluble group described in EP993966B, EP1204000B, and JP2001-318463A; polyvinyl pyrrolidone; polyethylene oxide; polyether as a product of a reaction between alcohol-soluble nylon, 2,2-bis-(4-hydroxyphenyl)-propane, and epichlorohydrin; the polyimide resin described in WO2008/123097A; and the like.

As the alkali-soluble resin, the compounds described in paragraphs "0225" to "0245" in JP2016-075845A can also be used, and the contents of the paragraphs are incorporated into the present specification.

As the alkali-soluble resin, a polyimide precursor can also be used. The polyimide precursor means a resin obtained by causing an addition polymerization reaction between a compound containing an acid anhydride group and a diamine compound at a temperature of 40° C. to 100° C.

Examples of the polyimide precursor include a resin containing a repeating unit represented by Formula (1). For example, the polyimide precursor has an amic acid structure represented by Formula (2) and an imide structure represented by Formula (3) obtained in a case where imide ring opening occurs in a portion of an amic acid structure and/or represented by Formula (4) obtained in a case where imide ring opening occurs in the entirety of an amic acid structure.

In the present specification, the polyimide precursor having an amic acid structure is referred to as polyamic acid in some cases.

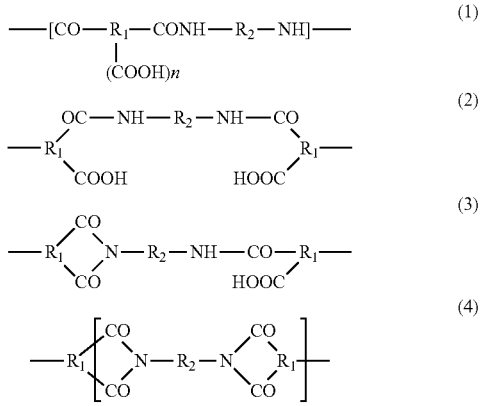

In Formulae (1) to (4), $R_1$ represents a quadrivalent organic group having 2 to 22 carbon atoms, $R_2$ represents a divalent organic group having 1 to 22 carbon atoms, and n represents 1 or 2.

Examples of the polyimide precursor include the compounds described in paragraphs "0011" to "0031" in JP2008-106250A, the compounds described in paragraphs "0022" to "0039" in JP2016-122101A, the compounds described in paragraphs "0061" to "0092" in JP2016-068401A, and the like. The contents of the paragraphs are incorporated into the present specification.

In view of the better pattern shape of the cured film obtained from the curable composition, it is preferable that the alkali-soluble resin contains at least one kind of component selected from the group consisting of a polyimide resin and a polyimide precursor.

As the polyimide resin containing the alkali-soluble resin, known polyimide resins containing the alkali-soluble group can be used without particular limitation. Examples of the polyimide resin include the resin described in paragraph "0050" in JP2014-137523A, the resin described in paragraph "0058" in JP2015-187676A, the resin described in paragraphs "0012" and "0013" in JP2014-106326A, and the like. The contents of the paragraphs are incorporated into the present specification.

<F: Surfactant>

It is preferable that the curable composition contains a surfactant. The curable composition containing a surfactant has better coating properties.

The content of the surfactant in the curable composition is not particularly limited. The content of the surfactant with respect to the total solid content of the curable composition is preferably 0.001% to 2.0% by mass.

One kind of surfactant may be used singly, or two or more kinds of surfactants may be used in combination. In a case where two or more kinds of surfactants are used in combination, the total content thereof is preferably within the above range.

Examples of the surfactant include a fluorine-based surfactant, a nonionic surfactant, a cationic surfactant, an anionic surfactant, a silicone-based surfactant, and the like.

For example, in a case where the curable composition contains a fluorine-based surfactant, the liquid characteristics (particularly, fluidity) of the curable composition are further improved. That is, in a case where a curable composition layer is formed on a substrate by using the curable composition containing the fluorine-based surfactant, the interfacial tension between the substrate and the curable composition is reduced, and accordingly, the wettability with respect to the substrate is improved, and the coating properties of the curable composition are improved. Therefore, even in a case where a curable composition layer having a thickness of about several micrometers is formed of a small amount of the curable composition, a curable composition layer having a more uniform thickness and small thickness unevenness can be formed.

The content of fluorine in the fluorine-based surfactant is not particularly limited, but is preferably 3% to 40% by mass, more preferably 5% to 30% by mass, and even more preferably 7% to 25% by mass. In a case where a curable composition, which contains a fluorine-based surfactant with a fluorine content of 3% to 40% by mass, is used, a curable composition layer having a more uniform thickness can be formed. As a result, the curable composition has better liquid saving properties. Furthermore, in a case where the fluorine content is within the above range, the fluorine-based surfactant is more easily dissolved in the curable composition.

Examples of the fluorine-based surfactant include MEGAFACE F171, MEGAFACE F172, MEGAFACE F173, MEGAFACE F176, MEGAFACE F177, MEGAFACE F141, MEGAFACE F142, MEGAFACE F143, MEGAFACE F144, MEGAFACE R30, MEGAFACE F437, MEGAFACE F475, MEGAFACE F479, MEGAFACE F482, MEGAFACE F554, and MEGAFACE F780 (manufactured by DIC Corporation), FLUORAD FC430, FLUORAD FC431, and FLUORAD FC171 (manufactured by Sumitomo 3M Limited), SURFLON S-382, SURFLON SC-101, SURFLON SC-103, SURFLON SC-104, SURFLON SC-105, SURFLON SC-1068, SURFLON SC-381, SURFLON SC-383, SURFLON S-393, and SURFLON KH-40 (manufactured by ASAHI GLASS CO., LTD.), PF636, PF656, PF6320, PF6520, and PF7002 (manufactured by OMNOVA Solutions Inc.), and the like.

As the fluorine-based surfactant, a block polymer can also be used. For example, the compounds described in JP2011-089090A can also be used, and the content of the document is incorporated into the present specification.

<Solvent>

It is preferable that the curable composition contains a solvent. As the solvent, known solvents can be used without particular limitation.

The content of the solvent in the curable composition is not particularly limited. Generally, the content of the solvent is preferably adjusted such that the content becomes 20% to 90% by mass with respect to the solid contents of the curable composition, and more preferably adjusted such that the content becomes 25% to 50% by mass with respect to the solid contents of the curable composition.

One kind of solvent may be used singly, or two or more kinds of solvents may be used in combination. In a case where two or more kinds of solvents are used in combination, it is preferable that the content thereof is adjusted such that the total solid content of the curable composition falls into the above range.

Examples of the solvent include water and an organic solvent.

Examples of the organic solvent include acetone, methyl ethyl ketone, cyclohexane, ethyl acetate, ethylene dichloride, tetrahydrofuran, toluene, ethylene glycol monomethyl ether, ethylene glycol monoethyl ether, ethylene glycol dimethyl ether, propylene glycol monomethyl ether, propylene glycol monoethyl ether, acetyl acetone, cyclohexanone, cyclopentanone, diacetone alcohol, ethylene glycol monomethyl ether acetate, ethylene glycol ethyl ether acetate, ethylene glycol monoisopropyl ether, ethylene glycol monobutyl ether acetate, 3-methoxypropanol, methoxymethoxy ethanol, diethylene glycol monomethyl ether, diethylene glycol monoethyl ether, diethylene glycol dimethyl ether, diethylene glycol diethyl ether, propylene glycol monomethyl ether acetate, propylene glycol monoethyl ether acetate, 3-methoxypropyl acetate, N,N-dimethylformamide, dimethyl sulfoxide, γ-butyrolactone, butyl acetate, methyl lactate, N-methyl-2-pyrrolidone, ethyl lactate, and the like, but the present invention is not limited to these.

<Colorant>

The curable composition may contain a colorant. In the present specification, the colorant means a compound different from inorganic particles. Particularly, a metal complex pigment (for example, Pigment Yellow 117, 129, 150, 153, or the like which will be described later) is classified as an organic pigment and is not included in the inorganic particles described above.

As the colorant, various known pigments (coloring pigments) and dyes (coloring dyes) can be used. Examples of the pigments include organic pigments.

In a case where the curable composition contains a colorant, the content of the colorant can be determined according to the optical characteristics of the cured film to be obtained. Furthermore, one kind of colorant may be used singly, or two or more kinds of colorants may be used in combination.

Organic Pigment

Examples of organic pigments include Color Index (C. I.) Pigment Yellow 1, 2, 3, 4, 5, 6, 10, 11, 12, 13, 14, 15, 16, 17, 18, 20, 24, 31, 32, 34, 35, 35:1, 36, 36:1, 37, 37:1, 40, 42, 43, 53, 55, 60, 61, 62, 63, 65, 73, 74, 77, 81, 83, 86, 93, 94, 95, 97, 98, 100, 101, 104, 106, 108, 109, 110, 113, 114, 115, 116, 117, 118, 119, 120, 123, 125, 126, 127, 128, 129, 137, 138, 139, 147, 148, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 213, 214, and the like, C. I. Pigment Orange 2, 5, 13, 16, 17:1, 31, 34, 36, 38, 43, 46, 48, 49, 51, 52, 55, 59, 60, 61, 62, 64, 71, 73, and the like, C. I. Pigment Red 1, 2, 3, 4, 5, 6, 7, 9, 10, 14, 17, 22, 23, 31, 38, 41, 48:1, 48:2, 48:3, 48:4, 49, 49:1, 49:2, 52:1, 52:2, 53:1, 57:1, 60:1, 63:1, 66, 67, 81:1, 81:2, 81:3, 83, 88, 90, 105, 112, 119, 122, 123, 144, 146, 149, 150, 155, 166, 168, 169, 170, 171, 172, 175, 176, 177, 178, 179, 184, 185, 187, 188, 190, 200, 202, 206, 207, 208, 209, 210, 216, 220, 224, 226, 242, 246, 254, 255, 264, 270, 272, 279, and the like;

C. I. Pigment Green 7, 10, 36, 37, 58, 59, and the like;

C. I. Pigment Violet 1, 19, 23, 27, 32, 37, 42, and the like;

C. I. Pigment Blue 1, 2, 15, 15:1, 15:2, 15:3, 15:4, 15:6, 16, 22, 60, 64, 66, 79, 80, and the like. One kind of pigment may be used singly, or two or more kinds of pigments may be used in combination.

(Dye)

As the dye, for example, it is possible to use the coloring agents disclosed in JP1989-090403A (JP-S64-090403A), JP1989-091102A (JP-S64-091102A), JP1989-094301A (JP-H01-094301A), JP1994-011614A (JP-H06-011614A), JP2592207B, U.S. Pat. No. 4,808,501A, 5,667,920A, US05/059,50A, JP1993-333207A (JP-H05-333207A), JP1994-035183A (JP-H06-035183A), JP1994-051115A (JP-H06-051115A), JP1994-194828A (JP-H06-194828A), and the like. The contents of the above documents are incorporated into the present specification.

As dyes sorted based on the chemical structure, it is possible to use a pyrazole azo compound, a pyrromethene compound, an anilinoazo compound, a triphenylmethane compound, an anthraquinone compound, a benzylidene compound, an oxonol compound, a pyrazolotriazole azo compound, a pyridone azo compound, a cyanine compound, a phenothiazine compound, a pyrrolopyrazole azomethine compound, and the like. Furthermore, a coloring agent multimer may also be used. Examples of the coloring agent multimer include the compounds described in JP2011-213925A and JP2013-041097A. In addition, a polymerizable dye containing a polymerizable group in a molecule can also be used, and examples thereof include commercial products such as an RDW series manufactured by Wako Pure Chemical Industries, Ltd.

(Infrared Absorber)

The aforementioned colorant may further contain an infrared absorber. The infrared absorber means a component different from the inorganic particles described above.

In the present specification, the infrared absorber means a compound absorbing light having a wavelength in an infrared range (preferably at a wavelength of 650 to 1,300 nm). The infrared absorber is preferably a compound having a maximum absorption wavelength in a range of a wavelength of 675 to 900 nm.

Examples of compounds having such spectral characteristics include a pyrrolopyrrole compound, a copper compound, a cyanine compound, a phthalocyanine compound, an iminium compound, a thiol complex-based compound, a transition metal oxide-based compound, a squarylium compound, a naphthalocyanine compound, a quaterrylene compound, a dithiol metal complex-based compound, a croconium compound, and the like.

As the phthalocyanine compound, the naphthalocyanine compound, the iminium compound, the cyanine compound, the squarylium compound, and the croconium compound, the compounds described in paragraphs "0010" to "0081" in JP2010-111750A can also be used, and the contents of the paragraphs are incorporated into the present specification. Regarding the cyanine compound, for example, "Functional Dyes, Makoto Okawara/Masaru Matsuoka/Teijiro Kitao/Tsuneaki Hirashima, Kodansha Scientific Ltd." can be referred to, and the content of this document is incorporated into the present specification.

As the colorant having the spectral characteristics described above, it is possible to use the compound described in paragraphs "0004" to "0016" in JP1995-164729A (JP-H07-164729A), the compound described in paragraphs "0027" to "0062" in JP2002-146254A, and the near-infrared absorption particles described in paragraphs "0034" to "0067" in JP2011-164583A that are formed of crystallites of an oxide containing Cu and/or P and have a number-average aggregated particle diameter of 5 to 200 nm. The contents of the paragraphs are incorporated into the present specification.

As the compound having a maximum absorption wavelength in a range of a wavelength of 675 to 900 nm, at least one kind of compound selected from the group consisting of a cyanine compound, a pyrrolopyrrole compound, a squarylium compound, a phthalocyanine compound, and a naphthalocyanine compound is preferable.

Furthermore, the infrared absorber is preferably a compound which dissolves in an amount equal to or greater than 1% by mass in water at 25° C., and more preferably a compound which dissolves in an amount equal to or greater than 10% by mass in water at 25° C. In a case where such a compound is used, solvent resistance becomes excellent.

Regarding the pyrrolopyrrole compound, paragraphs "0049" to "0062" in JP2010-222557A can be referred to, and the contents of the paragraphs are incorporated into the present specification. Regarding the cyanine compound and the squarylium compound, paragraphs "0022" to "0063" in WO2014/088063A, paragraphs "0053" to "0118" in WO2014/030628A, paragraphs "0028" to "0074" in JP2014-059550A, paragraphs "0013" to "0091" in WO2012/169447A, paragraphs "0019" to "0033" in JP2015-176046A, paragraphs "0053" to "0099" in JP2014-063144A, paragraphs "0085" to "0150" in JP2014-052431A, paragraphs "0076" to "0124" in JP2014-044301A, paragraphs "0045" to "0078" in JP2012-008532A, paragraphs "0027" to "0067" in JP2015-172102A, paragraphs "0029" to "0067" in JP2015-172004A, paragraphs "0029" to "0085" in JP2015-040895A, paragraphs "0022" to "0036" in JP2014-126642A, paragraphs "0011" to "0017" in JP2014-148567A, paragraphs "0010" to "0025" in JP2015-157893A, paragraphs "0013" to "0026" in JP2014-095007A, paragraphs "0013" to "0047" in JP2014-080487A, paragraphs "0007" to "0028" in JP2013-227403A, and the like can be referred to, and the contents of the paragraphs are incorporated into the present specification.

The content of the colorant in the curable composition is not particularly limited, but is preferably 0.0001% to 70% by mass with respect to the total solid content of the curable composition in general. One kind of colorant may be used singly, or two or more kinds of colorants may be used in combination. In a case where two or more kinds of colorants are used in combination, the total content thereof is within the above range.

<Ultraviolet Absorber>

The curable composition may contains an ultraviolet absorber. In a case where the curable composition contains an ultraviolet absorber, a cured film obtained from the composition has a better pattern shape (finer pattern shape).

As the ultraviolet absorber, it is possible to use ultraviolet absorbers based on salicylate, benzophenone, benzotriazole, substituted acrylonitrile, triazine, and the like.

For examples, as the ultraviolet absorber, the compounds described in paragraphs "0137" to "0142" in JP2012-068418A (paragraphs "0251" to "0254" in US2012/0068292A corresponding to JP2012-068418A) can be used, and the contents of the paragraphs can be adopted and incorporated into the present specification.

In addition, a diethylamino-phenylsulfonyl-based ultraviolet absorber (manufactured by DAITO CHEMICAL CO., LTD., trade name: UV-503) and the like can also be used.

As the ultraviolet absorber, the compounds described in paragraphs "0134" to "0148" in JP2012-032556A can also be used, and the contents of the paragraphs are incorporated into the present specification.

The content of the ultraviolet absorber in the curable composition is not particularly limited. Generally, the content of the ultraviolet absorber with respect to the total solid content of the curable composition is preferably 0.001% to 15% by mass, more preferably 0.01% to 10% by mass, and even more preferably 0.1% to 5% by mass.

<Silane Coupling Agent>

The curable composition may contain a silane coupling agent.

In the present specification, the silane coupling agent means a compound containing the following hydrolyzable group and other functional groups in a molecule. The hydrolyzable group refers to a substituent which is directly bonded to a silicon atom and can form a siloxane bond by a hydrolysis reaction and/or a condensation reaction. Examples of the hydrolyzable group include a halogen atom, an alkoxy group, an acyloxy group, and an alkenyloxy group directly bonded to a silicon atom. In a case where the hydrolyzable group contains carbon atoms, the number of carbon atoms is preferably equal to or smaller than 6, and more preferably equal to or smaller than 4. Particularly, an alkoxy group having 4 or less carbon atoms or an alkenyloxy group having 4 or less carbon atoms is preferable.

It is preferable that the silane coupling agent contains none of the silicon atoms and fluorine atoms other than the silicon atom bonded to the hydrolyzable group. In a case where a cured film is formed on a substrate by using the curable composition containing the silane coupling agent, the cured film exhibits higher adhesiveness with respect to the substrate.

In the curable composition, the content of the silane coupling agent with respect to the total solid content in the curable composition is preferably 0.1% to 10% by mass, more preferably 0.5% to 8% by mass, and even more preferably 1.0% to 6% by mass.

One kind of silane coupling agent may be used singly, or two or more kinds of silane coupling agents may be used in combination. In a case where two or more kinds of silane coupling agents are used in combination, the total content thereof is preferably within the above range.

[Manufacturing Method of Curable Composition]

The curable composition can be prepared by mixing together the aforementioned components by known mixing methods (for example, mixing methods using a stirrer, a homogenizer, a high-pressure emulsification device, a wet-type pulverizer, a wet-type disperser, and the like). At the time of preparing the curable composition, the components may be mixed together at once. Alternatively, each of the components may be dissolved or dispersed in a solvent, and then sequentially mixed together. The order of components mixed in and the operation conditions are not particularly limited.

For the purpose of removing foreign substances, reducing defects, and the like, it is preferable that the curable composition is filtered through a filter. As the filter, known filters can be used without particular limitation.

The material of the filter is not particularly limited. For example, the filter may be formed of a fluororesin such as polytetrafluoroethylene (PTFE), a polyamide-based resin such as nylon, and a polyolefin-based resin such as polyethylene or polypropylene (PP). Among these, a filter formed of polypropylene (including high-density polypropylene) or nylon is preferable.

The pore size of the filter is not particularly limited. Generally, the pore size is preferably 0.1 to 7.0 µm, more preferably 0.2 to 2.5 µm, even more preferably 0.2 to 1.5 µm, and particularly preferably 0.3 to 0.7 µm. In a case where the pore size is within the above range, it is possible to reliably remove fine foreign substances such as impurities and aggregates contained in the pigment while preventing the inorganic particles (containing metal carbide-containing particles) from clogging the filter.

At the time of using filters, different filters may be used in combination. At this time, filtering performed using a first filter may be carried out only once or twice or more. In a case where filtering is performed twice or more by using a combination of different filters, the pore size of the filter used in the second filtering is preferably the same as or larger than the pore size of the filter used in the first filtering. In addition, filters formed of the same material and having different pore sizes may be combined. Regarding the pore size, the nominal pore size of the filter manufacturer can be referred to.

Examples of commercial filters include filters from Pall Corporation Japan, Advantac Toyo Kaisha, Ltd., Nihon Entegris K.K. (former MICRONIX JAPAN CO., LTD.), KITZ MICRO FILTER CORPORATION, and the like.

As a second filter, a filter formed of the same material as the first filter described above and the like can be used. The pore size of the second filter is not particularly limited. Generally, the pore size of the second filter is preferably 0.2 to 10.0 µm, more preferably 0.2 to 7.0 µm, and even more preferably 0.3 to 6.0 µm.

It is preferable that the curable composition substantially does not contain impurities such as a metal (particles and ions), a metal salt containing halogen, an acid, and an alkali. In the present specification, "substantially does not contain" means that the impurities are undetectable by the following measurement method.

The content of the impurity contained in the curable composition, the aforementioned components, the aforementioned filter, and the like is not particularly limited. The content of the impurity with respect to the total mass of each of the curable composition, the aforementioned component, the aforementioned filter, and the like is preferably equal to or smaller than 1 mass ppm, more preferably equal to or smaller than 1 mass ppb, even more preferably equal to or smaller than 100 mass ppt, and particularly preferably equal to or smaller than 10 mass ppt. It is most preferable that the curable composition, the aforementioned components, the aforementioned filter, and the like substantially do not contain the impurity.

The content of the impurity can be measured using an inductively coupled plasma mass spectrometer (manufactured by Yokogawa Analytical Systems, Inc., Agilent 7500cs model).

ppm represents parts per million, ppb represents parts per billion, and ppt represents parts per trillion.

[Cured Film and Manufacturing Method of Cured Film]

The cured film according to an embodiment of the present invention is a cured film obtained by curing the aforementioned curable composition. The thickness of the cured film is not particularly limited, but is preferably 0.2 to 7 µm and more preferably 0.4 to 5 µm in general.

The aforementioned thickness is an average thickness which is a value determined by measuring the thickness of the cured film at any 5 or more sites and calculating an arithmetic mean thereof.

The manufacturing method of the cured film is not particularly limited, and examples thereof include a method of coating a substrate with the curable composition so as to form a coating film and performing a curing treatment on the coating film so as to manufacturing a cured film.

The method of the curing treatment is not particularly limited, and examples thereof include a photocuring treatment and a thermal curing treatment. In view of easily forming a pattern, a photocuring treatment (particularly, a curing treatment performed by irradiation with actinic rays or radiation) is preferable.

The cured film according to the embodiment of the present invention is a cured film obtained by curing a curable composition layer formed using the curable composition.

The manufacturing method of the cured film is not particularly limited, but preferably includes the following steps.

Curable composition layer forming step

Exposure step

Development step

Hereinafter, each of the steps will be described.

<Curable Composition Layer Forming Step>

The curable composition layer forming step is a step of forming a curable composition layer by using the curable composition. Examples of the step of forming a curable composition layer by using the curable composition include a step of coating a substrate with the curable composition so as to form a curable composition layer.

The type of the substrate is not particularly limited. In a case where the substrate is used in a solid-state imaging element, examples of the substrate include a silicon substrate. In a case where the substrate is used in a color filter (including a color filter for a solid-state imaging element), examples of the substrate include a glass substrate (glass wafer), and the like.

As the method for coating a substrate with the curable composition, it is possible to use various coating methods such as spin coating, slit coating, injection method, spray coating, spin coating, cast coating, roll coating, and a screen printing method.

The curable composition with which the substrate is coated is generally formed into a curable composition layer by being dried under the condition of a temperature of 70° C. to 150° C. for about 1 to 4 minutes.

<Exposure Step>

In the exposure step, the curable composition layer formed in the curable composition layer forming step is subjected to exposure by being irradiated with actinic rays or radiation through a photomask comprising a pattern-like opening portion such that only the curable composition layer irradiated with light is cured.

It is preferable to perform exposure by the irradiation of radiation. It is preferable to use ultraviolet rays such as g-line, h-line, and i-line. As a light source, a high-pressure mercury lamp is preferable. The irradiation intensity is not particularly limited, but is preferably 5 to 1,500 mJ/cm$^2$ and more preferably 10 to 1,000 mJ/cm$^2$ in general.

<Development Step>

After the exposure step, a development treatment (development step) is performed such that a portion not being irradiated with light in the exposure step is eluted in a developer. In this way, only a portion cured by light remains on the substrate.

The developer is not particularly limited, and examples thereof include alkaline developers. Among these, an organic alkaline developer is preferable.

The development conditions are not particularly limited. The development temperature is generally preferably 20° C. to 40° C., and the development time is generally preferably 20 to 180 seconds.

The aqueous alkaline solution (alkaline developer) is not particularly limited. Examples of alkaline compounds to be incorporated into inorganic alkaline developers include sodium hydroxide, potassium hydroxide, sodium carbonate, sodium hydrogen carbonate, sodium silicate, sodium metasilicate, and the like.

The content of the above compound in the aqueous alkaline solution is not particularly limited. Generally, the content of the above compound with respect to the total mass of the aqueous alkaline solution is preferably 0.001% to 10% by mass, and more preferably 0.005% to 0.5% by mass.

Examples of alkaline compounds incorporated into the organic alkaline developers include ammonia, ethylamine, diethylamine, dimethylethanolamine, tetramethylammonium hydroxide, tetraethylammonium hydroxide, tetrapropylammonium hydroxide, tetrabutylammonium hydroxide, benzyltrimethylammonium hydroxide, choline, pyrrole, piperidine, 1,8-diazabicyclo-[5,4,0]-7-undecen, and the like.

The content of the above compound in the aqueous alkaline solution is not particularly limited. Generally, the content of the above compound with respect to the total mass of the aqueous alkaline solution is preferably 0.001% to 10% by mass, and more preferably 0.005% to 0.5% by mass.

The aqueous alkaline solution may contain a water-soluble organic solvent such as methanol or ethanol. Furthermore, the aqueous alkaline solution may contain a surfactant.

In a case where the aqueous alkaline solution described above is used as a developer, it is preferable to rinse the cured film with pure water after development.

The manufacturing method of a cured film may further include other steps.

Those other steps are not particularly limited, and can be appropriately selected according to the purpose.

Examples of those other steps include a substrate surface treatment step, a pre-baking step, a post-baking step, and the like.

The heating temperature in the pre-baking step and the post-baking step is not particularly limited, but is preferably 80° C. to 300° C. in general.

The heating time in the pre-baking step and the post-baking step is not particularly limited, but is preferably 30 to 300 seconds.

[Physical Properties of Cured Film]

OD(Optical Density)

In view of obtaining better light blocking properties, an optical density (OD) of the cured film per film thickness of 1.0 μm in a wavelength range of 320 to 1,200 nm is preferably equal to or higher than 2.0, more preferably equal to or higher than 3.0, and even more preferably equal to or higher than 4.0. The upper limit of OD is not particularly limited, but is preferably equal to or lower than 10 in general.

In the present specification, the optical density means a value measured by the method described in Examples. Furthermore, in the present specification, having an optical density equal to or higher than 3.0 per film thickness of 1.0 μm in a wavelength range of 320 to 1,200 nm means that the optical density is equal to or higher than 3.0 per film thickness of 1.0 μm in the entire range of a wavelength of 320 to 1,200 nm.

It is preferable that the cured film has a rough surface structure. In a case where the cured film has a rough surface structure, the light reflectivity of the cured film can be reduced. The cured film may have a rough structure on a surface thereof. Alternatively, a coating film may be disposed on the cured film so as to impart a rough structure. The shape of the rough surface structure is not particularly limited, but it is preferable that the surface roughness thereof is within a range of 0.55 to equal to or lower than 1.5 μm.

The light reflectivity of the cured film is preferably equal to or lower than 5%, more preferably equal to or lower than 3%, and even more preferably equal to or lower than 2%.

The method for preparing the rough surface structure is not particularly limited, and examples thereof include a method of incorporating an organic filler and/or an inorganic filler into the cured film or a coating film; a method of roughening the surface of the cured film and/or a coating film by means of a lithography method, an etching method, a sputtering method, or a nanoimprinting method; and the like.

Examples of the method for reducing the light reflectivity of the cured film include a method of disposing a film of low refractive index on the cured film; a method of disposing a film having a different refractive index (for example, a film of high refractive index) on a film of low refractive index; and a method of forming a low-optical-density layer and a high-optical-density layer described in JP2015-001654A for example.

The cured film is suitable for a light blocking member, a light blocking film, an antireflection member, and an antireflection film of optical filters and modules used in portable instruments such as a personal computer, a tablet PC, a mobile phone, a smartphone, and a digital camera; office automation (OA) instruments such as a printer composite machine and a scanner; industrial instruments such as monitoring camera, a barcode reader, an automated teller machine (ATM), a high-speed camera, an instrument having a personal authentication function exploiting face image recognition; camera instruments for automobile use; medical camera instruments such as an endoscope, a capsule endoscope, and a catheter; a biometric sensor, a military reconnaissance camera, a camera for a three-dimensional map, a camera for observing weather and sea, a camera for land resource investigation, space instruments such as an exploration camera for the astronomy of the universe and a deep space target; and the like.

The cured film can also be used in a micro light emitting diode (LED), a micro organic light emitting diode (OLED), and the like. The cured film is suitable for an optical filter and an optical film used in the micro LED and the micro OLED and for a member to which a light blocking function or an antireflection function is to be imparted.

Examples of the micro LED and the micro OLED include those described in JP2015-500562A and JP2014-533890A.

The cured film is suitable as an optical filter and an optical film used in a quantum dot display. Furthermore, the cured film is suitable as a member to which a light blocking function or an antireflection function is to be imparted.

Examples of the quantum dot display include those described in US2013/0335677A, US2014/0036536A, US2014/0036203A, and US2014/0035960A.

[Solid-State Imaging Device and Solid-State Imaging Element]

The solid-state imaging device and the solid-state imaging element according to an embodiment of the present invention include the cured film described above. The aspect in which the solid-state imaging element includes the cured film is not particularly limited. For example, a constitution may be adopted in which a plurality of photodiodes and light-receiving elements formed of polysilicon or the like constituting a light-receiving area of a solid-state imaging element (a CCD image sensor, a CMOS image sensor, or the like) are provided on a substrate, and solid-state imaging element comprises the cured film on a surface side of a support on which the light-receiving elements are formed (for example, a portion other than light-receiving portions and/or pixels for adjusting color, and the like) or on a side opposite to the surface on which the light-receiving elements are formed.

The solid-state imaging device includes the aforementioned solid-state imaging element.

Figure 2:
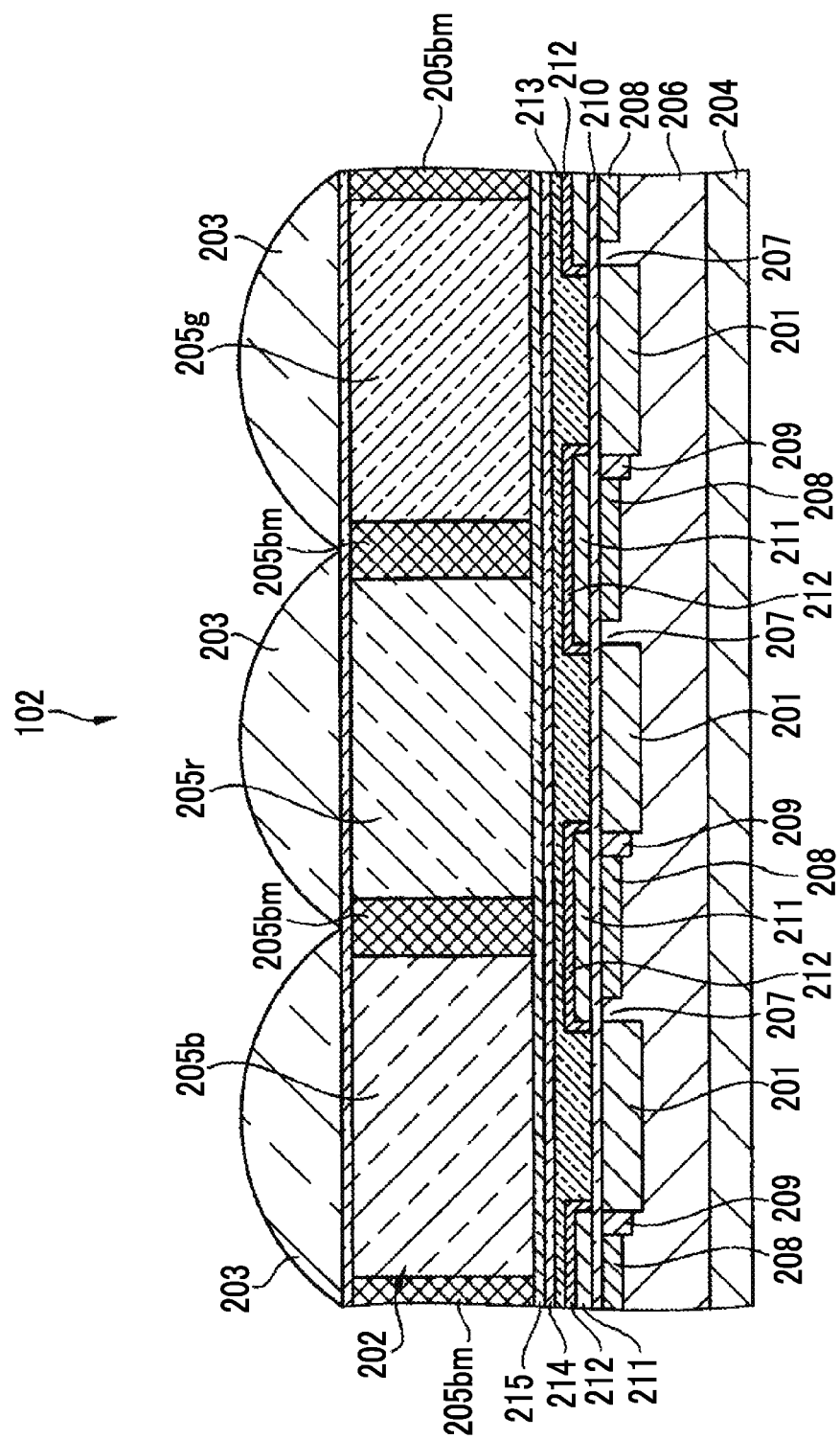
FIG. 2 is an enlarged schematic cross-sectional view showing an imaging portion in FIG. 1.

Examples of the constitutions of the solid-state imaging device and the solid-state imaging element will be described with reference to FIG. 1 and FIG. 2. In FIG. 1 and FIG. 2, in order that each portion is clearly seen, some portions are magnified in disregard of a thickness ratio and/or a width ratio between the portions.

As shown in FIG. 1, a solid-state imaging device 100 comprises a rectangular solid-state imaging element 101 and a transparent cover glass 103 which is held above the solid-state imaging element 101 and seals the solid-state imaging element 101. Furthermore, on the cover glass 103, a lens layer 111 is superposed through a spacer 104. The lens layer 111 is constituted with a support 113 and a lens material 112. The lens layer 111 may be constituted with the support 113 and the lens material 112 that are integrally formed. In a case where stray light comes into the peripheral region of the lens layer 111, due to the diffusion of light, a light condensing effect of the lens material 112 is weakened. Accordingly, the light reaching an imaging portion 102 is reduced, and noise occurs due to the stray light. Therefore, a light blocking film 114 is provided in the peripheral region of the lens layer 111 such that light is blocked. The cured film according to the embodiment of the present invention can also be used as the light blocking film 114.

The solid-state imaging element 101 performs photoelectric conversion on an optical image formed on the imaging portion 102, which becomes a light-receiving surface of the solid-state imaging element 101, and outputs the converted optical image as an image signal. The solid-state imaging element 101 comprises a laminated substrate 105 obtained by laminating two sheets of substrates. The laminated substrate 105 is formed of a chip substrate 106 and a circuit substrate 107 that are rectangular substrates having the same size. The circuit substrate 107 is laminated on the rear surface of the chip substrate 106.

As the material of the substrate used as the chip substrate 106, known materials can be used without particular limitation.

The imaging portion 102 is provided in the central portion of the surface of the chip substrate 106. In a case where stray light comes into the peripheral region of the imaging portion 102, a dark current (noise) occurs from the circuit in the peripheral region. Therefore, the peripheral region is provided with a light blocking film 115 such that light is blocked. The cured film according to the embodiment of the present invention can also be used as the light blocking film 115.

A plurality of electrode pads 108 are provided at the edge of the surface of the chip substrate 106. The electrode pads 108 are electrically connected to the imaging portion 102 through a signal line (a bonding wire can also be used) not shown in the drawing that is provided on the surface of the chip substrate 106.

On the rear surface of the circuit substrate 107, external connection terminals 109 are provided approximately in positions below the electrode pads 108. The external connection terminals 109 are connected to the electrode pads 108 through a penetration electrode 110 vertically penetrating the laminated substrate 105. Furthermore, the external connection terminals 109 are connected to a control circuit controlling the driving of the solid-state imaging element 101, an image processing circuit performing image processing on an imaging signal output from the solid-state imaging element 101, and the like through wiring not shown in the drawing.

As shown in FIG. 2, the imaging portion 102 is constituted with the portions provided on a substrate 204 such as a light-receiving element 201, a color filter 202, and a microlens 203. The color filter 202 has a blue pixel 205b, a red pixel 205r, a green pixel 205g, and a black matrix 205bm. The cured film according to the embodiment of the present invention can also be used as the black matrix 205bm.

As the material of the substrate 204, the same material as that of the chip substrate 106 can be used. On the surface layer of the substrate 204, a p-well layer 206 is formed. In the p-well layer 206, the light-receiving elements 201, which are formed of an n-type layer and generate and accumulate signal charges by photoelectric conversion, are arranged in the form of square grids.

On one lateral side of each light-receiving element 201, through a reading gate portion 207 on the surface layer of the p-well layer 206, a vertical electric charge transfer path 208 formed of an n-type layer is formed. Furthermore, on the other lateral side of each light-receiving element 201, through an element separation region 209 formed of a p-type layer, a vertical electric charge transfer path 208 belonging to the adjacent pixel is formed. The reading gate portion 207 is a channel region for the signal charges accumulated in the light-receiving element 201 to be read toward the vertical electric charge transfer path 208.

On the surface of the substrate 204, a gate insulating film 210 formed of an oxide-nitride-oxide (ONO) film is formed. On the gate insulating film 210, vertical electric charge transfer electrodes 211 formed of polysilicon or amorphous silicon are formed to cover the portions which are approximately immediately above the vertical electric charge transfer path 208, the reading gate portion 207, and the element separation region 209. The vertical electric charge transfer electrodes 211 function as driving electrodes for driving the vertical electric charge transfer path 208 and performing charge transfer and as reading electrodes for driving the reading gate portion 207 and reading out signal charges. The signal charges are transferred to a horizontal electric charge transfer path and an output portion (floating diffusion amplifier), which are not shown in the drawing, in this order from the vertical electric charge transfer path 208 and then output as voltage signals.

On each of the vertical electric charge transfer electrodes 211, a light blocking film 212 is formed to cover the surface of the electrode. The light blocking film 212 has an opening portion in a position immediately above the light-receiving element 201 and shields a region other than the opening portion from light. The cured film according to the embodiment of the present invention can also be used as the light blocking film 212.

On the light blocking film 212, a transparent interlayer is provided which is formed of an insulating film 213 formed of borophosphosilicate glass (BPSG), an insulating film (passivation film) 214 formed of P—SiN, and a planarization film 215 formed of a transparent resin or the like. The color filter 202 is formed on the interlayer.

[Black Matrix]

The black matrix includes the cured film according to the embodiment of the present invention. The black matrix is incorporated into a color filter, a solid-state imaging element, and a liquid crystal display device in some cases.

Examples of the black matrix include those described above; a black rim provided in the peripheral portion of a display device such as a liquid crystal display device; a grid-like and/or a stripe-like black portion between pixels of red, blue, and green; a dot-like and/or a linear black pattern for shielding a thin film transistor (TFT) from light; and the like. The definition of the black matrix is described in, for example, Yasuhira Kanno, "Glossary of Liquid Crystal display Manufacturing Device", $2^{nd}$ edition, NIKKAN KOGYO SHIMBUN, LTD., 1996, p. 64.

In order to improve the display contrast and to prevent image quality deterioration resulting from current leak of light in the case of an active matrix driving-type liquid crystal display device using a thin film transistor (TFT), it is preferable that the black matrix has high light blocking properties (it is preferable that the optical density OD is higher than 3).

The manufacturing method of the black matrix is not particularly limited, and the black matrix can be manufactured by the same method as the manufacturing method of the cured film described above. Specifically, by coating a substrate with the curable composition so as to form a curable composition layer and performing exposure and development, a pattern-like cured film (black matrix) can be manufactured. The film thickness of the cured film used as the black matrix is preferably 0.1 to 4.0 μm.

The material of the substrate is not particularly limited, but it is preferable that the material has a transmittance equal to or higher than 80% for visible light (wavelength: 400 to 800 nm). Specifically, examples of such a material include glass such as soda lime glass, alkali-free glass, quartz glass, and borosilicate glass; plastic such as a polyester-based resin and a polyolefin-based resin; and the like. From the viewpoint of chemical resistance and heat resistance, alkali-free glass, quartz glass, or the like is preferable.

[Color Filter]

The color filter according to an embodiment of the present invention includes a cured film.

The aspect in which the color filter includes the cured film is not particularly limited, and examples thereof include a color filter comprising a substrate and the aforementioned black matrix. That is, examples of the color filter include a color filter comprising colored pixels of red, green, and blue formed on the opening portion of the black matrix formed on a substrate.

The color filter including a black matrix (cured film) can be manufactured, for example, by the following method.

First, on an opening portion of a pattern-like black matrix formed on a substrate, a coating film of a resin composition (resin composition layer) containing pigments corresponding to the colored pixels of the color filter is formed. As the resin composition for each color, known resin compositions can be used without particular limitation. However, it is preferable to use the curable composition obtained by changing the metal carbide-containing particles in the curable composition according to the embodiment of the present invention into colorants corresponding to the respective pixels.

Then, the resin composition layer is subjected to exposure through a photo mask having a pattern corresponding to the opening portion of the black matrix. Thereafter, an unexposed portion is removed by a development treatment and then performing baking. In this way, colored pixels can be formed in the opening portion of the black matrix. In a case where the series of operations are performed using, for example, a resin composition for each color containing red, green, and blue pigments, a color filter having red, green, and blue pixels can be manufactured.

[Image Display Device]

The image display device according to an embodiment of the present invention includes a cured film. The aspect in which the image display device (typical examples thereof include a liquid crystal display device, hereinafter, the liquid crystal display device will be described) includes the cured film is not particularly limited, and examples thereof include an aspect in which the image display device includes a color filter including the black matrix (cured film) described above.

Examples of the liquid crystal display device according to the present embodiment include an aspect in which the liquid crystal display device comprises a pair of substrates disposed to face each other and a liquid crystal compound sealed into the space between the substrates. The substrates are as described above as the substrate for a black matrix.

Examples of a specific aspect of the liquid crystal display device include a laminate having polarizing plate/substrate/color filter/transparent electrode layer/alignment film/liquid crystal layer/alignment film/transparent electrode layer/Thin Film Transistor (TFT) element/substrate/polarizing plate/backlight unit in this order from the user's side.

The liquid crystal display device is not limited to the above, and examples thereof include the liquid crystal display devices described in "Electronic display device (Akio Sasaki, Kogyo Chosakai Publishing Co., Ltd., 1990)" and "Display Device (Sumiaki Ibuki, Sangyo Tosho Publishing Co., Ltd., 1989)" and the liquid crystal display device described in "Next-Generation Liquid Crystal Display Technology (Tatsuo Uchida, Kogyo Chosakai Publishing Co., Ltd., 1994)".

[Infrared Sensor]

The infrared sensor according to an embodiment of the present invention includes the aforementioned cured film.

The infrared sensor according to the embodiment will be described using FIG. 3. In an infrared sensor 300 shown in FIG. 3, the reference 310 represents a solid-state imaging element.

The imaging region provided on the solid-state imaging element 310 is constituted with a combination of an infrared absorption filter 311 and a color filter 312 according to the embodiment of the present invention.

The infrared absorption filter 311 is a film which transmits light of the range of visible rays (for example, light having a wavelength of 400 to 700 nm) and blocks light of the infrared range (for example, light having a wavelength of 800 to 1,300 nm, preferably having a wavelength of 900 to 1,200 nm, and more preferably having a wavelength of 900 to 1,000 nm). In the infrared absorption filter 311, a cured film containing an infrared absorber (the aspect of the infrared absorber is as described above) as a colorant can be used.

The color filter 312 is a color filter in which pixels transmitting or absorbing light having a specific wavelength in the range of visible rays are formed. As the color filter 312, for example, a color filter in which pixels of red (R), green (G), and blue (B) are formed is used, and the aspect thereof is as described above.

Between an infrared transmission filter 313 and the solid-state imaging element 310, a resin film 314 (for example, a transparent resin film or the like) is disposed which can transmit light having a wavelength transmitted through the infrared transmission filter 313.

It is preferable that the infrared transmission filter 313 blocks light having a wavelength of 400 to 830 nm and transmits light having a wavelength of 900 to 1,300 nm, for example.

On an incidence ray hv side of the color filter 312 and the infrared transmission filter 313, microlenses 315 are arranged. A planarization film 316 is formed to cover the microlenses 315.

Figure 3:
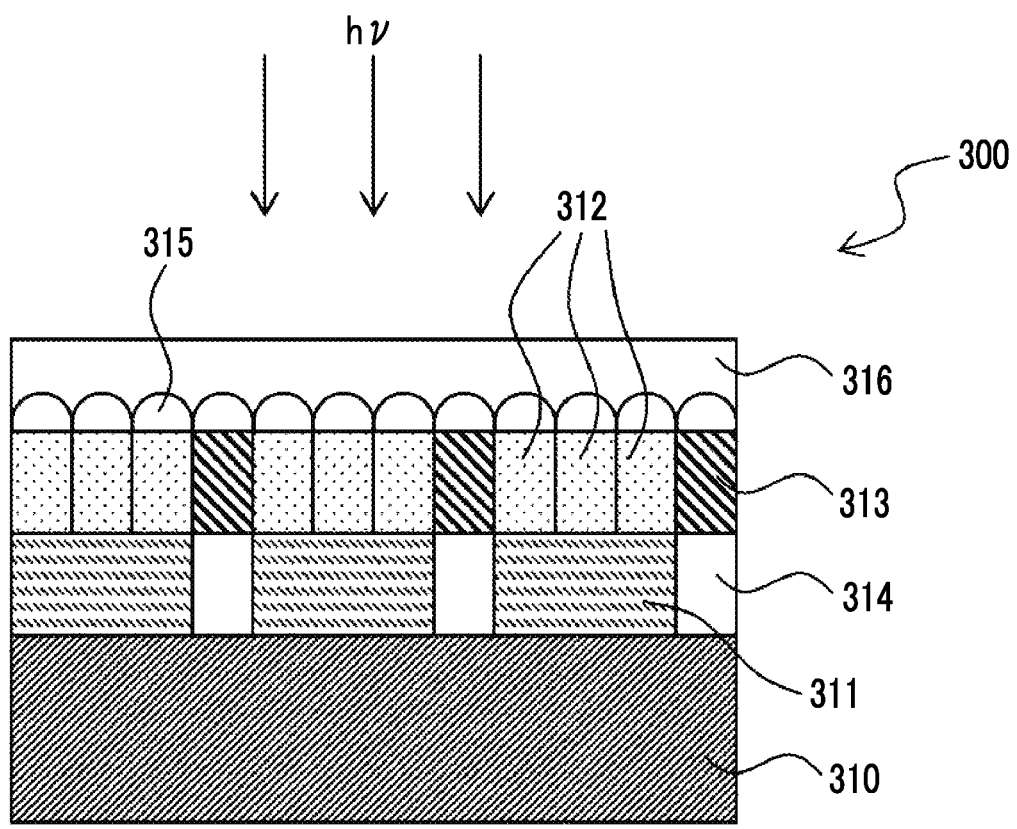
FIG. 3 is a schematic cross-sectional view showing an example of the constitution of an infrared sensor.

Although a resin film 314 is disposed in the embodiment shown in FIG. 3, the infrared transmission filter 313 may be formed instead of the resin film 314. That is, on the solid-state imaging element 310, the infrared transmission filter 313 may be formed.

In the embodiment shown in FIG. 3, the film thickness of the color filter 312 is the same as the film thickness of the infrared transmission filter 313. However, the film thicknesses may be different from each other.

In the embodiment shown in FIG. 3, the color filter 312 is provided to be closer to the incidence ray hv side than the infrared absorption filter 311. However, the order of the infrared absorption filter 311 and the color filter 312 may be switched such that the infrared absorption filter 311 is provided to be closer to the incidence ray hv side than the color filter 312.

In the embodiment shown in FIG. 3, the infrared absorption filter 311 and the color filter 312 are laminated to be adjacent to each other. However, these filters do not need to be adjacent to each other, and another layer may be provided between the filters. The cured film according to the embodiment of the present invention can be used as a light blocking film on the edge of the surface of the infrared absorption filter 311 or lateral surface of the infrared absorption filter 311. Furthermore, by being used as a device inner wall of an infrared sensor, the cured film according to the embodiment of the present invention can prevent internal reflection or unintended incidence of light on the light receiving portion and can improve sensitivity.

According to the infrared sensor, image information can be simultaneously input. Therefore, motion sensing by which a subject whose movement is to be detected is recognized can be carried out. Furthermore, because distance information can be obtained, images including 3D information and the like can be captured.

Next, a solid-state imaging device in which the aforementioned infrared sensor is used will be described.

The solid-state imaging device includes a lens optical system, a solid-state imaging element, an infrared emission diode, and the like. Regarding each of the constituents of the solid-state imaging device, paragraphs "0032" to "0036" in JP2011-233983A can be referred to, and the contents of the paragraphs are incorporated into the present specification.

EXAMPLES

Hereinafter, the present invention will be more specifically described based on examples. The materials, the amount of the materials used, the proportion of the materials, the treatment content, the treatment procedure, and the like shown in the following examples can be appropriately modified as long as the gist of the present invention is maintained. Accordingly, the scope of the present invention is not limited to the following examples.

[Preparation of Curable Composition]

The components described in Table 1 were mixed together such that the content thereof became as described above Table 1, thereby preparing curable compositions of examples and comparative examples. The curable compositions were prepared according to the following procedure.

First, inorganic particles (metal carbide-containing particles), a dispersant, and some of organic solvents were mixed together, and the obtained mixture was dispersed under the following conditions by using NMP-Pilot manufactured by Shinmaru Enterprises Corporation., thereby obtaining a dispersed composition.

(Dispersion Conditions)

Bead size: 0.05 mm, (zirconia beads manufactured by NIKKATO CORPORATION, YTZ)

Bead filling rate: 65% by volume

Circumferential speed of mill: 10 m/sec

Circumferential speed of separator: 13 m/s

Amount of mixed solution subjected to dispersion treatment: 15 kg

Circulation flow rate (pump feeding amount): 90 kg/hour

Treatment solution temperature: 19° C. to 21° C.

Coolant: water

Treatment time: 22 hours

Then, the aforementioned dispersed composition, an alkali-soluble resin, a polymerization initiator, a polymerizable compound, a surfactant, a polymerization inhibitor, and the remaining organic solvents were mixed together such that the content of the components became as described in Table 1, thereby obtaining a curable composition of each of examples and comparative examples. Details of the components are as below.

<Inorganic Particles>

Metal Carbide-Containing Particles

TaC (average primary particle diameter: 60 nm, synthesized by RF thermal plasma method)

TaC (average primary particle diameter: 5 nm, synthesized by RF thermal plasma method)

TaC (average primary particle diameter: 200 nm, synthesized by RF thermal plasma method)

NbC (average primary particle diameter: 60 nm, synthesized by RF thermal plasma method)

VC (average primary particle diameter: 60 nm, synthesized by RF thermal plasma method)

Tic (average primary particle diameter: 60 nm, synthesized by RF thermal plasma method)

TiN (average primary particle diameter: 60 nm, synthesized by RF thermal plasma method)

Other Particles $SiO_2$ (average primary particle diameter: 250 nm, manufactured by Admatechs., "SO-C1")

<Dispersant>

As dispersants, the following dispersants A to D were used.

(Synthesis of Dispersant A)

Synthesis of Macromonomer A-1

ε-Caprolactone (1,044.2 g), δ-valerolactone (184.3 g), and 2-ethyl-1-hexanol (71.6 g) were introduced into a three-neck flask having a volume of 3,000 mL, thereby obtaining a mixture. Then, the mixture was stirred in a state where nitrogen was being blown thereinto. Thereafter, Disperbyk 111 (12.5 g, manufactured by BYKChemie GmbH, phosphoric acid resin) was added to the mixture, and the obtained mixture was heated to 90° C. After 6 hours, by $^1$H-nuclear magnetic resonance (NMR), the disappearance of a signal resulting from 2-ethyl-1-hexanol in the mixture was confirmed, and then the mixture was heated to 110° C. In a nitrogen atmosphere, a polymerization reaction was continued for 12 hours at 110° C., and then by $^1$H-NMR, the disappearance of signals resulting from ε-caprolactone and δ-valerolactone was confirmed. The molecular weight of the obtained compound was measured by a Gel permeation chromatography (GPC, under the measurement conditions which will be described later). After it was confirmed that the molecular weight of the compound reached a desired value, 2,6-di-t-butyl-4-methylphenol (0.35 g) was added to the mixture containing the compound, and then 2-methacryloyloxyethyl isocyanate (87.0 g) was further added dropwise to the obtained mixture for 30 minutes. Six hours after the finish of the dropwise addition, by $^1$H-NMR, the disappearance of a signal resulting from 2-methacryloyloxyethyl isocyanate (MOI) was confirmed. Then, propylene glycol monomethyl ether acetate (PGMEA) (1,387.0 g) was added to the mixture, thereby obtaining a macromonomer A-1 solution (2,770 g) having a concentration of 50% by mass. The weight-average molecular weight of the obtained macromonomer A-1 was 6,000.

Synthesis of Dispersant A

The macromonomer A-1 (200.0 g), methacrylic acid (hereinafter, referred to as "MAA" as well, 60.0 g), benzyl methacrylate (hereinafter, referred to as "BzMA" as well, 40.0 g), and PGMEA (propylene glycol 1-monomethyl ether 2-acetate, 366.7 g) were introduced into a three-neck flask having a volume of 1,000 mL, thereby obtaining a mixture. The mixture was stirred while nitrogen was being blown thereinto. Then, while nitrogen was being allowed to flow in the flask, the mixture was heated to 75° C. Thereafter, dodecyl mercaptan (5.85 g) and 2,2'-azobis(methyl 2-methylpropionate) (1.48 g, hereinafter, referred to as "V-601" as well) were added in this order to the mixture, and a polymerization reaction was initiated. The mixture was heated for 2 hours at 75° C., and then V-601 (1.48 g) was added to the mixture. After 2 hours, V-601 (1.48 g) was further added to the mixture. After the reaction was performed for 2 hours, the mixture was heated to 90° C. and stirred for 3 hours. By the above operation, the polymerization reaction was finished, and a dispersant A was obtained.

(Synthesis of Dispersant B)

Tetrabutylammonium bromide (TBAB, 7.5 g) and p-methoxyphenol (MEHQ, 0.13 g) were added to the dispersant A synthesized as above, and then glycidyl methacrylate (hereinafter, referred to as "GMA" as well, 66.1 g) was added dropwise thereto. After the finish of the dropwise addition, in the air, the reaction was continued for 7 hours, and the acid value was measured, thereby confirming the finish of the reaction. By adding PGMEA (643.6 g) to the obtained mixture, a 20% by mass solution of a dispersant B was obtained. The weight-average molecular weight of the obtained dispersant B was 35,000, and the acid value of the dispersant B was 50 mgKOH/mg.

Dispersant C: compound represented by the following formula (the numerical value on each constitutional unit represents a molar ratio. That is, a dispersant C contains two kinds of constitutional units, and the molar ratio between the constitutional units is 39:61.)

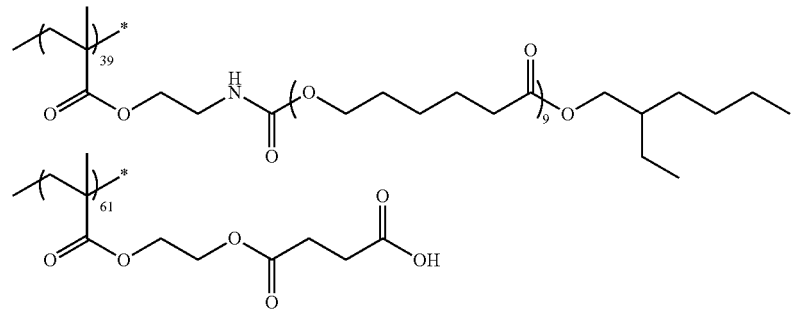

Dispersant D: compound represented by the following formula (the numerical value on each constitutional unit represents a molar ratio. That is, a dispersant D contains two kinds of constitutional units, and a molar ratio between the constitutional units is 24:76.)

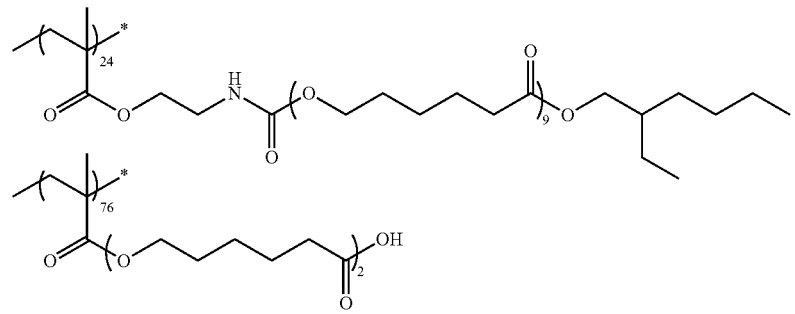

<Alkali-Soluble Resin>

As alkali-soluble resins, A-1 and A-2 described below were used.

A-1: "ACRYCURE RD-F8", manufactured by NIPPON SHOKUBAI CO., LTD., solid content: 40%, solvent: propylene glycol monomethyl ether A-2: compound synthesized by the following method The alkali-soluble resin A-2 was synthesized by the following method. First, 95.1 g of 4,4'-diaminodiphenylether, 6.2 g of bis(3-aminopropyl)tetramethyldisiloxane, 525 g of γ-butyrolactone, and 220 g of N-methyl-2-pyrrolidone were mixed together, thereby obtaining a mixed solution. 3,3',4,4'-Biphenyltetracarboxylic acid dianhydride (144.1 g) was added to the mixed solution and reacted for 3 hours at 70° C., and then 3.0 g of phthalic acid anhydride was added thereto and reacted for 2 hours at 70° C., thereby obtaining a 25% by mass alkali-soluble resin A-2 solution (the resin A-2 corresponds to polyamic acid).

<Polymerizable Compound>

As polymerizable compounds, M1 to M4 described below were used.

M1: trade name "KAYARAD DPHA", manufactured by Nippon Kayaku Co., Ltd., (mixture of hexafunctional polymerizable compound (amount of ethylenically unsaturated group: 10.4 mmol/g) and pentafunctional polymerizable compound (amount of ethylenically unsaturated group: 9.5 mmol/g))

M2: trade name "U-15HA", manufactured by SHIN-NAKAMURA CHEMICAL CO., LTD., urethane acrylate having 15 functional groups.

M3: trade name "KAYARAD RP-1040", manufactured by Nippon Kayaku Co., Ltd., compound represented by the following formula

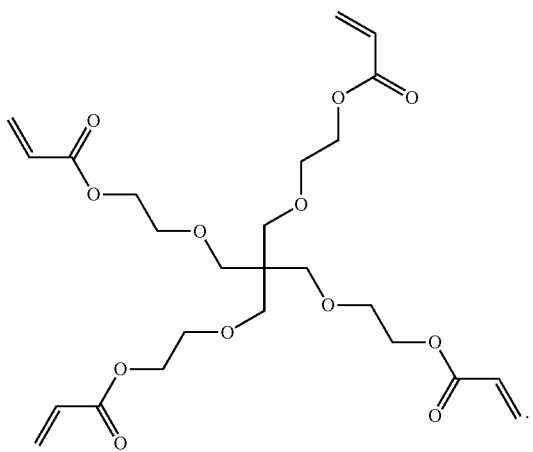

M3

M4: compound represented by the following formula (synthesized with reference to JP2009-169049A)

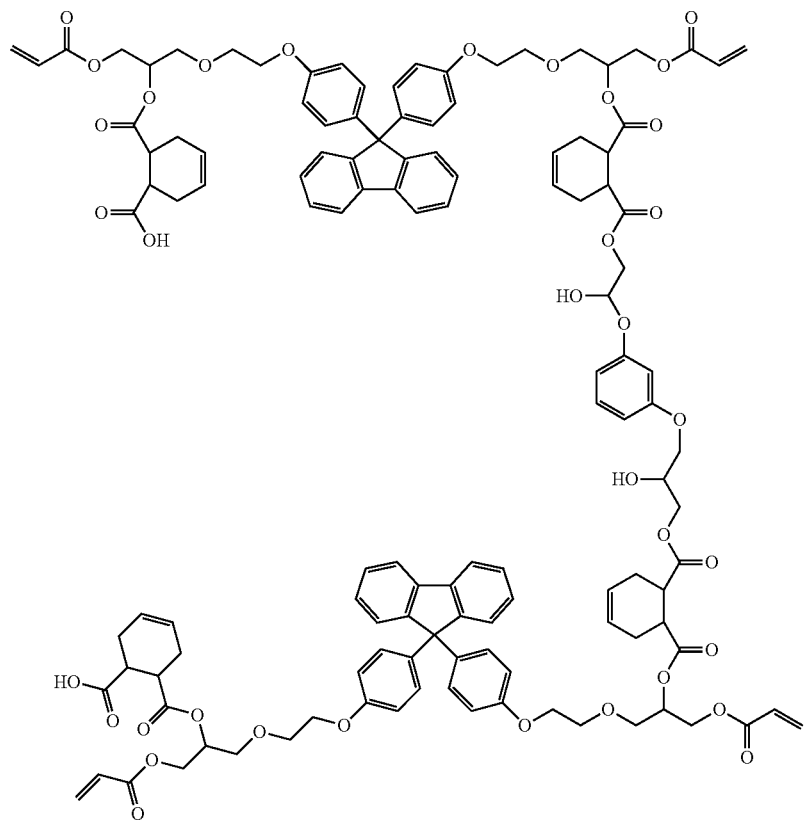 [SMILES: C=CC(=O)OCC(COCCOc1ccc(C2(c3ccc(OCCOCC(COC(=O)C=C)OC(=O)C4CC=CCC4C(=O)OCC(O)COc4cccc(OC(O)COC(=O)C5CC=CCC5C(=O)OC(COCCOc5ccc(C6(c7ccc(OCCOCC(COC(=O)C=C)OC(=O)C8CC=CCC8C(=O)O)cc7)c7ccccc7-c7ccccc76)cc5)COC(=O)C=C)c4)cc3)c3ccccc3-c3ccccc32)cc1)OC(=O)C1CC=CCC1C(=O)O]

<Polymerization Initiator>

As polymerization initiators, I-1 to I-3 described below were used.

I-1: compound represented by the following formula (photopolymerization initiator, corresponding to oxime compound)

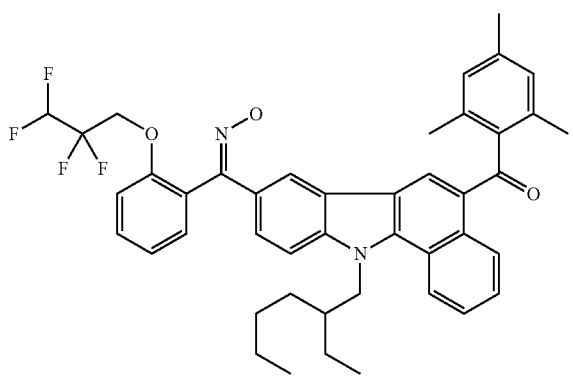 [SMILES: CCCCC(CC)Cn1c2ccc(/C(=N\O)c3ccccc3OCC(F)(F)C(F)F)cc2c2cc(C(=O)c3c(C)cc(C)cc3C)c3ccccc3c21]

I-2: compound represented by the following formula (trade name "B-CIM", manufactured by Hodogaya Chemical Co., Ltd., corresponding to photopolymerization initiator, not corresponding to oxime compound)

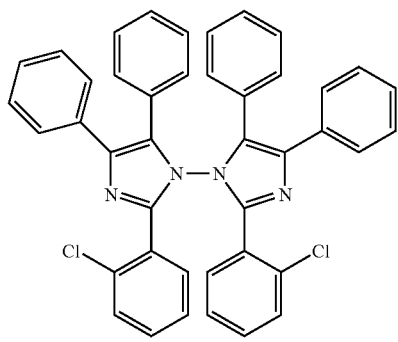 [SMILES: Clc1ccccc1-c1nc(-c2ccccc2)c(-c2ccccc2)n1-n1c(-c2ccccc2Cl)nc(-c2ccccc2)c1-c1ccccc1]

I-3: compound represented by the following formula (corresponding to photopolymerization initiator, not corresponding to oxime compound)

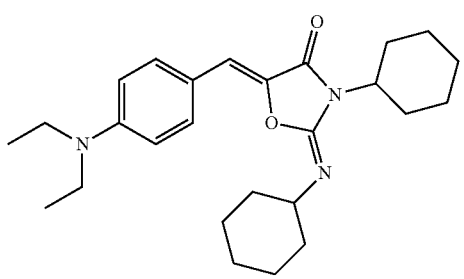 [SMILES: CCN(CC)c1ccc(/C=C2\O/C(=N\C3CCCCC3)N(C3CCCCC3)C2=O)cc1]

<Surfactant>

As a surfactant, a compound F-1 represented by the following formula was used (weight-average molecular weight=15,311). In the following formula, the structural units represented by (A) and (B) have a proportion of 62 mol % and 38 mol % respectively. In the structural unit represented by Formula (B), a, b, and c satisfy the relationship of a+c=14 and b=17.

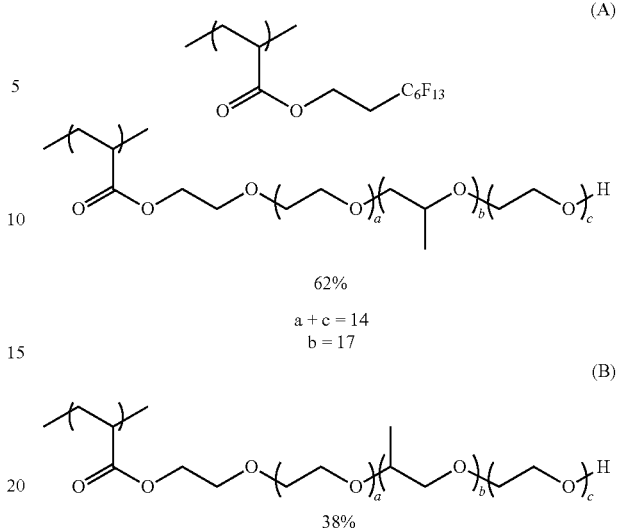

<Polymerization Inhibitor>

PI-1: p-methoxyphenol

<Solvent>

Propylene glycol monomethyl ether acetate (PGMEA)

Each of the curable compositions was diluted with PGMEA such that the solid contents thereof became as described in Table 1.

[Evaluation]

The obtained curable compositions were evaluated regarding the following items.

[Light Blocking Properties]

The light blocking properties of the cured film were evaluated by the following method.

First, a glass substrate (EagleXG, manufactured by Corning Incorporated.) having a thickness of 0.7 mm and a size of 10 cm×10 cm was coated with each of the curable compositions by a spin coating method, thereby obtaining a curable composition layer. At this time, the rotation speed of the spin coater was adjusted such that the thickness of the curable composition layer became 1.0 μm after drying. Then, the surface of the glass substrate was caused to face down, and the glass substrate was placed on a hot plate and subjected to a heat treatment for 2 hours at 100° C. such that the curable composition layer was dried. Thereafter, by using an i-line stepper exposure machine FPA-3000i5+ (manufactured by Canon Inc.), the curable composition layer was subjected to exposure at a wavelength of 365 nm in an exposure amount of 500 mJ/cm². Subsequently, the glass substrate, on which the exposed curable composition layer was formed, was placed on a horizontally rotating table of a spin shower development machine (DW-30 model; manufactured by Chemitronics, Co., Ltd.) and subjected to puddle development for 60 seconds at 23° C. by using CD-2000 (manufactured by FUJIFILM Electronic Materials Co., Ltd., organic alkaline developer). The glass substrate having undergone puddle development was fixed to the horizontally rotating table by a vacuum chuck method. The glass substrate was rotated at a rotation speed of 50 rpm by a rotation device, and in this state, pure water was supplied in the form of shower from a spray nozzle from above the rotation center such that the wafer was rinsed, thereby obtaining a cured film. By using a transmission densitometer (X-rite 361T (visual) densitometer), the optical density (OD) of the obtained cured film at a wavelength of 320 to 1,200 nm was measured. The results were evaluated based on the following standards.

A: The minimum OD at the aforementioned wavelength range was equal to or higher than 4.0.

B: The minimum OD at the aforementioned wavelength range was equal to or higher than 3.0 and less than 4.0.

C: The minimum OD at the aforementioned wavelength range was equal to or higher than 2.0 and less than 3.0.

D: The minimum OD at the aforementioned wavelength range was less than 2.0.

<Temporal Stability>

The temporal stability of each of the curable compositions was evaluated by the following method.

First, the curable composition was 2× diluted with propylene glycol monomethyl ether acetate, thereby obtaining a diluted solution. Then, 20 mL of the diluted solution was collected, and the collected diluted solution was put into a 50 mL container made of a resin and left to stand for 6 months in an environment at 23° C. After the diluted solution was left to stand, 5 g of supernatant 1 cm deep from the level of the diluted solution in the container made of a resin was collected, and the amount of solid contents was measured.

By comparing the amount of solid contents in the supernatant with the amount of solid contents in each of the just prepared curable compositions, the amount of change in the amount of solid contents was calculated. The results were evaluated based on the following standards. The smaller the amount of change in the amount of solid contents, the more difficult it is for inorganic particles to be precipitated in the curable composition.

The amount of solid contents was calculated by the following method. That is, 1 g of the curable composition was weighed and heated for 60 minutes in an oven at 165° C., thereby obtaining solid contents. The mass of the solid contents was measured, and the amount of solid contents [% by mass] was calculated by (mass of solid contents/mass of curable composition (1 g))×100.

A: The amount of change in the solid content concentration was less than 1%.

B: The amount of change in the solid content concentration was equal to or greater than 1% and less than 3%.

C: The amount of change in the solid content concentration was equal to or greater than 3%.

<Patterning Properties (Development Residues)>

Each of the curable compositions was stored for 6 months at 23° C., and an electrode pattern of a silicon wafer with a surface, on which an electrode pattern (copper) was formed, was spin-coated with each of the curable compositions after storage such that the film thickness became 0.7 μm after drying, thereby forming a curable composition layer. Thereafter, the wafer was left to stand as it was for 10 minutes, and then the silicon wafer on which the curable composition layer was formed was placed on a hot plate at 100° C. and heated (baked) for 120 seconds. Thereafter, by using an i-line stepper exposure machine FPA-3000i5+ (manufactured by Canon Inc.), the curable composition layer was subjected to exposure through a 2 μm×2 μm an Island pattern mask at a wavelength of 365 nm in an exposure amount of 1,000 mJ/cm$^2$. Subsequently, the silicon wafer, on which the exposed curable composition layer was formed, was placed on a horizontally rotating table of a spin shower development machine (DW-30 model; manufactured by Chemitronics, Co., Ltd.) and subjected to puddle development for 60 seconds at 23° C. by using CD-2000 (manufactured by FUJIFILM Electronic Materials Co., Ltd., organic alkaline developer). The silicon wafer having undergone puddle development was fixed to the horizontally rotating table by a vacuum chuck method. The silicon wafer was rotated at a rotation speed of 50 rpm by a rotation device, and in this state, pure water was supplied in the form of shower from a spray nozzle from above the rotation center such that the wafer was rinsed. Then, the rinsed silicon wafer was spray-dried, thereby obtaining a silicon wafer having a frame-shaped black matrix. For the silicon wafer obtained as above, by using a scanning electron microscope (manufactured by Hitachi High-Technologies Corporation, trade name "SU 8010"), the wafer surface in an unexposed portion was observed at 20,000× magnification, the number of particle-like residues confirmed in the obtained observation image was counted, and the patterning properties (development residues) were evaluated based on the following standards.

AA: No development residue was observed in the unexposed portion.

A: The number of particles-like development residues observed in the unexposed portion was 1 to 3.

B: The number of particles-like development residues observed in the unexposed portion was 4 to 50.

C: The number of particles-like development residues observed in the unexposed portion was 51 to 100.

D: The number of particles-like development residues observed in the unexposed portion was equal to or greater than 101.

Example 29

A curable composition was prepared in the same manner as in Example 2, except that in the curable composition of Example 2, as other particles (A2), instead of SiO$_2$, carbon black was used (trade name "CARBON BLACK S170", manufactured by Degussa AQ average primary particle diameter: 17 nm, BET (Brunauer, Emmett, Teller) specific surface area: 200 m$^2$/g, carbon black manufactured by gas black method, corresponding to inorganic particles and other particles, described as "CB" in Table 1).

Example 30

A curable composition was prepared in the same manner as in Example 2, except that in the curable composition of Example 2, as other particles (A2), instead of SiO$_2$, a colorant was used (Pigment Yellow 150, manufactured by Hangzhou Star-up Pigment Co., Ltd. trade name: 6150 pigment yellow SGN, not corresponding to inorganic particles, described as "PY150" in Table 1).

TABLE 1

| | Components of curable composition Inorganic particles (A) | | | | | | |
|---|---|---|---|---|---|---|---|
| | Metal carbide-containing particles (A1) | | | | | | |
| | Content (% by mass) | | | Content in inorganic particles (A) (% by mass) | Average primary particle diameter (nm) | Content in curable composition (% by mass) | |
| | In solid contents | In curable composition | Type | | | In solid contents | In curable composition |
| Example 1 | 51.0 | 18.3 | TaC | 100 | 60 | 51.0 | 18.3 |
| Example 2 | 51.0 | 18.3 | TaC | 70 | 60 | 35.7 | 12.8 |
| Example 3 | 51.0 | 18.3 | TaC | 55 | 60 | 28.0 | 10.1 |
| Example 4 | 56.9 | 18.3 | TaC | 100 | 60 | 56.9 | 18.3 |
| Example 5 | 40.7 | 18.3 | TaC | 100 | 60 | 40.7 | 18.3 |
| Example 6 | 51.0 | 18.3 | TaC | 100 | 60 | 51.0 | 18.3 |
| Example 7 | 51.0 | 18.3 | TaC | 100 | 60 | 51.0 | 18.3 |
| Example 8 | 55.2 | 18.3 | TaC | 100 | 60 | 55.2 | 18.3 |
| Example 9 | 42.4 | 18.3 | TaC | 100 | 60 | 42.4 | 18.3 |
| Example 10 | 51.0 | 18.3 | TaC | 100 | 5 | 51.0 | 18.3 |
| Example 11 | 51.0 | 18.3 | TaC | 100 | 200 | 51.0 | 18.3 |
| Example 12 | 51.0 | 18.3 | NbC | 100 | 60 | 51.0 | 18.3 |
| Example 13 | 51.0 | 18.3 | Vc | 100 | 60 | 51.0 | 18.3 |
| Example 14 | 51.0 | 18.3 | TaC | 100 | 60 | 51.0 | 18.3 |
| Example 15 | 51.0 | 18.3 | TaC | 100 | 60 | 51.0 | 18.3 |
| Example 16 | 55.9 | 18.3 | TaC | 100 | 60 | 55.9 | 18.3 |
| Example 17 | 40.2 | 18.3 | TaC | 100 | 60 | 40.2 | 18.3 |
| Example 18 | 40.1 | 18.3 | TaC | 100 | 60 | 40.1 | 18.3 |
| Example 19 | 61.0 | 18.3 | TaC | 100 | 60 | 61.0 | 18.3 |
| Example 20 | 51.0 | 18.3 | TaC | 100 | 60 | 51.0 | 18.3 |
| Example 21 | 51.0 | 18.3 | TaC | 100 | 60 | 51.0 | 18.3 |
| Example 22 | 51.0 | 18.3 | TaC | 100 | 60 | 51.0 | 18.3 |
| Example 23 | 51.0 | 18.3 | TaC | 100 | 60 | 51.0 | 18.3 |
| Example 24 | 51.0 | 18.3 | TaC | 100 | 60 | 51.0 | 18.3 |
| Example 25 | 51.0 | 18.3 | TaC | 100 | 60 | 51.0 | 18.3 |
| Example 26 | 51.0 | 18.3 | TaC | 100 | 60 | 51.0 | 18.3 |
| Example 27 | 51.0 | 18.3 | TaC | 100 | 60 | 51.0 | 18.3 |
| Example 28 | 51.0 | 18.3 | TaC | 100 | 60 | 51.0 | 18.3 |
| Example 29 | 51.0 | 18.3 | TaC | 70 | 60 | 35.7 | 12.8 |
| Example 30 | 35.7 | 12.8 | TaC | 100 | 60 | 35.7 | 12.8 |
| Example 31 | 51.0 | 18.3 | TaC | 100 | 60 | 51.0 | 18.3 |
| Comparative Example 1 | 51.0 | 18.3 | TaC | 50 | 60 | 25.5 | 9.2 |
| Comparative Example 2 | 51.0 | 18.3 | TaC | 30 | 60 | 15.3 | 5.5 |
| Comparative Example 3 | 62.9 | 18.3 | TaC | 100 | 60 | 62.9 | 18.3 |
| Comparative Example 4 | 51.0 | 18.3 | | | 60 | | |
| Comparative Example 5 | 51.0 | 18.3 | | | 60 | | |

TABLE 2

| | Components of curable composition | | | | | | |
|---|---|---|---|---|---|---|---|
| | Inorganic particles (A) Other particles (A2) | | | | Colorant | | |
| | | Content in inorganic particles (A) (% by mass) | Content in curable composition (% by mass) | | | Content in curable composition (% by mass) | |
| | Type | | In solid contents | In curable composition | Type | In solid contents | In curable composition |
| Example 1 | | | | | | | |
| Example 2 | SiO$_2$ | 30 | 15.3 | 5.5 | | | |
| Example 3 | SiO$_2$ | 45 | 22.9 | 8.2 | | | |
| Example 4 | | | | | | | |
| Example 5 | | | | | | | |
| Example 6 | | | | | | | |
| Example 7 | | | | | | | |
| Example 8 | | | | | | | |
| Example 9 | | | | | | | |

TABLE 2-continued

| | Components of curable composition | | | | | | |
|---|---|---|---|---|---|---|---|
| | Inorganic particles (A) Other particles (A2) | | | | Colorant | | |
| | Type | Content in inorganic particles (A) (% by mass) | Content in curable composition (% by mass) | | Type | Content in curable composition (% by mass) | |
| | | | In solid contents | In curable composition | | In solid contents | In curable composition |
| Example 10 | | | | | | | |
| Example 11 | | | | | | | |
| Example 12 | | | | | | | |
| Example 13 | | | | | | | |
| Example 14 | | | | | | | |
| Example 15 | | | | | | | |
| Example 16 | | | | | | | |
| Example 17 | | | | | | | |
| Example 18 | | | | | | | |
| Example 19 | | | | | | | |
| Example 20 | | | | | | | |
| Example 21 | | | | | | | |
| Example 22 | | | | | | | |
| Example 23 | | | | | | | |
| Example 24 | | | | | | | |
| Example 25 | | | | | | | |
| Example 26 | | | | | | | |
| Example 27 | | | | | | | |
| Example 28 | | | | | | | |
| Example 29 | CB | 30 | 15.3 | 5.5 | | | |
| Example 30 | | | | | PY150 | 15.3 | 5.5 |
| Example 31 | | | | | | | |
| Comparative Example 1 | $SiO_2$ | 50 | 25.5 | 9.2 | | | |
| Comparative Example 2 | $SiO_2$ | 70 | 35.7 | 12.8 | | | |
| Comparative Example 3 | | | | | | | |
| Comparative Example 4 | TiC | 100 | 51.0 | 18.3 | | | |
| Comparative Example 5 | TiN | 100 | 51.0 | 18.3 | | | |

TABLE 3

| | Components of curable composition | | | | | | | |
|---|---|---|---|---|---|---|---|---|
| | Polymerizable compound (B) | | | | Polymerization initiator (C) | | | |
| | Type | B/A (based on mass) | Content in curable composition (% by mass) | | Type | C/A (based on mass) | Content in curable composition (% by mass) | |
| | | | In solid contents | In curable composition | | | In solid contents | In curable composition |
| Example 1 | M1 | 0.37 | 18.9 | 6.8 | I-1 | 0.11 | 5.5 | 1.96 |
| Example 2 | M1 | 0.37 | 18.9 | 6.8 | I-1 | 0.11 | 5.5 | 1.96 |
| Example 3 | M1 | 0.37 | 18.9 | 6.8 | I-1 | 0.11 | 5.5 | 1.96 |
| Example 4 | M1 | 0.37 | 21.1 | 6.8 | I-1 | 0.11 | 6.1 | 1.96 |
| Example 5 | M1 | 0.37 | 15.1 | 6.8 | I-1 | 0.11 | 4.4 | 1.96 |
| Example 6 | M1 | 0.37 | 19.0 | 6.8 | I-1 | 0.11 | 5.5 | 1.96 |
| Example 7 | M1 | 0.37 | 18.9 | 6.8 | I-1 | 0.11 | 5.5 | 1.96 |
| Example 8 | M1 | 0.37 | 20.5 | 6.8 | I-1 | 0.11 | 5.9 | 1.96 |
| Example 9 | M1 | 0.37 | 15.7 | 6.8 | I-1 | 0.11 | 4.5 | 1.96 |
| Example 10 | M1 | 0.37 | 18.9 | 6.8 | I-1 | 0.11 | 5.5 | 1.96 |
| Example 11 | M1 | 0.37 | 18.9 | 6.8 | I-1 | 0.11 | 5.5 | 1.96 |
| Example 12 | M1 | 0.37 | 18.9 | 6.8 | I-1 | 0.11 | 5.5 | 1.96 |
| Example 13 | M1 | 0.37 | 18.9 | 6.8 | I-1 | 0.11 | 5.5 | 1.96 |
| Example 14 | M1 | 0.37 | 19.0 | 6.8 | I-1 | 0.11 | 5.5 | 1.96 |
| Example 15 | M1 | 0.37 | 18.9 | 6.8 | I-1 | 0.11 | 5.5 | 1.96 |
| Example 16 | M1 | 0.37 | 20.8 | 6.8 | I-1 | 0.11 | 6.0 | 1.96 |
| Example 17 | M1 | 0.37 | 15.0 | 6.8 | I-1 | 0.11 | 4.3 | 1.96 |
| Example 18 | M1 | 0.91 | 36.3 | 16.6 | I-1 | 0.11 | 4.3 | 1.96 |
| Example 19 | M1 | 0.05 | 3.1 | 0.92 | I-1 | 0.11 | 6.5 | 1.96 |

TABLE 3-continued

| | Components of curable composition |||||||
|---|---|---|---|---|---|---|---|
| | Polymerizable compound (B) |||| Polymerization initiator (C) ||||
| | | B/A || Content In curable composition (% by mass) || | C/A || Content in curable composition (% by mass) ||
| | Type | (based on mass) | In solid contents | In curable composition | Type | (based on mass) | In solid contents | In curable composition |
| Example 20 | M1 | 0.37 | 18.9 | 6.8 | I-2 | 0.11 | 5.5 | 1.96 |
| Example 21 | M1 | 0.37 | 18.9 | 6.8 | I-3 | 0.11 | 5.5 | 1.96 |
| Example 22 | M1 | 0.37 | 18.9 | 6.8 | I-1 | 0.11 | 5.5 | 1.96 |
| Example 23 | M1 | 0.37 | 18.9 | 6.8 | I-1 | 0.11 | 5.5 | 1.96 |
| Example 24 | M1 | 0.37 | 18.9 | 6.8 | I-1 | 0.11 | 5.5 | 1.96 |
| Example 25 | M2 | 0.37 | 18.9 | 6.8 | I-1 | 0.11 | 5.5 | 1.96 |
| Example 26 | M3 | 0.37 | 18.9 | 6.8 | I-1 | 0.11 | 5.5 | 1.96 |
| Example 27 | M4 | 0.37 | 18.9 | 6.8 | I-1 | 0.11 | 5.5 | 1.96 |
| Example 28 | M1 | 0.37 | 18.9 | 6.8 | I-1 | 0.11 | 5.5 | 1.96 |
| Example 29 | M1 | 0.37 | 18.9 | 6.8 | I-1 | 0.11 | 5.5 | 1.96 |
| Example 30 | M1 | 0.53 | 18.9 | 6.8 | I-1 | 0.15 | 5.5 | 1.96 |
| Example 31 | M1 | 0.37 | 19.0 | 6.8 | I-1 | 0.11 | 5.5 | 1.96 |
| Comparative Example 1 | M1 | 0.37 | 18.9 | 6.8 | I-1 | 0.11 | 5.5 | 1.96 |
| Comparative Example 2 | M1 | 0.37 | 18.9 | 6.8 | I-1 | 0.11 | 5.5 | 1.96 |
| Comparative Example 3 | | 0 | 0 | 0 | I-1 | 0.11 | 6.7 | 1.96 |
| Comparative Example 4 | M1 | 0.37 | 18.9 | 6.8 | I-1 | 0.11 | 5.5 | 1.96 |
| Comparative Example 5 | M1 | 0.37 | 18.9 | 6.8 | I-1 | 0.11 | 5.5 | 1.96 |

TABLE 4

| | Components of curable composition ||||||||||
|---|---|---|---|---|---|---|---|---|---|---|
| | Polymerization inhibitor (D) ||||| Resin (E) |||||
| | | | | | | Dispersant (E1) |||||
| | | D/A || Content in curable composition (% by mass) || Content in curable composition (% by mass) || | E1/A || Content in curable composition (% by mass) ||
| | Type | (based on mass) | In solid contents | In curable composition | In solid contents | In curable composition | Type | (based on mass) | In solid contents | In curable composition |
| Example 1 | PI-1 | 0.00014 | 0.0070 | 0.0025 | 24.5 | 8.8 | A | 0.3 | 15.3 | 5.5 |
| Example 2 | PI-1 | 0.00014 | 0.0070 | 0.0025 | 24.5 | 8.8 | A | 0.3 | 15.3 | 5.5 |
| Example 3 | PI-1 | 0.00014 | 0.0070 | 0.0025 | 24.5 | 8.8 | A | 0.3 | 15.3 | 5.5 |
| Example 4 | PI-1 | 0.00014 | 0.0078 | 0.0025 | 15.8 | 5.1 | A | 0.1 | 5.6 | 1.8 |
| Example 5 | PI-1 | 0.00014 | 0.0056 | 0.0025 | 39.8 | 17.9 | A | 0.8 | 32.5 | 14.6 |
| Example 6 | PI-1 | 0.0001 | 0.0050 | 0.0018 | 24.5 | 8.8 | A | 0.3 | 15.3 | 5.5 |
| Example 7 | PI-1 | 0.00049 | 0.0248 | 0.0089 | 24.5 | 8.8 | A | 0.3 | 15.3 | 5.5 |
| Example 8 | PI-1 | 0.00014 | 0.0075 | 0.0025 | 18.3 | 6.1 | A | 0.3 | 16.6 | 5.5 |
| Example 9 | PI-1 | 0.00014 | 0.0058 | 0.0025 | 37.3 | 16.1 | A | 0.3 | 12.7 | 5.5 |
| Example 10 | PI-1 | 0.00014 | 0.0070 | 0.0025 | 24.5 | 8.8 | A | 0.3 | 15.3 | 5.5 |
| Example 11 | PI-1 | 0.00014 | 0.0070 | 0.0025 | 24.5 | 8.8 | A | 0.3 | 15.3 | 5.5 |
| Example 12 | PI-1 | 0.00014 | 0.0070 | 0.0025 | 24.5 | 8.8 | A | 0.3 | 15.3 | 5.5 |
| Example 13 | PI-1 | 0.00014 | 0.0070 | 0.0025 | 24.5 | 8.8 | A | 0.3 | 15.3 | 5.5 |
| Example 14 | N/A | 0 | 0 | 0 | 24.5 | 8.8 | A | 0.3 | 15.3 | 5.5 |
| Example 15 | PI-1 | 0.00077 | 0.0390 | 0.014 | 24.5 | 8.8 | A | 0.3 | 15.3 | 5.5 |
| Example 16 | PI-1 | 0.00014 | 0.0076 | 0.0025 | 17.3 | 5.7 | A | 0.3 | 16.8 | 5.5 |
| Example 17 | PI-1 | 0.00014 | 0.0055 | 0.0025 | 40.5 | 18.4 | A | 0.3 | 12.1 | 5.5 |
| Example 18 | PI-1 | 0.00014 | 0.0055 | 0.0025 | 19.3 | 8.8 | A | 0.3 | 12.0 | 5.5 |
| Example 19 | PI-1 | 0.00014 | 0.0083 | 0.0025 | 29.3 | 8.8 | A | 0.3 | 18.3 | 5.5 |
| Example 20 | PI-1 | 0.00014 | 0.0070 | 0.0025 | 24.5 | 8.8 | A | 0.3 | 15.3 | 5.5 |
| Example 21 | PI-1 | 0.00014 | 0.0070 | 0.0025 | 24.5 | 8.8 | A | 0.3 | 15.3 | 5.5 |
| Example 22 | PI-1 | 0.00014 | 0.0070 | 0.0025 | 24.5 | 8.8 | B | 0.3 | 15.3 | 5.5 |
| Example 23 | PI-1 | 0.00014 | 0.0070 | 0.0025 | 24.5 | 8.8 | C | 0.3 | 15.3 | 5.5 |
| Example 24 | PI-1 | 0.00014 | 0.0070 | 0.0025 | 24.5 | 8.8 | D | 0.3 | 15.3 | 5.5 |
| Example 25 | PI-1 | 0.00014 | 0.0070 | 0.0025 | 24.5 | 8.8 | A | 0.3 | 15.3 | 5.5 |
| Example 26 | PI-1 | 0.00014 | 0.0070 | 0.0025 | 24.5 | 8.8 | A | 0.3 | 15.3 | 5.5 |
| Example 27 | PI-1 | 0.00014 | 0.0070 | 0.0025 | 24.5 | 8.8 | A | 0.3 | 15.3 | 5.5 |
| Example 28 | PI-1 | 0.00014 | 0.0070 | 0.0025 | 24.5 | 8.8 | A | 0.3 | 15.3 | 5.5 |

TABLE 4-continued

| | Components of curable composition | | | | | | | | |
|---|---|---|---|---|---|---|---|---|---|
| | Polymerization inhibitor (D) | | | | Resin (E) | | | | |
| | | | | | | | Dispersant (E1) | | |
| | | | Content in curable composition (% by mass) | | Content in curable composition (% by mass) | | | | Content in curable composition (% by mass) |
| | Type | D/A (based on mass) | In solid contents | In curable composition | In solid contents | In curable composition | Type | E1/A (based on mass) | In solid contents | In curable composition |
| Example 29 | PI-1 | 0.00014 | 0.0070 | 0.0025 | 24.5 | 8.8 | A | 0.3 | 15.3 | 5.5 |
| Example 30 | PI-1 | 0.0002 | 0.0070 | 0.0025 | 24.5 | 8.8 | A | 0.43 | 153 | 5.5 |
| Example 31 | PI-1 | 0.00014 | 0.0070 | 0.0025 | 24.5 | 8.8 | A | 0.3 | 15.3 | 5.5 |
| Comparative Example 1 | PI-1 | 0.00014 | 0.0070 | 0.0025 | 24.5 | 8.8 | A | 0.3 | 15.3 | 5.5 |
| Comparative Example 2 | PI-1 | 0.00014 | 0.0070 | 0.0025 | 24.5 | 8.8 | A | 0.3 | 15.3 | 5.5 |
| Comparative Example 3 | PI-1 | 0.00014 | 0.0086 | 0.0025 | 30.3 | 8.8 | A | 0.3 | 18.9 | 5.5 |
| Comparative Example 4 | PI-1 | 0.00014 | 0.0070 | 0.0025 | 24.5 | 8.8 | A | 0.3 | 15.3 | 5.5 |
| Comparative Example 5 | PI-1 | 0.00014 | 0.0070 | 0.0025 | 24.5 | 8.8 | A | 0.3 | 15.3 | 5.5 |

TABLE 5

| | Components of curable composition | | | | | | | |
|---|---|---|---|---|---|---|---|---|
| | Resin (E) Alkali-soluble resin (E2) | | | | Surfactant (F) | | | |
| | | | Content in curable composition (% by mass) | | | | Content in curable composition (% by mass) | |
| | Type | E2/A (based on mass) | In solid contents | In curable composition | Type | F/A (based on mass) | In solid contents | In curable composition |
| Example 1 | A-1 | 0.18 | 9.2 | 3.3 | F-1 | 0.0012 | Balance | Balance |
| Example 2 | A-1 | 0.18 | 9.2 | 3.3 | F-1 | 0.0012 | Balance | Balance |
| Example 3 | A-1 | 0.18 | 9.2 | 3.3 | F-1 | 0.0012 | Balance | Balance |
| Example 4 | A-1 | 0.18 | 10.3 | 3.3 | F-1 | 0.0012 | Balance | Balance |
| Example 5 | A-1 | 0.18 | 7.3 | 3.3 | F-1 | 0.0012 | Balance | Balance |
| Example 6 | A-1 | 0.18 | 9.2 | 3.3 | F-1 | 0.0012 | Balance | Balance |
| Example 7 | A-1 | 0.18 | 9.2 | 3.3 | F-1 | 0.0012 | Balance | Balance |
| Example 8 | A-1 | 0.03 | 1.7 | 0.55 | F-1 | 0.0012 | Balance | Balance |
| Example 9 | A-1 | 0.58 | 24.5 | 10.6 | F-1 | 0.0012 | Balance | Balance |
| Example 10 | A-1 | 0.18 | 9.2 | 3.3 | F-1 | 0.0012 | Balance | Balance |
| Example 11 | A-1 | 0.18 | 9.2 | 3.3 | F-1 | 0.0012 | Balance | Balance |
| Example 12 | A-1 | 0.18 | 9.2 | 3.3 | F-1 | 0.0012 | Balance | Balance |
| Example 13 | A-1 | 0.18 | 9.2 | 3.3 | F-1 | 0.0012 | Balance | Balance |
| Example 14 | A-1 | 0.18 | 9.2 | 3.3 | F-1 | 0.0012 | Balance | Balance |
| Example 15 | A-1 | 0.18 | 9.2 | 3.3 | F-1 | 0.0012 | Balance | Balance |
| Example 16 | A-1 | 0.01 | 0.5 | 0.18 | F-1 | 0.0012 | Balance | Balance |
| Example 17 | A-1 | 0.7 | 28.4 | 12.9 | F-1 | 0.0012 | Balance | Balance |
| Example 18 | A-1 | 0.18 | 7.2 | 3.3 | F-1 | 0.0012 | Balance | Balance |
| Example 19 | A-1 | 0.18 | 11.0 | 3.3 | F-1 | 0.0012 | Balance | Balance |
| Example 20 | A-1 | 0.18 | 9.2 | 3.3 | F-1 | 0.0012 | Balance | Balance |
| Example 21 | A-1 | 0.18 | 9.2 | 3.3 | F-1 | 0.0012 | Balance | Balance |
| Example 22 | A-1 | 0.18 | 9.2 | 3.3 | F-1 | 0.0012 | Balance | Balance |
| Example 23 | A-1 | 0.18 | 9.2 | 3.3 | F-1 | 0.0012 | Balance | Balance |
| Example 24 | A-1 | 0.18 | 9.2 | 3.3 | F-1 | 0.0012 | Balance | Balance |
| Example 25 | A-1 | 0.18 | 9.2 | 3.3 | F-1 | 0.0012 | Balance | Balance |
| Example 26 | A-1 | 0.18 | 9.2 | 3.3 | F-1 | 0.0012 | Balance | Balance |
| Example 27 | A-1 | 0.18 | 9.2 | 3.3 | F-1 | 0.0012 | Balance | Balance |
| Example 28 | A-2 | 0.18 | 9.2 | 3.3 | F-1 | 0.0012 | Balance | Balance |
| Example 29 | A-1 | 0.18 | 9.2 | 3.3 | F-1 | 0.0012 | Balance | Balance |
| Example 30 | A-1 | 0.26 | 9.2 | 3.3 | F-1 | 0.0017 | Balance | Balance |
| Example 31 | A-1 | 0.18 | 9.2 | 3.3 | N/A | 0 | 0 | 0 |
| Comparative Example 1 | A-1 | 0.18 | 9.2 | 3.3 | F-1 | 0.0012 | Balance | Balance |
| Comparative Example 2 | A-1 | 0.18 | 9.2 | 3.3 | F-1 | 0.0012 | Balance | Balance |

TABLE 5-continued

Components of curable composition

| | Resin (E) Alkali-soluble resin (E2) | | | | Surfactant (F) | | | |
|---|---|---|---|---|---|---|---|---|
| | | | Content in curable composition (% by mass) | | | | Content in curable composition (% by mass) | |
| | Type | E2/A (based on mass) | In solid contents | In curable composition | Type | F/A (based on mass) | In solid contents | In curable composition |
| Comparative Example 3 | A-1 | 0.18 | 11.3 | 3.3 | F-1 | 0.0012 | Balance | Balance |
| Comparative Example 4 | A-1 | 0.18 | 9.2 | 3.3 | F-1 | 0.0012 | Balance | Balance |
| Comparative Example 5 | A-1 | 0.18 | 9.2 | 3.3 | F-1 | 0.0012 | Balance | Balance |

TABLE 6

| | Total solid content (% by mass) | Light blocking properties | Temporal stability | Patterning properties |
|---|---|---|---|---|
| Example 1 | 36 | A | A | AA |
| Example 2 | 36 | A | A | A |
| Example 3 | 36 | B | A | B |
| Example 4 | 32 | A | B | B |
| Example 5 | 45 | A | A | AA |
| Example 6 | 36 | A | A | AA |
| Example 7 | 36 | A | A | AA |
| Example 8 | 33 | A | A | A |
| Example 9 | 43 | A | A | AA |
| Example 10 | 36 | A | B | A |
| Example 11 | 36 | A | B | A |
| Example 12 | 36 | A | A | A |
| Example 13 | 36 | B | A | A |
| Example 14 | 36 | A | B | A |
| Example 15 | 36 | A | A | A |
| Example 16 | 33 | A | A | B |
| Example 17 | 45 | A | A | A |
| Example 18 | 46 | A | A | A |
| Example 19 | 30 | A | B | B |
| Example 20 | 36 | A | A | A |
| Example 21 | 36 | A | A | A |
| Example 22 | 36 | A | A | AA |
| Example 23 | 36 | A | A | A |
| Example 24 | 36 | A | A | A |
| Example 25 | 36 | A | A | AA |
| Example 26 | 36 | A | A | A |
| Example 27 | 36 | A | A | A |
| Example 28 | 36 | A | A | AA |
| Example 29 | 36 | A | A | A |
| Example 30 | 30 | A | A | A |
| Example 31 | 36 | A | A | A |
| Comparative Example 1 | 36 | C | A | C |
| Comparative Example 2 | 36 | D | A | D |
| Comparative Example 3 | 29 | B | C | C |
| Comparative Example 4 | 36 | C | A | C |
| Comparative Example 5 | 36 | A | A | C |

Examples and comparative examples are described in Table 1 to Table 6. For example, the curable composition of Example 2 contains the inorganic particles (A) in an amount of 51.0% by mass in the total solid content of the curable composition (equivalent to 18.3% by mass with respect to the total mass of the curable composition). Regarding the type of the inorganic particles, the curable composition of Example 2 contains TaC (average primary particle diameter: 60 nm) as the metal carbide-containing particles (A1) in an amount of 70% by mass (equivalent to 35.7% by mass with respect to the total solid content of the curable composition and equivalent to 12.8% by mass with respect to the total mass of the curable composition) as a content in the inorganic particles (A). Furthermore, the curable composition of Example 2 contains $SiO_2$ as other particles (A2) in an amount of 30% by mass (equivalent to 15.3% by mass with respect to the total solid content of the curable composition and equivalent to 5.5% by mass with respect to the total mass of the curable composition) as a content in the inorganic particles (A). The curable composition of Example 2 contains, as the polymerizable compound (B), "M1" in an amount of 18.9% by mass with respect to the total solid content of the curable composition (equivalent to 6.8% by mass with respect to the total mass of the curable composition). In the curable composition of Example 2, B/A is 0.37 based on mass. In addition, the curable composition of Example 2 contains, as the polymerization initiator (C), "I-1" in an amount of 5.5% by mass with respect to the total solid content of the curable composition (equivalent to 1.96% by mass with respect to the total mass of the curable composition). In the curable composition of Example 2, C/A is 0.11 based on mass. The curable composition of Example 2 contains, as a polymerization inhibitor, "PI-1" in an amount of 0.0070% by mass with respect to the total solid content of the curable composition (equivalent to 0.0025% by mass with respect to the total mass of the curable composition). In the curable composition of Example 2, D/A is 0.00014 based on mass. Furthermore, the curable composition of Example 2 contains the resin (E) in an amount of 24.5% by mass with respect to the total solid content of the curable composition (equivalent to 8.8% by mass with respect to the total mass of the curable composition). The curable composition of Example 2 contains, as the dispersant (E1), "A" in an amount of 15.3% by mass with respect to the total solid content of the curable composition (equivalent to 5.5% by mass with respect to the total mass of the curable composition). In the curable composition of Example 2, E1/A is 0.3 based on mass. The curable composition of Example 2 contains, as the alkali-soluble resin (E2), "A-1" in an amount of 9.2% by mass with respect to the total solid content of the curable composition (equivalent to 3.3% by mass with respect to the total mass of the curable composition. In the curable composition of Example 2, E2/A is 0.18 based on mass. The curable composition of Example 2 contains "F-1" as the surfactant (F). The solid contents of the curable composition of Example 2 is 36% by mass, and all of the light blocking properties, the temporal stability, and the patterning properties of the curable composition of Example 2 were evaluated as A.

Other examples and comparative examples may be interpreted as above.

The curable compositions of Examples 1 to 31 had excellent temporal stability and patterning properties, and the cured films obtained from the curable compositions had excellent light blocking properties and the effects of the present invention. In contrast, the curable compositions of Comparative Examples 1 to 5 did not have the effects of the present invention.

The curable composition of Example 1 had further improved effects of the present invention compared to the curable compositions of Examples 2 and 3 in a case where the content of the metal carbide-containing particles containing a carbide of group 5 element in the inorganic particles is large.

The temporal stability and the patterning properties of the curable composition of Example 1, in which E1/A was equal to or higher than 0.2, were better than those of the curable composition of Example 4.

The patterning properties of the curable composition of Example 1, in which the content of the alkali-soluble resin was equal to or greater than 7.3% by mass with respect to the total solid content of the curable composition, were better than those of the curable composition of Example 8.

The patterning properties and the temporal stability of the curable composition of Example 1, in which the average particle diameter of the metal carbide-containing particles was larger than 5 nm and less than 200 nm, were better than those of the curable compositions of Example 10 and Example 11.

The patterning properties of the curable composition of Example 1 containing TaC as a metal carbide were better than those of the curable composition of Example 12 containing NbC as a metal carbide.

The patterning properties of the curable composition of Example 1 containing TaC as a metal carbide were better than those of the curable composition of Example 13 containing VC as metal carbide-containing particles. Furthermore, the light blocking properties of the cured film obtained from the curable composition of Example 1 were better than those of the cured film obtained from the curable composition of Example 13.

The temporal stability and the patterning properties of the curable composition of Example 1 containing a polymerization inhibitor were better than those of the curable composition of Example 14 not containing a polymerization inhibitor.

The patterning properties of the curable composition of Example 1 in which D/A was 0.00010 to 0.00050 were better than those of the curable composition of Example 15.

The patterning properties of the curable composition of Example 1 in which E2/A was 0.03 to 0.6 were better than those of the curable compositions of Example 16 and Example 17.

The patterning properties and the temporal stability of the curable composition of Example 1 in which B/A was 0.1 to 0.8 were better than those of the curable compositions of Example 18 and Example 19.

The patterning properties of the curable composition of Example 1 containing an oxime compound as a polymerization initiator were better than those of the curable compositions of Example 20 and Example 21.

The patterning properties of the curable composition of Example 1, in which the dispersant had the structural unit represented by Formula (A1), were better than those of the curable compositions of Example 23 and Example 24.

The patterning properties of the curable composition of Example 1, which contained a (meth)acrylate polymer having 5 to 15 functional groups as a polymerizable compound, were better than those of the curable compositions of Example 26 and Example 27.

EXPLANATION OF REFERENCES

100: solid-state imaging device
101: solid-state imaging element
102: imaging portion
103: cover glass
104: spacer
105: laminated substrate
106: chip substrate
107: circuit substrate
108: electrode pad
109: external connection terminal
110: penetration electrode
111: lens layer
112: lens material
113: support
114, 115: light blocking film
201: light-receiving element
202: color filter
203: microlens
204: substrate
205b: blue pixel
205r: red pixel
205g: green pixel
205bm: black matrix
206: p-well layer
207: reading gate portion
208: vertical electric charge transfer path
209: element separation region
210: gate insulating film
211: vertical electric charge transfer electrode
212: light blocking film
213, 214: insulating film
215: planarization film
300: infrared sensor
310: solid-state imaging element
311: infrared absorption filter
312: color filter
313: infrared transmission filter
314: resin film
315: microlens
316: planarization film

What is claimed is:
1. A curable composition comprising:
inorganic particles;
a polymerizable compound; and
a polymerization initiator,
wherein the inorganic particles contain metal carbide-containing particles containing a carbide of an element in group 5 of the periodic table, and
a content of the metal carbide-containing particles in a total mass of the inorganic particles is equal to or greater than 55% by mass.
2. The curable composition according to claim 1,
wherein a ratio of a mass of the polymerizable compound contained in the curable composition to a mass of the inorganic particles contained in the curable composition is 0.1 to 0.8.

3. The curable composition according to claim 1, further comprising:
a polymerization inhibitor.

4. The curable composition according to claim 2, further comprising:
a polymerization inhibitor.

5. The curable composition according to claim 3, wherein a ratio of a mass of the polymerization inhibitor contained in the curable composition to a mass of the inorganic particles contained in the curable composition is 0.0001 to 0.0005.

6. The curable composition according to claim 4, wherein a ratio of a mass of the polymerization inhibitor contained in the curable composition to a mass of the inorganic particles contained in the curable composition is 0.0001 to 0.0005.

7. The curable composition according to claim 1, further comprising:
a resin.

8. The curable composition according to claim 7, wherein the resin contains an alkali-soluble resin, and a ratio of a mass of the alkali-soluble resin contained in the curable composition to a mass of the inorganic particles contained in the curable composition is 0.03 to 0.6.

9. The curable composition according to claim 1, wherein an average primary particle diameter of the metal carbide-containing particles is greater than 5 nm and less than 200 nm.

10. The curable composition according to claim 1, wherein the element is Ta.

11. The curable composition according to claim 1, wherein the element is Nb or V.

12. A cured film obtained by curing the curable composition claim 1.

13. A light blocking film comprising:
the cured film according to claim 12.

14. A solid-state imaging element comprising:
the cured film according to claim 12.

15. An image display device comprising:
the cured film according to claim 12.

16. A manufacturing method of a cured film, comprising:
a curable composition layer forming step of forming a curable composition layer by using the curable composition according to claim 1;
an exposure step of exposing the curable composition layer by irradiating the curable composition layer with actinic rays or radiation; and
a development step of developing the exposed curable composition layer so as to form a cured film.

* * * * *